United States Patent
Shanjani et al.

(10) Patent No.: US 11,974,898 B2
(45) Date of Patent: May 7, 2024

(54) PALATAL EXPANDERS AND METHODS OF EXPANDING A PALATE

(71) Applicant: Align Technology, Inc., San Jose, CA (US)

(72) Inventors: Yaser Shanjani, Sunnyvale, CA (US); Jeremy Riley, Mountain View, CA (US); Ryan Kimura, San Jose, CA (US); Jun Sato, San Jose, CA (US); Norman Su, San Jose, CA (US); Jihua Cheng, San Jose, CA (US); Fuming Wu, Pleasanton, CA (US)

(73) Assignee: Align Technology, Inc., San Jose, CA (US)

( * ) Notice: Subject to any disclaimer, the term of this patent is extended or adjusted under 35 U.S.C. 154(b) by 88 days.

(21) Appl. No.: 18/175,497

(22) Filed: Feb. 27, 2023

(65) Prior Publication Data

US 2023/0200947 A1 Jun. 29, 2023

Related U.S. Application Data

(60) Continuation of application No. 17/679,858, filed on Feb. 24, 2022, which is a division of application No. (Continued)

(51) Int. Cl.
*A61C 7/10* (2006.01)
*A61C 7/00* (2006.01)
(Continued)

(52) U.S. Cl.
CPC ............... *A61C 7/10* (2013.01); *A61C 7/002* (2013.01); *A61C 7/023* (2013.01); *A61C 7/08* (2013.01); *A61C 9/00* (2013.01); *B29C 64/393* (2017.08); *B33Y 10/00* (2014.12); *B33Y 50/02* (2014.12); *B33Y 80/00* (2014.12)

(58) Field of Classification Search
CPC ................................... A61C 7/10; A61C 7/08
See application file for complete search history.

(56) References Cited

U.S. PATENT DOCUMENTS 3,259,129 A * 7/1966 Harry ..................... A61F 5/58
607/58
5,167,499 A 12/1992 Arndt et al.
(Continued)

FOREIGN PATENT DOCUMENTS

DE 102012023085 A1 * 5/2014 ............ A61C 7/10
WO WO-2016028106 A1 * 2/2016 ............ A61C 13/00
WO 2017105117 A2 6/2017

*Primary Examiner* — Heidi M Eide
(74) *Attorney, Agent, or Firm* — Shay Glenn LLP

(57) ABSTRACT

Palatal expander apparatuses for expanding a patient's palate ("palatal expanders") and methods of using and making them. The palatal expanders may include tooth engagement regions connected by a palatal region that is configured to apply force between the tooth engagement regions. At least a portion of the palatal region may be configured to have a clearance from the patient's mid-palatal region when the palatal expander is worn by the patient. The clearance between the palatal region and the patient's palate may decrease from the patient's mid-palatal region laterally toward the tooth engagement regions.

32 Claims, 48 Drawing Sheets

Related U.S. Application Data

15/831,159, filed on Dec. 4, 2017, now Pat. No. 11,273,011.

(60) Provisional application No. 62/542,750, filed on Aug. 8, 2017, provisional application No. 62/429,692, filed on Dec. 2, 2016.

(51) Int. Cl.
| | |
|---|---|
| *A61C 7/02* | (2006.01) |
| *A61C 7/08* | (2006.01) |
| *A61C 9/00* | (2006.01) |
| *B29C 64/393* | (2017.01) |
| *B33Y 10/00* | (2015.01) |
| *B33Y 50/02* | (2015.01) |
| *B33Y 80/00* | (2015.01) |

(56) References Cited

U.S. PATENT DOCUMENTS

| | | | | |
|---|---|---|---|---|
| 5,312,247 | A | * | 5/1994 | Sachdeva ............... A61C 7/10 433/7 |
| 5,462,067 | A | | 10/1995 | Shapiro |
| 7,192,273 | B2 | * | 3/2007 | McSurdy, Jr. .......... A61C 7/10 433/24 |
| 2002/0189620 | A1 | | 12/2002 | L'Estrange et al. |
| 2003/0049581 | A1 | * | 3/2003 | DeLuke ................. A61C 7/10 433/7 |
| 2005/0186524 | A1 | * | 8/2005 | Abolfathi ............... A61C 7/10 433/7 |
| 2006/0093983 | A1 | * | 5/2006 | Schultz .................. A61C 7/08 433/24 |
| 2008/0050692 | A1 | | 2/2008 | Hilliard |
| 2008/0289637 | A1 | | 11/2008 | Wyss |
| 2008/0311535 | A1 | | 12/2008 | Andreiko |
| 2009/0061375 | A1 | | 3/2009 | Yamamoto et al. |
| 2009/0301498 | A1 | | 12/2009 | Nordström |
| 2014/0342299 | A1 | * | 11/2014 | Jung ....................... A61F 5/566 433/6 |
| 2015/0064641 | A1 | | 3/2015 | Gardner |
| 2017/0196727 | A1 | | 7/2017 | Giridharagopalan |

\* cited by examiner

ATTACHMENT TEMPLATE

ACTIVE EXPANDERS

PASSIVE HOLDER (RETAINER)

HOLDER (PASSIVE EXPANDER)

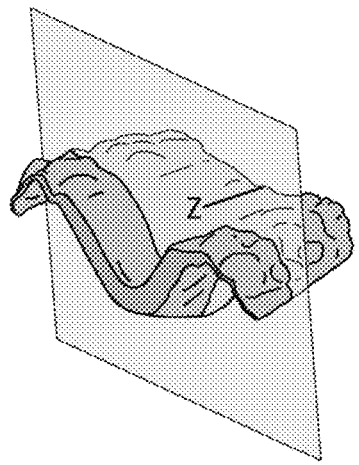
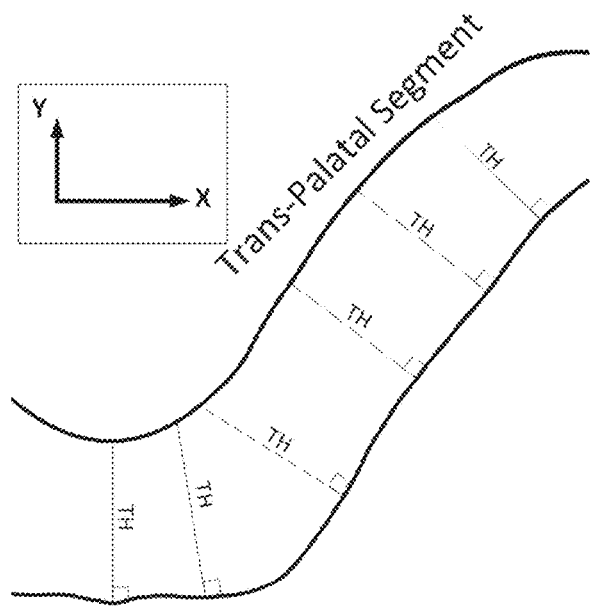
FIG. 9A  FIG. 9B
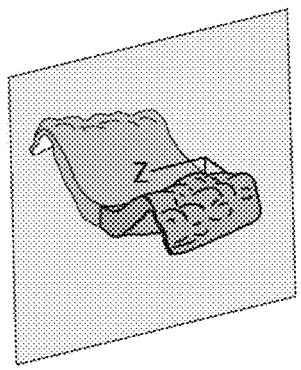
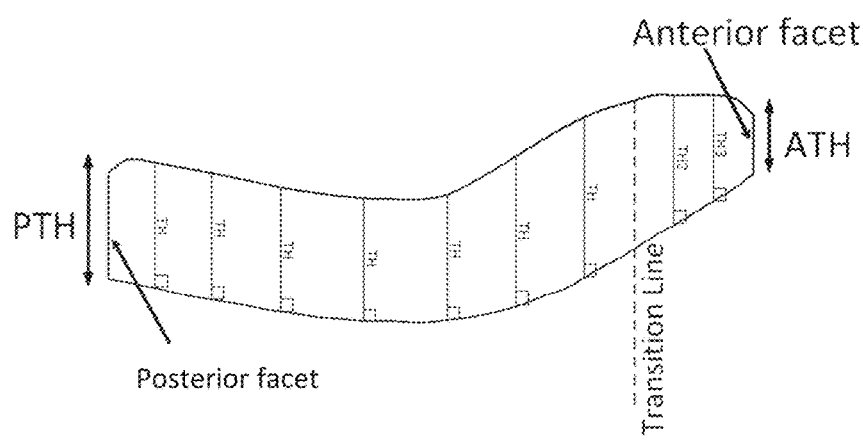
FIG. 10A  FIG. 10B

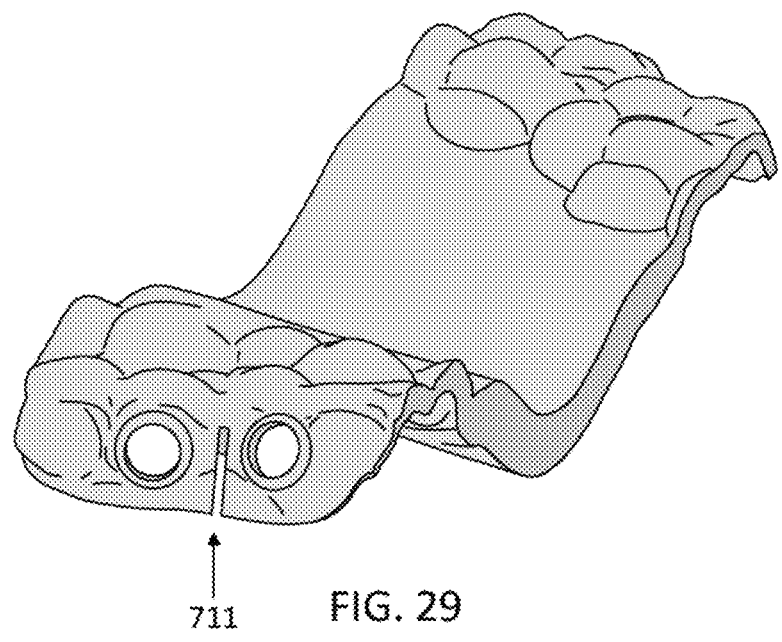
FIG. 29
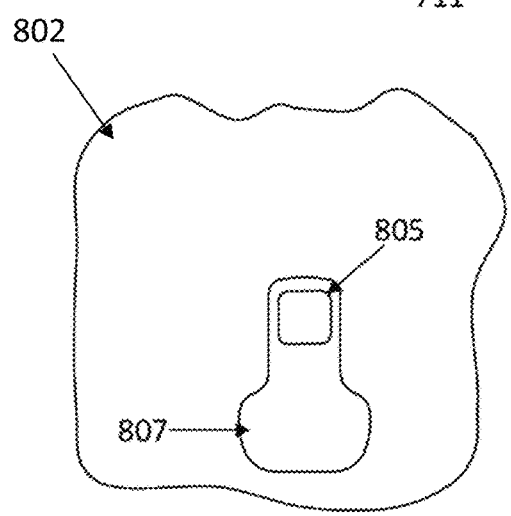
FIG. 30A
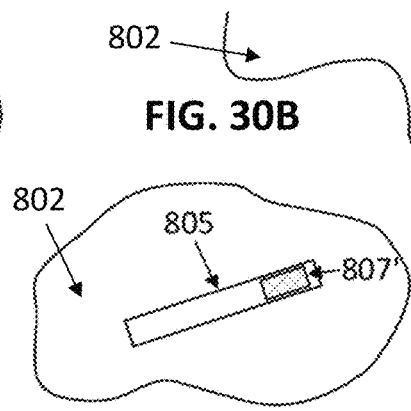
FIG. 30C
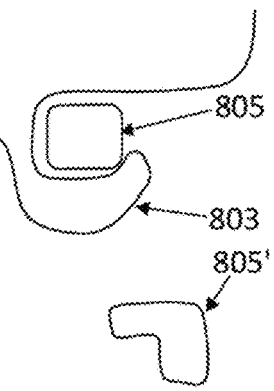
FIG. 30B
FIG. 30D
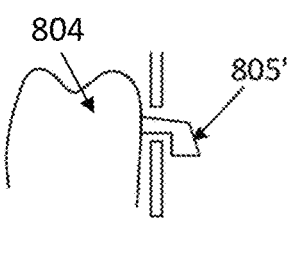
FIG. 30E
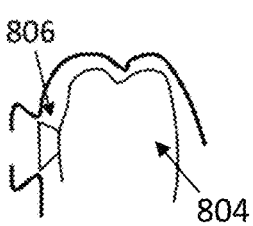
FIG. 30F
FIG. 30G
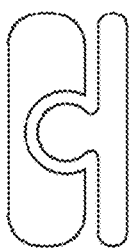
FIG. 30H 1 CYLINDER CASTING
2 CYLINDER CORE
3 KEYWAY
4 CORE PIN
5 DRIVER PIN
6 PIN SPRING
7 TAIL PIECE
8 THREADED BORE HOLE

DEPOSITION

LOW M { * 
         * SPRAY
         * JETTING

HIGH M { * AM
          *

CURING { * T
          * LIGHT
          * RIM (REACTION INJECTION MOLDING)

(ARROW POINTS FROM DOCTOR BLADE)

MECHANICAL INTERLOCKING

MECHANICAL LATCHING

PALATAL EXPANDERS AND METHODS OF EXPANDING A PALATE

CLAIM OF PRIORITY

This patent application is a continuation of U.S. patent application Ser. No. 17/679,858, filed Feb. 24, 2022, titled "PALATAL EXPANDERS AND METHODS OF EXPANDING A PALATE," now U.S. Patent Application Publication No. 2022/0175494, which is a divisional of U.S. patent application Ser. No. 15/831,159, filed Dec. 4, 2017, titled "PALATAL EXPANDERS AND METHODS OF EXPANDING A PALATE," now U.S. Pat. No. 11,273,011, which claims priority to U.S. Provisional Patent Application No. 62/429,692, filed on Dec. 2, 2016 (titled "METHODS OF FABRICATING PALATAL EXPANDERS"), and U.S. Provisional Patent Application No. 62/542,750, filed on Aug. 8, 2017 (titled "PALATAL EXPANDERS AND METHODS OF EXPANDING A PALATE"), each of which is herein incorporated by reference in its entirety. This patent application may also be related to U.S. patent application Ser. No. 15/831,262, titled "METHODS AND APPARATUSES FOR CUSTOMIZING A RAPID PALATAL EXPANDER" by Wu et al., which is also herein incorporated by reference in its entirety.

This application may be related to US Patent Application Publication No. 2016/0081768 (titled "ARCH EXPANDING APPLIANCE") and US Patent Application Publication No. 2016/0081769 (titled "ARCH ADJUSTMENT APPLIANCE"), each of which is herein incorporated by reference in its entirety.

INCORPORATION BY REFERENCE

All publications and patent applications mentioned in this specification are herein incorporated by reference in their entirety to the same extent as if each individual publication or patent application was specifically and individually indicated to be incorporated by reference.

FIELD

Described herein are palatal expanders, methods of making and methods of using them. For example, described herein are series' of palatal expanders that are ordered to provide incremental palatal expansion (including rapid or gradual palatal expansion) and methods of fabricating series of palatal expanders that are customized to a patient.

BACKGROUND

A variety of orthodontic problems are linked with a narrow palate. In certain circumstances the maxilla the size to accommodate the upper teeth. In other cases there is room for the upper teeth but the palate is so narrow that speech is impaired or made difficult. In other cases the palate is so high that it cuts down on the amount of air that can pass through the nose, so that deep breathing, without opening the mouth, is almost impossible. In all of these cases, palate expansion, that is separating and spreading the maxilla, may be helpful.

Described herein are palatal expander apparatuses and methods that may be used to easily and efficiently expand a patient's palate.

SUMMARY OF THE DISCLOSURE

Apparatuses (including devices and systems) and method for progressively expanding the palate of a patient may include one or a series of palatal expanders. Provided herein are methods and apparatuses (including systems and devices) for progressive palatal expansion. These palatal expanders may be adapted for comfort, efficacy and/or for ease of removal. For example described herein are systems for palatal expansion that may include a series of incremental expanders including a first incremental expander having a geometry selected to expand the palate, one or more intermediate expanders having geometries selected to progressively expand the palate to a target desired breadth. These systems may also include a template for positioning one or more attachments for holding the palatal expander on the subject's teeth and and/or a holder or retainer for maintaining the expanded palate following active treatment.

Typically, expanders have been described as pre-formed devices having a first molar-engaging region adapted to engage upper molars on a first side of the upper jaw, a second molar-engaging region adapted to engage upper molars on a second side of the upper jaw and palatal region with a geometry selected to fit against the shape of the palate while providing pressure to incrementally expand the palate. Each of the expanders in a series of expanders may comprise two molar regions, one on each side, each with one or more cavities, each cavity being adapted to fit over one of the patient's molars. In an especially preferred embodiment each molar region comprises two cavities, such that each molar region fits over two posterior molars or premolars. Each expander may further comprise a palatal region, which separates the two molar regions and fits against the patient's palate. Typically, the distance between the molar regions in the series of expanders is sequentially greater.

The palatal region of the device may provide force to stretch or expand the midpalatal region. Although energy-enhancing features may be placed in this region (e.g., springs and thermally active materials), in addition, this region may include one or more adaptations, such as struts, supports, cross-beams, ribs, gaps/windows, attachments, and the like which may distribute the forces applied in a more nuanced manner than previously described. For example, these devices may be configured so that the forces applied are distributed in a predetermined and/or desired pattern by arranging one or more points of contact between the palatal expander and the patient's mouth (e.g., in the gingiva and/or preferably along an upper or lower lateral portion of the patient's teeth, including their molars). The curvature (e.g., concavity) of the device may also be adjusted, to distribute the forces applied, while allowing clearance between the palate and the device, and/or allowing clearance for the user's tongue.

A series of palatal expanders as described herein may be configured to expand the patient's palate by a predetermined distance (e.g., the distance between the molar regions of one expander may differ from the distance between the molar regions of the prior expander by not more than 2 mm, by between 0.1 and 2 mm, by between 0.25 and 1 mm, etc.) and/or by a predetermined force (e.g., limiting the force applied to less than 180 Newtons (N), to between 8-200 N, between 8-90 N, between 8-80 N, between 8-70 N, between 8-60 N, between 8-50 N, between 8-40 N, between 8-30 N, between 30-60 N, between 30-70 N, between 40-60 N, between 40-70 N, between 60-200 N, between 70-180 N, between 70-160 N, etc., including any range there between).

In any of the apparatuses described herein (and methods of fabricating them), the expanders may be formed out of a polymeric (e.g., acrylic, thermoplastics, thermosets, etc.) and/or a metal material, including stainless steel, nickel titanium, copper nickel titanium, etc. Any of these apparatuses may be formed by 3D printing and/or by a lamination process, in which the apparatuses are formed for layers of material that may be formed and/or adhered together (e.g., to form a unitary device); different layers may have different mechanical and/or chemical properties, and may include different thicknesses or regions of thickness. For example, an apparatus may include laminated materials that are bonded together.

Also described herein are apparatuses and method of forming them by direct fabrication techniques. For example, an apparatus (including a series of palatal expanders) may be digitally designed and fabricated by a direct printing (e.g., 3D printing); alternatively or additionally the fabrication method may include 3D printing of models of the teeth, gingiva and palate that have been digitally configured to form one or more of the series applying the palatal expansion.

Also described herein are methods of expanding the palate of a patient using any of the apparatuses described herein, which may include positioning each expander in a series of expanders in position to expand the palate, leaving the expander in position for a period of time and replacing the expander with the next expander in the series until the desired palatal expansion has occurred and then applying a palatal expander that is configured to retain the palate in the final position at the target desired breadth.

Any of the apparatuses described herein may be adapted to make removing the palatal expander without reducing the retention or the ability of the palatal expander to remain held in position on the patient. For example, any of these palatal expanders may include detachment region on one or both buccal side of the palatal expander. The detachment region (which may be referred to as a removal grip, a removal cavity, a removal handle, a removal attachment, removal slot, etc.) may include a gap, slot, opening, etc., on an upward- or downward-facing side that may be adapted to allow a user to insert a fingernail and/or removal tool therein to remove the palatal expander from the teeth. The detachment region may be configured to deform and release the palatal expander from the patient's teeth. The detachment region may be configured as a lip, ledge, or protrusion on the buccal side of the palatal expander. Any of these palatal expanders may include a hinge region that is between the occlusal surface and the buccal side, so that operating the detachment region may pull the buccal side of the palatal expander away from the patient's teeth and/or off of any attachment so that it may be removed. Any of these palatal expanders may include a slit, slot, gap, etc. that extends upward from the edge of the palatal expander toward the occlusal surface on the buccal side permitting all or a portion of the palatal expander to pull upward and disengage from the teeth.

Also described herein are palatal expanders that are adapted for comfort to have a thickness that varies. For example, in any of these variations, the palatal expander may include an inner bottom surface in the palatal arch portion of the palatal expander that faces the patient' tongue when worn that is smooth or flattened compared to the opposite surface (matching the patient's palate where the palatal expander is worn. This tongue-facing side may have a surface that is rounded and does not include any rapid transitions in topology compared with the patient's actual palate. In any of these examples, the apparatuses described herein may have a different (including variable) thickness. In some variations, the apparatus may include a palatal region that is narrower toward the anterior of the palatal expander apparatus. In any of these variations, the poster portion of the palatal expander may be thinner and/or cut away (removed from) the palatal expander, which may prevent or limit gagging.

Any of the palatal expanders described herein may also or alternatively include occlusal thicknesses that may be customized by the dental professional and/or may be different from the patient's normal occlusal topography. For example, the exposed occlusal surface of the palatal expander when worn may be configured to have a surface that is configured to mate with the occlusive surface of the opposite jaw (e.g., the mandibular arch) to apply forces to adjust the patient's jaw positon when worn. Alternatively or additional, the thickness of the occlusal surface may be flatter, or may include a ramp or other structure to adjust the patient's bite. In some variations the occlusive surface may be thinner or at least partially removed, so as to minimally interfere with the patient's bite. In some variations, the occlusive surface of the retainer may be thin or partially (or completely) removed, while in the palatal expander series used to actively expand the patient's palate the occlusive surface may be thicker.

Also described herein are palatal expanders that are marked on a flat surface, e.g., a surface on the back or posterior edge of the palatal expander apparatus, with a code that indicates one or more of the series number (e.g., first, second, third, fourth, etc., holder, etc.), a patient code (e.g., identify the patient with specificity), a time and/or date, a copy number, etc. The identifying code or part number may be configured so that it may read by the user (e.g. patient) to assist in performing the palatal expansion in the proper sequence, as well as distinguishing between palatal expander and holder.

Also described herein are methods for forming one or a series of palatal expanders and methods of making and using them in which the palatal expander is configured to include one or more gaps or spacing regions between the patient's upper arch and the upper (e.g., palate-facing) surface of the palatal expander. For example, any of these apparatuses may be configured to include a gap or concave channel or region to prevent impingement near the gingival line (e.g., on the buccal and/or on the lingual side of the apparatus. Any of these apparatuses may be configured to include a gap between the upper (e.g., palate-facing) surface of the palatal expander and the palate.

Methods and apparatuses for performing palatal expansion using any of these apparatuses are also described. For example, described herein are methods an apparatuses for scanning a patient's intraoral cavity (including in particular the upper arch) sufficiently so that the palatal expander apparatuses described herein may be formed.

Methods of applying or attaching the palatal expanders described herein are described, including methods for the patient to apply the palatal expander to her/his own teeth. Also described herein are attachments (which may alternatively be referred to as retaining attachments, retaining posts, etc.) and templates for attaching the attachments to a patient's teeth that may be configured to releasably secure the palatal expander to the patient's teeth. Methods of forming the attachment template, and/or attaching the attachments to the teeth are also described.

Also described herein are methods and apparatuses for removing the palatal expanders from a patient's teeth. For example, described herein are removal tools to assist a person (and particularly, but not limited to, the patient) in removing the palatal expander when secured onto the patient's teeth.

Also described herein are methods of making any of the apparatuses described herein.

For example, described herein are palatal expander apparatuses for expanding a patient's palate. A palatal expander apparatus may include: a pair of tooth engagement regions connected by a palatal region and two or more attachment regions each configured to couple to an attachment bonded to the patient's teeth, wherein the palatal region is configured to apply between 8 and 160 N of force between the pair of tooth engagement regions when worn by the patient; wherein the tooth engagement regions each comprise an occlusal side and a buccal side, further wherein the occlusal side is thinner than the palatal region, and the buccal side is thinner than the occlusal side.

The palatal region may be between about 1-5 mm thick (e.g., between 1.5 to 3 mm, between 2 and 2.5 mm thick, etc.). The occlusal side may have a thickness of between about 0.5-2 mm (e.g., between 0.5 to 1.75 mm, between 0.75 to 1.7 mm, etc.). The buccal side may have a thickness of between about 0.25-1 mm (e.g., between 0.35 and 0.85 mm, between about 0.4 and 0.8 mm, etc.).

Any of these apparatuses may include a hinge (e.g., hinge region) on the buccal side or between the buccal side and the occlusal side that is configured permit bending at the hinge which may make removing the apparatus easier.

Any of these apparatuses may include a visible identification marking on a flat posterior surface of the palatal expander apparatus, wherein the identification marking encodes one or more of: a patient number, a revision indicator, an indicator that the apparatus is a palatal expander or a retainer, and the stage of treatment.

Any of these apparatuses may include a detachment region on a buccal side of the apparatus to help remove the device once attached to the patient's teeth. Since the forces being applied to widen the palate may make it difficult to easily remove the apparatus, a buccally-located detachment region (e.g., a notch, gap, handle, tab, slot, etc.) may be used to more easily remove the apparatus from the teeth, particularly when attachments are used to hold the apparatus on the teeth. The detachment region may be on or extend from the buccal side(s) and may be spaced from the patient's gingiva by at least 0.25 to 1 mm when the apparatus is being worn and may be near the bottom edge (or extending from the bottom edge, or over the bottom edge) of the buccal side of the apparatus. For example, the bottom edge of the buccal side may be configured as a detachment region extending from the buccal side of the device, along all or a side (e.g., between 1 mm and 5 cm, e.g. 1 mm to 4 cm, 1 mm to 3 cm, 5 mm to 4 cm, etc.) of the buccal region. The extension may be configured to extend below and away from the patient's gingiva, e.g., to form a gap of between about 0.25-1 mm when the apparatus is worn by a patient. Any of these apparatuses may include one or a plurality of vertical slots or slits extending from a bottom of the buccal side toward the occlusal side. In particular, these slots or slits may be on either side of the detachment region.

Any of these apparatuses may be smoothed on the tongue-facing side of the apparatus. For example, the palatal region may comprise an upper convex surface having a first surface curvature comprising a plurality of grooves and ridges that align with grooves and ridges in the patient's palate; further wherein the palatal region comprises a lower, concave surface having a second surface curvature that is smoother than the first surface curvature. Smoother may mean having fewer and/or less extensive (deep, high) grooves and/or ridges.

Also described herein are methods of making a palatal expander apparatus, the method comprising: receiving a model of a patient's upper arch (e.g., a digital model, a manual model, etc.); and forming a palatal expander having a pair of tooth engagement regions connected by a palatal region and two or more attachment regions each configured to couple to an attachment bonded to the patient's teeth, wherein the tooth engagement regions are each configured to fit over the patient's teeth and each comprise an occlusal side and a buccal side, further wherein the occlusal side comprises a detachment region configured to engage with the patient's fingernail to disengage at least one of the attachment regions from an attachment on the patient's teeth. Forming the apparatus may include forming any of the features described herein, including detachment regions, slits/slots, smoothing the tongue-facing side, forming an opening in the apparatus, varying the thickness of the different regions relative to each other and/or within each region, etc. For example, forming may comprise forming the palatal region by smoothing a bottom surface of the palatal region relative to an opposite top surface of the palatal region.

For example, a method of making a palatal expander apparatus may include: receiving a model of a patient's upper arch; forming a palatal expander having a pair of tooth engagement regions connected by a palatal region and two or more attachment regions each configured to couple to an attachment bonded to the patient's teeth; wherein the tooth engagement regions are each configured to fit over the patient's teeth and each comprise an occlusal side and a buccal side; and a detachment region on the buccal side having a gap that is configured to engage with the patient's fingernail or an elongate tool and to disengage at least one of the attachment regions from an attachment on the patient's teeth.

In any of these methods and apparatuses, the detachment region may comprises a projection extending from the buccal side of the tooth engagement region. The palatal expander may be configured not to contact either or both the gingiva adjacent to a lingual side of the patient's teeth when worn by the patient and the midline of the patient's palate.

In any of these methods, the tooth engagement region may comprise an extension of the buccal side of the tooth engagement region that extends from the patient's gingiva to form a gap of between about 0.25-1 mm when the apparatus is worn by a patient. The tooth engagement region may comprise a projection extending from the buccal side of the tooth engagement region. The palatal expander may be configured to contact a lingual side of the patient's teeth when worn by the patient and to apply between 8 and 160 N of force between the tooth engagement regions. The palatal expander may be configured not to contact either or both the gingiva adjacent to a lingual side of the patient's teeth when worn by the patient and the midline of the patient's palate.

The apparatus may be formed in any appropriate manner, including forming comprises forming by three-dimensional (3D) printing. For example, receiving a model of the patient's upper arch may comprise receiving a digital model of the patient's teeth, gingiva and palatal region.

Any of these methods may also include forming a retainer and/or forming a template for placing attachments. Any of these methods may also include sending and/or providing these apparatuses to a dental provider and/or patient.

Also described herein are palatal expander apparatuses for expanding a patient's palate including: a pair of tooth engagement regions connected by a palatal region and two or more attachment regions each configured to couple to an attachment bonded to the patient's teeth; wherein the tooth engagement regions each comprise an occlusal side and a buccal side, further wherein at least one of the occlusal sides comprises a detachment region on the buccal side configured to be grabbed and pulled to disengage at least one of the attachment regions from an attachment on the patient's teeth.

A palatal expander apparatus for expanding a patient's palate may include: a pair of tooth engagement regions connected by a palatal region and two or more attachment regions each configured to couple to an attachment bonded to the patient's teeth; wherein the tooth engagement regions each comprise an occlusal side and a buccal side, further wherein the occlusal side is thinner than the palatal region, and the buccal side is thinner than the occlusal side; and a hinge region on the buccal side before the occlusal side.

For example, described herein are palatal expander apparatus (and series or sequences of palatal expanders); any of these palatal expanders may be patient- or patient caregiver-removable. For example, a palatal expander apparatus for expanding a patient's palate may include: a pair of tooth engagement regions connected by a palatal region, wherein the palatal region is configured to apply between 8 and 160 N of force between the pair of tooth engagement regions when the apparatus is worn by the patient; wherein the tooth engagement regions each comprise an occlusal side and a buccal side, further wherein the occlusal side is thinner than the palatal region, and the buccal side is thinner than the occlusal side.

In general, any of these palatal expanders may be configured so that all or a portion (e.g., the mid-palatal region, e.g., configured to be positioned opposite of the suture) is spaced apart from the patient's palate when the device is worn, by some minimum distance, e.g., between 0.01 and 5 mm (e.g., 0.02 mm or greater, 0.03 mm or greater, 0.04 mm or greater, than 0.05 mm or greater, 0.06 mm or greater, 0.07 mm or greater, 0.1 mm mm or greater, 0.15 mm mm or greater, 0.2 mm mm or greater, 0.25 mm or greater, etc.) This minimum distance may be determined when forming the palatal expander by modeling (e.g., from a digital model) the patient's dental arch, including the palatal region. Including this minimal distance may be particularly helpful, for example, to prevent sores or irritation of the soft and/or hard palate when wearing the palatal expander(s).

This space between the palatal-facing surface of the palatal region of the palatal expander and the patient's palate may be referred to as clearance. This spacing may be positive (e.g., forming a gap) or, in some areas of the palate region, negative, e.g., impinging on the patient's palate, in order to provide force to expand the palate. Negative clearance may be identified by comparing an actual or predicted (e.g., for later stages of the expansion treatment) model of the patient's palate with the palatal expander outer (palate-facing) surface. Actual or predated models may be digital (virtual) or casts of the patient's dental arch. In later stages of treatment, the clearance may be estimated from a digital model in which the patient's palatal region morphology is predicted by morphing the palatal region r to reflect the treatment progression.

For example, contact with soft palate regions of the patient's palate may be avoided by include positive clearance of greater than some minimum (e.g., see above, such as 0.1 mm, 0.2 mm, etc.) in regions configured to be worn opposite of the soft palatal region). In general, any of these apparatuses may be configured so that the mid palatal regions (e.g., opposite the mid palatal suture) are offset from the patient's palate when worn. In some variations the separation distance may be at a maximum in this mid palatal region. In some variations the separation distance may decrease laterally, and negative clearance (e.g., force-applying contact) may be present laterally. The clearance may vary over a sequence or series of aligners. For example, the initial (early) stages may be configured to have a lower maximum positive clearance than later stages, which may have greater maximum clearance. Any of these apparatuses may have greater positive clearance posterior than anteriorly. In some variations, the maximum positive clearance may taper from a maximum at the mid-palatal region towards the teeth.

For example, in some variations, the palatal region may be configured to have a clearance of greater than 0.1 mm from the patient's mid-palatal region when the device is worn by the patient.

Any of these apparatuses may include two or more attachment regions each configured to couple to an attachment bonded to the patient's teeth. Attachment regions may be openings, pits, slots, channels, or the like for securing to an attachment bonded to the patient's teeth. The attachment regions may be configured to secure to the patient's teeth, but to allow removal of the apparatus from the attachment by flexing a portion (e.g., a detachment region) of the palatal expander, which may be on the buccal side, including extending from the buccal side.

In general, as mentioned above, any of the palatal expanders described herein may include a variable thickness (e.g., transverse thickness perpendicularly between the opposite upper and lower surfaces). For example, the average and/or maximum thickness of the palatal region may be greater than the average or maximum thickness of the occlusal surface (e.g., the side worn against the occlusal surface of the teeth); the average or maximum thickness of the buccal surface (e.g., the side worn against the buccal surface of the teeth) may be less than the average or maximal thickness of the occlusal surface and/or the palatal surface. Alternatively or additionally, in some variations all or a portion of the occlusal surface may be cut away. In general, an anterior portion of the palatal region may have a different average thickness than a posterior portion of the palatal region. For example, the anterior portion of the palatal region may be thinner than a posterior portion of the palatal region; alternatively, the anterior portion of the palatal expander may be thicker than the posterior portion.

As mentioned, any of these apparatuses may include a hinge region on the buccal side or between the buccal side and the occlusal side configured to bend and release the tooth engagement region from the patient's teeth. The hinge region may be a local region in which the thickness and/or stiffness of the palatal expander is less than the nearby adjacent regions, so that when force is applied, e.g., pulling on the distal edge of the buccal side of the palatal expander, this hinge region will preferentially flex so that the attachment region may disengage from an attachment on the patient's teeth.

In general, any of the apparatuses described herein may include a visible identification marking on a surface of the palatal expander apparatus (including, but not limited to a posterior edge or surface), wherein the identification marking encodes one or more of: a patient number, a revision indicator, an indicator that the apparatus is a palatal expander or a retainer, and the stage of treatment.

As mentioned, any of these apparatuses may include an extension extending from the buccal side of the apparatus, wherein the extension is configured to extend adjacent and away from the patient's gingiva to form a gap of between about 0.25 and 1 mm when the apparatus is worn by a patient. The length of the extension may be determined so that it does not contact the inner cheek surface.

Any of these apparatuses may include a palatal region that has an upper convex surface (palatal-facing surface) having a first surface curvature, and a lower, concave (tongue-facing/lingual facing) surface having a second surface curvature that is smoother than the first surface curvature. The thickness of the palatal region may therefore across the different portions of the palatal region. In some variations, as described herein, the upper convex surface may have a first surface curvature comprising a plurality of grooves and ridges that correspond with grooves and ridges in the patient's palate (although they may be positively/negatively offset from them when worn, as discussed above). The lower, concave surface may have a second surface curvature that is smoother than the first surface curvature.

For example, a palatal expander apparatus for expanding a patient's palate may include: a pair of tooth engagement regions connected by a palatal region, wherein the palatal region is configured to apply between 8 and 160 N of force between the pair of tooth engagement regions when the apparatus is worn by the patient; and an extension extending from the buccal side, wherein the extension is configured to extend adjacent and away from the patient's gingiva when the apparatus is worn by the patient to form a gap of between about 0.25 mm and 1 mm; wherein the tooth engagement regions each comprise an occlusal side and a buccal side, further wherein the occlusal side is thinner than the palatal region, and the buccal side is thinner than the occlusal side, further wherein the palatal region is configured to have a clearance of greater than 0.1 mm from the patient's mid-palatal region when the device is worn by the patient.

A palatal expander apparatus for expanding a patient's palate may include: a pair of tooth engagement regions configured to attach over the patient's molars, wherein the tooth engagement regions are connected by a palatal region that is configured to apply between 8 and 160 N of force between the pair of tooth engagement regions when the apparatus is worn by the patient; further wherein the tooth engagement regions each comprise an occlusal side and a buccal side, further wherein the occlusal side is thinner than the palatal region, and the buccal side is thinner and more flexible than the occlusal side; and wherein the palatal region comprises an upper convex surface having a first surface topography; further wherein the palatal region comprises a lower, concave surface having a second surface topography that is smoother than the first surface topography.

The topography of the upper or lower surfaces of the palatal expander may refer to the surface contour. The smoothness of the topography may refer to the relative rate of change in height of the surface along the surface; smoother surfaces typically have a much rate of change of height compared to less smooth surfaces. The smoothness may be average or overall smoothness of all or regions of the surface.

In general, the first surface topography (e.g., the topography of the palatal-facing surface) may be configured to increase the structural integrity of the palatal region and provide between 8 and 160 N of force between the pair of tooth engagement regions when the device is worn by the patient. For example, the first surface topography may comprises a plurality of grooves and ridges configured to correspond to the grooves and ridges of the patient's palate. Alternatively or additionally, having the first surface topography correspond to the surface of the patient's palate may allow the palatal expander to sit on or adjacent (but offset from) the palatal expander more comfortably and/or closer than surface topographies with greater tongue clearance for an equivalent thickness of the palatal region than otherwise possible.

In some variations, the first surface topography comprises one or more lengths of increased thickness of the palatal region extending between the tooth engagement regions. For example, the palatal expander may include one or more full or partial struts extending laterally between the tooth engagement regions. In some variations the first surface topography comprises one or more lengths of increased thickness of the palatal region extending anterior to posterior.

For example, a palatal expander apparatus for expanding a patient's palate may include: a pair of tooth engagement regions connected by a palatal region and two or more attachment regions each configured to couple to an attachment bonded to the patient's teeth; wherein the tooth engagement regions each comprise an occlusal side and a buccal side, further wherein at least one of the buccal sides comprises a detachment region configured to be flexed to disengage at least one of the attachment regions from an attachment on the patient's teeth.

A palatal expander apparatus for expanding a patient's palate may include: a pair of tooth engagement regions connected by a palatal region and two or more attachment regions each configured to couple to an attachment bonded to the patient's teeth; wherein the tooth engagement regions each comprise an occlusal side and a buccal side, further wherein the occlusal side is thinner than the palatal region, and the buccal side is thinner than the occlusal side; and a hinge region on the buccal side or between the buccal side and the occlusal side configured to flex to disengage at least one of the attachment regions from an attachment on the patient's teeth.

Also described herein are palatal expander systems for expanding a patient's palate. These systems may include any of the palatal expanders described herein. Thus, described herein are systems including any of these apparatuses (and series of these apparatuses). For example, described herein are palatal expander systems for expanding a patient's palate, the system comprising: a template for positioning a plurality of attachments on the patient's teeth; a plurality of attachments configured to be held in the template; a plurality of palatal expanders forming a sequence of progressively increasing widths. In some variations, each palatal expander comprises a pair of tooth engagement regions connected by a palatal region and two or more attachment regions each configured to couple to one of the attachments, wherein the palatal region is configured to apply between 8 and 160 N of force between the pair of tooth engagement regions when worn by the patient, further wherein the tooth engagement regions each comprise an occlusal side and a buccal side, further wherein the occlusal side is thinner than the palatal region, and the buccal side is thinner than the occlusal side. Each of the plurality of palatal expanders may include a detachment region on a buccal side of at least one of the attachment regions, wherein the detachment region is configured to be grabbed and pulled to disengage at least one of the attachment regions from an attachment on the patient's teeth.

A system may include: a template for positioning a plurality of attachments on the patient's teeth; a plurality of attachments configured to be held in the template; a plurality of palatal expanders forming a sequence of progressively increasing widths, wherein each palatal expander comprises a pair of tooth engagement regions connected by a palatal region and two or more attachment regions each configured to couple to one of the attachments, wherein the palatal region is configured to apply between 8 and 160 N of force between the pair of tooth engagement regions when worn by the patient, further wherein the tooth engagement regions each comprise an occlusal side and a buccal side, further wherein the occlusal side is thinner than the palatal region, and the buccal side is thinner than the occlusal side; wherein each of the plurality of palatal expanders includes a detachment region on a buccal side of at least one of the attachment regions, wherein the detachment region is configured to be flexed to disengage at least one of the attachment regions from an attachment on the patient's teeth.

Also described herein are methods of expanding a patient's palate using a series of patient-removable palatal expanders, the method comprising: sequentially wearing each of a plurality of palatal expanders except a last palatal expander from the series of patient-removable palatal expanders in a predetermined sequence of progressively increasing widths, wherein: each palatal expander comprises a pair of tooth engagement regions connected by a palatal region and two or more attachment regions, wherein the tooth engagement regions are worn over the patient's teeth with the attachment regions coupled to attachments on the patient's teeth, wherein the palatal region applies between 8 and 160 N of force between the pair of tooth engagement regions when worn by the patient, further wherein the tooth engagement regions each comprise an occlusal side and a buccal side; each palatal expander is worn for between 0.5 and 14 days; and each palatal expander is removed by pulling a disengagement region extending at least 0.25 mm from the patient's gingiva on the buccal side to disengage at least one of the attachment regions from the attachment on the patient's teeth; and wearing a holder palatal expander corresponding to the last palatal expander for greater than 14 days. The phrase "wearing the palatal expander for . . . days" typically does not require continuous (e.g., uninterrupted) wear, but may include removing the palatal expander for routine cleaning (e.g., disinfection of the apparatus, washing of the apparatus, tooth brushing, etc.). Thus wearing the apparatus may include removing the apparatus for less than some percentage (e.g., 2%, 5%, 7%, 10%, etc.) of the time worn during that period (e.g., for a few minutes to an hour a day, etc.

BRIEF DESCRIPTION OF THE DRAWINGS

The novel features of the invention are set forth with particularity in the claims that follow. A better understanding of the features and advantages of the present invention will be obtained by reference to the following detailed description that sets forth illustrative embodiments, in which the principles of the invention are utilized, and the accompanying drawings of which:

FIG. 1A is a front perspective view of a bottom side (tongue-facing side) of the palatal expander, shown attached on a model of a patient's upper dental arch. FIG. 1B is a back perspective view of the palatal expander of FIG. 1A. FIG. 1C is another back perspective view of the palatal expander of FIG. 1A. FIG. 1D is a front side perspective view of the palatal expander of FIG. 1A. FIG. 1E is a side perspective view of the palatal expander of FIG. 1A. FIG. 1F is another back perspective view of the palatal expander of FIG. 1A. FIG. 1G is a top perspective view of the palatal expander of FIG. 1A, showing the tooth-receiving cavities and the palate-facing top surface.

In FIG. 8B, a hinged region is shown between the occlusal region and the buccal end of the palatal expander, preferentially bending when force is applied to pull the buccal segment (e.g., the detachment region on the buccal segment) to pull the apparatus away from the teeth.

FIG. 9A shows another example of a palatal expander with a section through an xy plane, as shown in FIG. 8A. FIG. 9B shows the trans-palatal region of the palatal expander in the xy plane, showing different thicknesses (TH) perpendicular to the palatal-facing side of the device.

FIG. 10A is an example of a palatal expander with a section through a zy plane (midline section). FIG. 10B shows an example of a cross-section through the zy plane section of the palatal expander in the zy plane of FIG. 10A, showing the thickness through the palatal expander between the posterior end (posterior facet) and the anterior end (anterior facet).

In FIG. 17A, the side perspective view of the subject's teeth shows two attachments. These attachments may be generally sectioned, truncated and sectioned cylindrical attachments for retaining the palatal expander to the teeth. Four attachments (two per side) are included in this example. FIG. 17B is a side perspective view of the attachments and teeth, showing the pitch angle of the top surface of the attachment. FIG. 17C is a side view of the tooth and attachment, showing the global angulation angle (the angle of the bottom portion of the attachment and the tooth (or a mid-plane through the tooth). FIG. 17D is an example of a side perspective view, showing the prominence of the attachment (e.g., the distance from the surface of the tooth that the attachment extends). FIG. 17E is another side perspective view, showing the distance from the gingiva to the attachment on the tooth. The dimensions shown in FIGS. 17A-17E are exemplary and approximately only; these distance may be +/−5%, 10%, 15%, 20%, 30%, 40%, 50%, etc.

In FIG. 18A, the scan includes at least 2-3 cm beyond the distal edge of the permanent molars; this distance is missing in the scan of FIG. 18B.

In FIG. 19A, at least 3×3 mm of the lateral wall is scanned; in FIG. 19B, less than 3×3 square regions are digitally scanned.

In FIG. 20A, at least 5 mm of the gingival region below the cementoenamel junction (CEJ) line. FIG. 20B shows a scan that does not include as much of the gingival region, particularly in the posterior region, e.g., around the molars.

FIG. 29 is an example of an expander including a cut-out region (shown here as a slit) that is not connected to an opening.

FIGS. 30A-30H illustrate a variety of examples of openings and cut-out regions and attachments between an expander and a patient's teeth or an attachment on a patient's teeth (e.g., connections between the patient's teeth and an expander appliance), including openings having different sizes and/or shapes.

FIG. 31B shows a section through line A-A of FIG. 31A.

in FIG. 40, the method uses a single lamination layer.

DETAILED DESCRIPTION

Figure 1A:
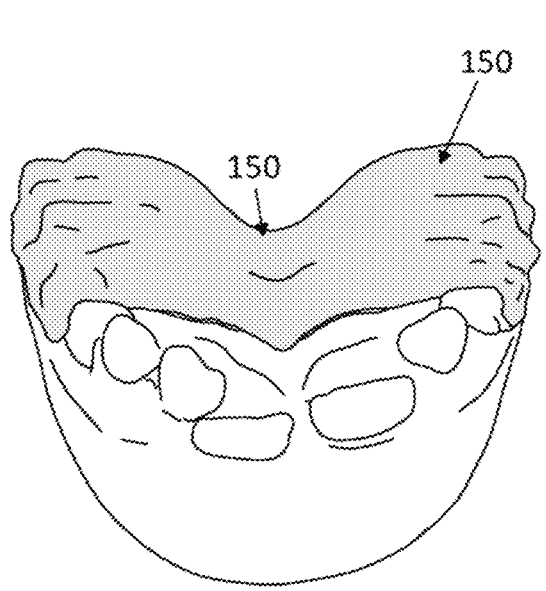
FIGS. 1A-1G illustrate an example of a palatal expander that may be part of a series of palatal expanders used to expand a patient's palate.
Figure 1B:
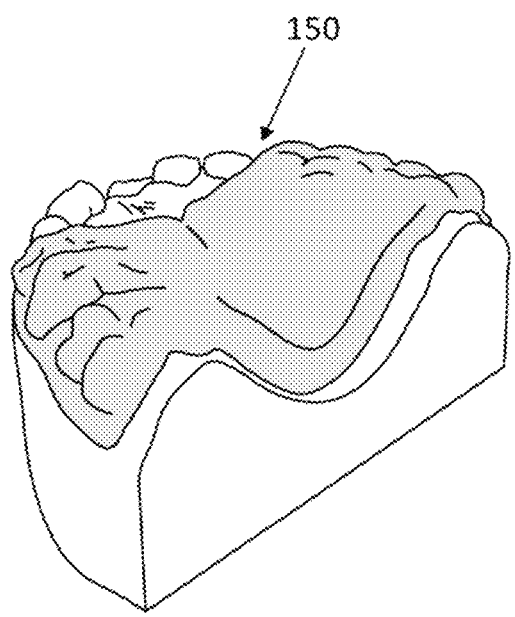
Figure 1C:
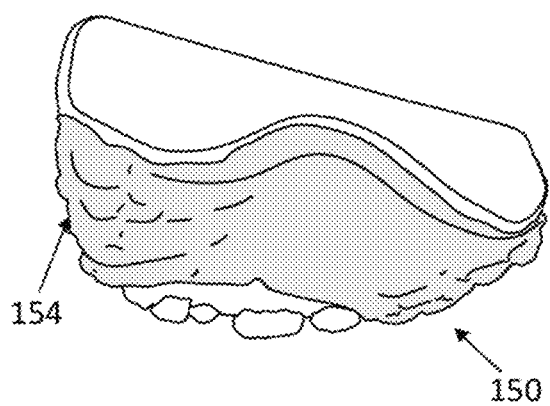
Figure 1D:
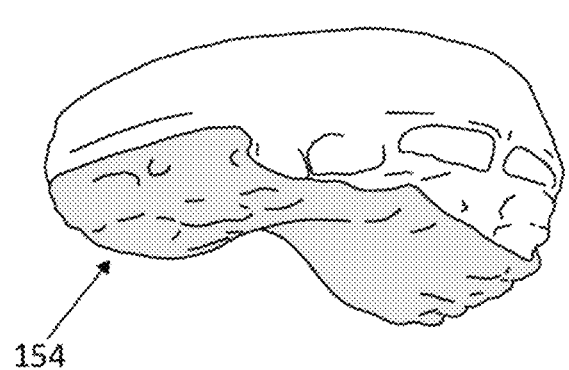
Figure 1E:
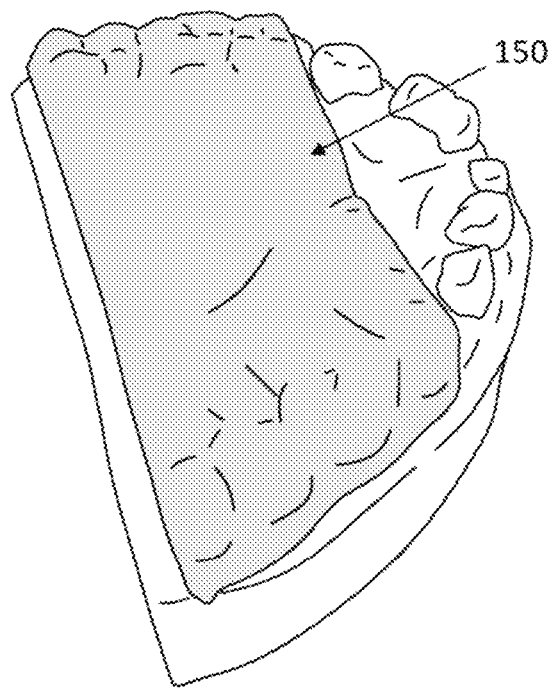
Figure 1F:
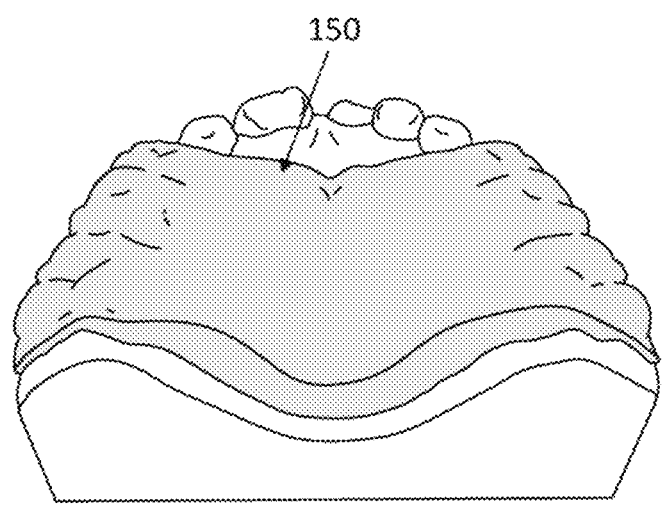
Figure 1G:
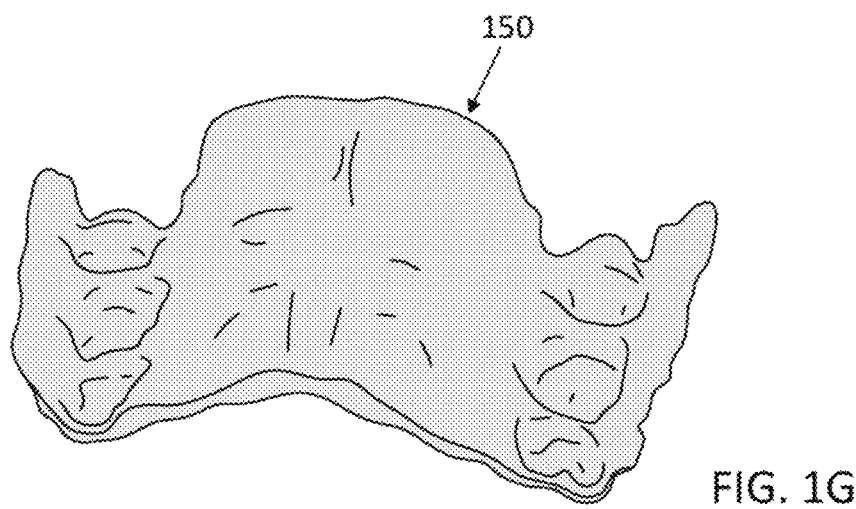

In general, the palatal expansion apparatuses described herein are worn as a series of expanders by a patient. These palatal expanders may be configured to apply force within the patient's mouth to expand the patient's maxilla. The patients may be any appropriate patient, and particularly children from ages 7 to 9 years old, e.g., following eruption of the first permanent molars. These apparatuses may be used to expand the patient's palate between 4 and 12 mm or more. In use, the series of palatal expanders may be applied and/or removed by the patient (or a caregiver, e.g., parent) and may be adapted for securely attaching to the patent's teeth securely, having sufficient strength to move the patient's teeth, while being removable without excessive force or difficulty (e.g., using a finger and/or tool to remove). The apparatus may attach over the patient's last three teeth (e.g., first permanent molar and first and second primary molars). In general, the apparatus should be strong enough to create sufficient force to open the patient's suture, e.g., apply between 8 N and 120 N (or greater than 8 N, greater than 9 N, greater than 10 N, greater than 20 N, greater than 30 N, greater than 40 N, greater than 50 N, greater than 60 N, etc.) against either side of the upper palate and/or lingual side of the teeth.

In any of the apparatuses and methods described herein, the apparatus may be configured so that it may be both securely attached to the patient's teeth, either with or without connecting to attachments bonded to the patient's teeth, while still being readily removable by the patient and/or caregiver. For example, the buccal sides of the apparatus may be flexible, e.g., by being thinner than the occlusal side and palatal region, and/or by including a hinge region that is configured to be pulled away from the teeth and/or attachments on the teeth to disengage the apparatus. In some variations, the apparatus may include slots or slits on either side of the attachment mating regions extending up from the bottom edge of the apparatus. In some variations the apparatus may include a hinge region between the buccal side and the occlusal side (or on the buccal side above the attachment mating region).

Any of the apparatuses described herein may be configured so that the upper, convex surface of the palatal region matches the patient's palate, e.g., including any grooves, ridges, troughs, etc. that are present in the patient's particular anatomy. The upper convex surface may match the patient's palate, but may be configured to be separated or offset from it, e.g., by 0.5 mm or more, particularly at the more central region (e.g., opposite from the palatal midline suture). In some variations the apparatus may be offset from the patient's palate, and force may be applied primarily against the lingual sides of the teeth (e.g., molars); alternatively or additionally, the apparatus may be configured to apply force against the lateral side regions of the palate, above the molars; in this case, the upper convex surface of the palatal region may be configured to have a negative offset, e.g., may push against the palate, when worn.

The bottom, concave, surface of the palatal region may have a different surface profile compared to the upper surface. In particular, apparatuses in which the bottom, concave, surface if smooth compared to the upper surface may be much more comfortable. For example, the bottom, concave surface, which faces the patient's tongue, may lack the grooves, ridges and/or troughs present on the opposite, upper surface. Instead, the bottom, concave, surface may be substantially free from perceptible projections, lumps, or indentations. In some variations, the bottom, concave surface can be considered a filtered version of the top, convex surface that is opposite to the bottom surface; the bottom surface is smoothed (e.g., by a smoothing function) compared to the opposite, top surface, in order to avoid any rapid changes in surface due to, for example, grooves, ridges, etc. Smoothing the bottom surface in this manner may enhance patient comfort while avoiding speech problems.

The palatal expanders described herein may be formed of a single, monolithic material (e.g., by a 3D printing technique, etc.) or they may be formed in parts, e.g., by layering, thermosetting, etc. The apparatuses (e.g., devices, systems, etc.) may have a variable thickness, particularly in the palatal region and/or the tooth-receiving portions. For example, the palatal region may be thinner in more anterior regions (e.g., the anterior half) compared to more posterior regions (e.g., the posterior half). This may allow a more comfortable fit, allowing room for the patient's tongue. Alternatively, the posterior half of the apparatus may be thinner than the anterior half. The posterior portion may be curved inward (e.g., toward the anterior region), or may include a cut-out region in the posterior end.

In particular, described herein are palatal expansion apparatuses and methods of using (applying them, removing them, treating a patient to expand the patient's palate, etc.) and forming them. These apparatuses may be configured to apply either 'slow' expansion (e.g., around 8-10 N of force between the molars on either side of the upper jaw of the mouth), or 'rapid' expansion (e.g., greater than about 60 N for higher speed expansion, including between 70-160 N, etc.). In some variations, the apparatuses may be configured to drive displaced and/or force. For example, any of these apparatuses may be configured to drive displacement of between about 0.25 mm/day (when worn for a 24 hour wear time). These apparatuses (e.g., devices) may form a series of devices that may be used to displace the palate, expanding it and causing transverse force between the molars on either side of the mouth.

Any of these palatal expander apparatuses described herein may include a gap or offset between the upper surface of the mouth (the palatal surface) and the palatal expander. This offset may be, for example, between 0.1 mm and 10 mm (e.g., between 0.2 mm and 9 mm, between 0.3 mm and 9 mm, between 0.5 mm and 8 mm, between 1 mm and 7 mm, between 2 mm and 5 mm, etc., including any region or sub-regions there between). This gap may prevent soft tissue irritation. The gap may extend over 50% of the portion of the apparatuses that are positioned opposite of the patient's palate, when worn by the patient (e.g., over 60%, over 70%, over 80%, over 90%, over 95%, etc.). In some variations, the shape of the palatal portion of the expander (e.g., the portion opposite the patient's palate when worn by the subject) may be contoured on the patient-facing side) to match the contour of the patient's palate (either with or without an offset, as just described).

As will be described in greater detail below, the shape of the apparatus (e.g., the expander), and therefore the load applied by the apparatus when worn, may be controlled and selected during the fabrication process. It may be particularly advantageous to provide a digital planning process in which a digital model of the patients upper jaw (e.g., teeth, palate and gingiva), and in some cases the subject's lower jaw (e.g., teeth and/or gingiva) may be modified to plan the series of expanders that morph between the patient's initial anatomy to an expanded configuration in which the final expanded configuration is described. Previous attempts to digitally design palatal expanders have been hampered by the inability to accurately model the palatal expansion and the teeth movement/position, and therefore have been unable to rigorously model the overall effects on the teeth and palate as well as the resulting forces applied to the various portions of the patient's mouth. These attempts have also ignored the effect on the lower jaw, and in particular the interaction between the lower and upper jaw. Superior results may be achieved by accurate digital modeling of the teeth, gingiva and palate (and in some variations the lower jaw), and by controlling the planned movement (e.g., expansion of the palate, which may be expressed as the separation between the molars) and the forces acting on one or more of the teeth, palate and/or gingiva. In addition, the expander may also be digitally modeled, including modeling both the shape (dimensions, including thickness, curvature, attachment points, etc.) and the material(s) used. Thus, the expander(s) in a series of expanders may be accurately and in some cases automatically, configured so that they achieve the desired palatal expansion within predetermined (or user/ physician/technician) adjustable parameters such applied expansion force (e.g., between x and y N, less than y N, etc., where x is about 5, 6, 7, 8, 9, 10, 15, 20, 25, 30, 35, 40, 45, 50, etc. and y is about 10, 20, 30, 40, 50, 60, 70, 80, 90, 100, etc.), the location of applied forces in the patient's mouth (e.g., upper lateral portion of the molars, mid-lateral portion of the molar, lower lateral portion of the molars, gingiva, palate, etc.) and/or portions of the patient's mouth to avoid contact (e.g., gingiva, palate, mid-palate, lateral palate, etc.).

Expander Features

Figure 23:
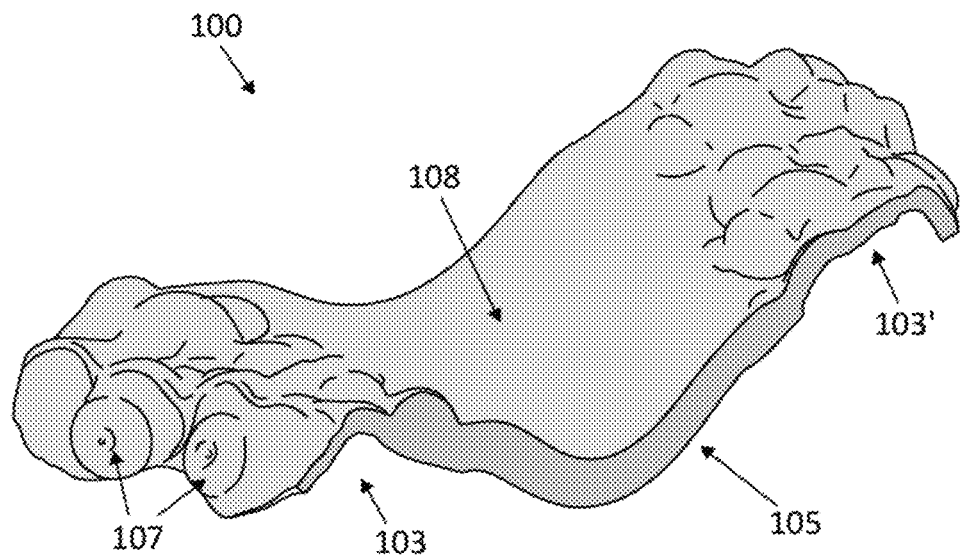
FIG. 23 illustrates one example of a palatal expander including an enclosed attachment that may aid in retention within the oral cavity.

The palatal expanders described herein may include a tooth engagement region for engaging at least a portion of the teeth in the patient's upper jaw, in particular the molars, and a palatal region extending between the tooth engaging region that is configured to be positioned adjacent and opposite from the patient's palate when the device is worn by the patient. For example, FIG. 23 shows an example of a palatal expander 100 that includes a pair of tooth engagement regions 103, 103' on either side of the device, connected by a palatal region 105. In this example, the palatal expander also includes a pair of attachment regions (attachment coupling regions) 107 that may couple with a pair of attachments (e.g., attachment connectors) bonded to the patient's teeth on either side of the device (on a buccal side of the patient's teeth; only one pair is visible). The attachment connectors may also referred to herein as a connectors, pins, attachments, or the like, and may be secured to the teeth in a position that allows it to couple (e.g., removably couple) to the attachment region(s) on the expander. An attachment connector may be bonded (glued, etc.) to the teeth as part of an initial step prior to wearing the series of expanders. In FIG. 23, the bottom, concave surface 108 is shown; the opposite surface is the top, convex surface.

The tooth engagement regions may be formed of the same material(s) as the palatal region, or they may include different materials. The thickness of the tooth engagement regions and the palatal regions may be different or the same. In particular, the palatal region may be thicker than the tooth engagement region. The thickness of the tooth engagement region may be thicker along the lateral (e.g., buccal and/or lingual) sides of the device and thinner (or removed from) across all or a portion of the top of the tooth engagement region. The palatal region may have a non-uniform thickness. For example, the palatal expander may be thicker near the midline of the device. Any of the palatal expanders may include ribs or other supports (e.g., extending transversely between the tooth engagement regions and/or perpendicular to the tooth engagement regions). These ribs may be formed of the same material as the rest of the palatal region (e.g., but be thicker and/or shaped to have a cylindrical cross-sectional profile).

The inner (cavity) portion of the tooth engagement region is typically configured to conform to the outer contour of the patient's teeth, and to rest directly against the teeth and/or a portion of the gingiva (or to avoid the gingiva) to apply force thereto. The upper surface of the palatal region which is positioned adjacent to the palate when worn by the patient may be contoured to match the actual or predicted shape of the patient's palate. As mentioned above, all or a significant portion of the palatal region may be separated or spaced from the patient's palate when worn, which may enhance comfort and minimize disruption of speech.

In some variations, a portion of the palatal region extending between the opposite toot engagement regions on either side of the device (e.g., a portion of the palatal region extending approximately z % of the distance between the tooth engagement regions, where z is greater than about 30%, 40%, 50%, 60%, 70%, 80%, 90%, etc.) may be flat or straight, rather than curved, so that it does not necessarily follow the contour of the patient's mouth. This portion may be one or more transverse ribs, struts or supports, or it may be the flat sheet. Such a flat or straight portion may provide increase force. Alternatively or additionally, the palatal region (e.g., one or more ribs, the sheet, etc.) may be curved in an arc similar to the arc of the patient's palate, but may have a much larger radius of curvature (appearing as a shallower concavity) than the patient's palate.

Any of the palatal expanders described herein may include one or more attachment regions or sites (also referred to herein as attachment opening, attachment couplers, etc.) for coupling to an attachment connector on the patient's teeth. In particular, it may be helpful to use one or more (e.g., a pair) of attachment regions on each side of the device. Furthermore, the attachment sites may preferably be openings through the expander. An open structure (attachment site) on the orthodontic expander may interact with attachments (attachment connectors) located on teeth to improve the overall retention of the appliance and in some cases may be used to generate advantageous force features for teeth alignment, including limiting or preventing rolling of the teeth buccally as the palate is expanded. Such features may be helpful, in particular, when included as part of a directly fabricated (e.g., 3D printed) device for rapid (e.g., phase 1) palatal expansion. Described in FIGS. 23-31 are examples of attachments (e.g., attachment connectors/attachment sites) that may be used as part of any expander.

Further, although the attachment connector is typically bonded to one or more teeth and projects into a complimentary opening or cavity on the expander, this configuration may be revered in some or all of these; for example, the protruding attachment connector may be part of the expander which may insert into an opening/cavity bonded to the user's teeth.

Any appropriate attachment region may be used, and in particular any appropriate size and/or shape may be used. As mentioned, the attachment region may preferably be an open structure on the appliance which may improve retention of the appliance over the attachments and possibly include force features for teeth alignment. For example the attachment region may comprise a round, oval, square, rectangular, triangular, etc. opening through the expander (e.g., at a lateral, e.g., buccal, side of the tooth regaining region of the expander. The attachment region may be keyed relative to the attachment connector; in general the attachment connector may be configured to mate with the attachment region in one or a particular orientation.

An open attachment region may reduce non-compliance of the appliance to poorly cured attachments. The open structures may enable complete coverage over a pre-determined attachment shape and size. Any of these attachment region/attachment connector couplings may incorporate biomechanical force features with this appliance/attachment interaction, including, as described above, keyed regions that transmit rotational force in the plane of the opening (e.g., against the surface of the tooth), for example. In some variations the attachment connector may snap or couple into the attachment region in a manner that requires a force to disengage the coupling.

Figure 24:
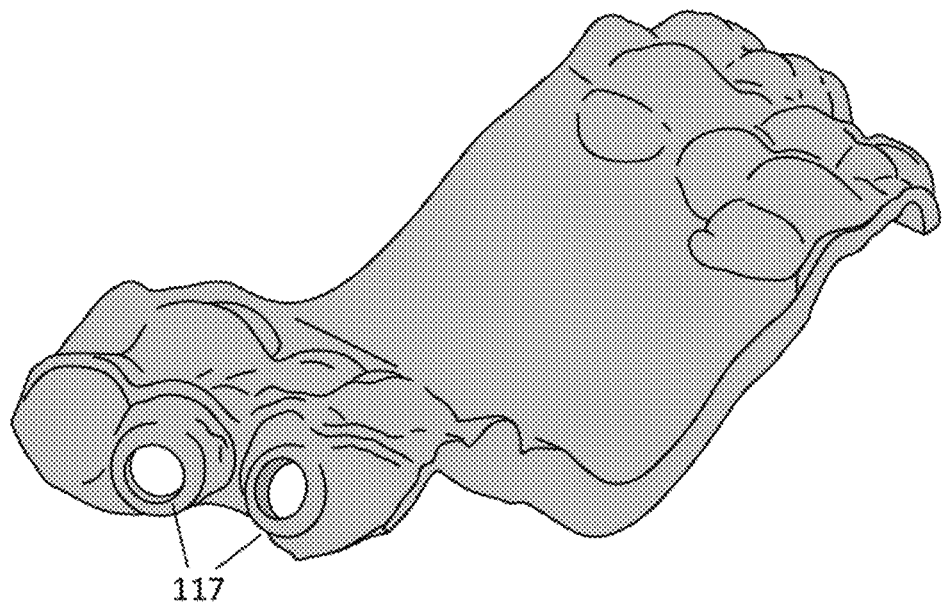
FIG. 24 is an example of a palatal expander having open attachments for retention and application of force.

As shown in FIG. 23, a conventional appliance design may enclose the attachment that helps maintain retention in the oral cavity. Alternatively, the variability in the size of these attachment regions due to appliance fabrication (e.g., thermoforming, direct fabrication, etc.) may be reduced by creating an open structure, as shown in FIG. 24. In FIG. 24, the separator is otherwise quite similar to what is shown in FIG. 23, but includes two open attachment regions 117.

Figure 25:
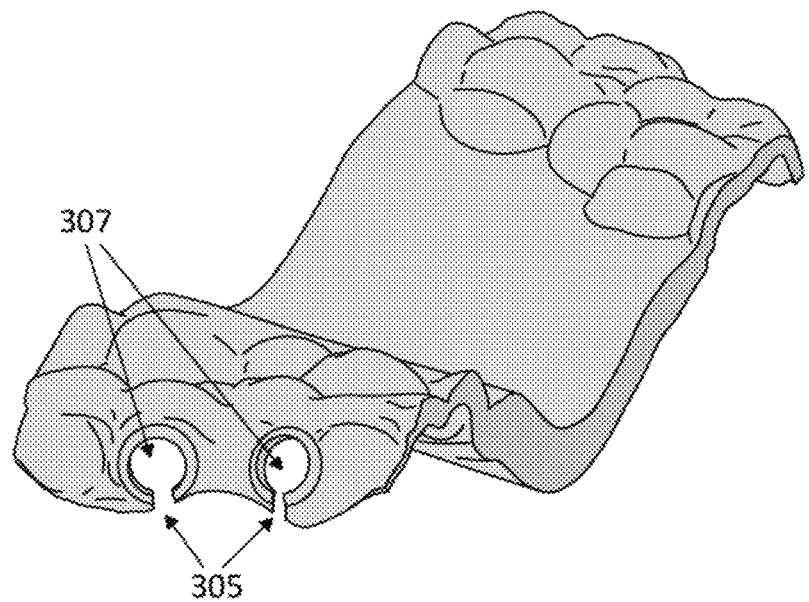
FIG. 25 shows an example of a palatal expander including open attachments and cut-out regions (shown here as slits into the open attachments).

In any of the apparatuses described herein, the device may also include one more cut-out regions in which the cut-out region (e.g., slot, slit, etc.) opens to a side or edge of the apparatus. A cut-out feature such as this may increase the flexibility of the adjacent region, such as the buccal surface. When connected to or adjacent to the attachment region opening, as shown in FIG. 25, this configuration may increase or decrease the retention to the attachment. In FIG. 25 cut-out region (slits 305) have been added to the open structures 307 to increase the flexibility of the appliance over the attachments.

Figure 26:
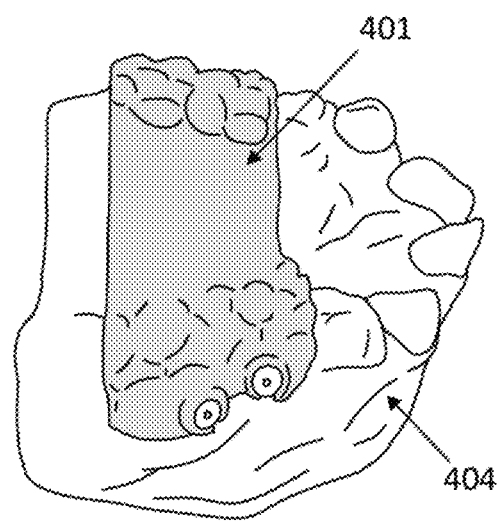
FIG. 26 is another example of an apparatus including slits connected to the open attachments in the expander, shown coupled to attachments (pins) on a mode of a patient's teeth.

FIG. 26 illustrates another example of a cut-out region (slit) between an opening (attachment region) adapted to couple with an attachment connector. In this example the attachment connector and coupling region are connected to secure the expander 401 to a (model of) patient's teeth 404.

Figure 27:
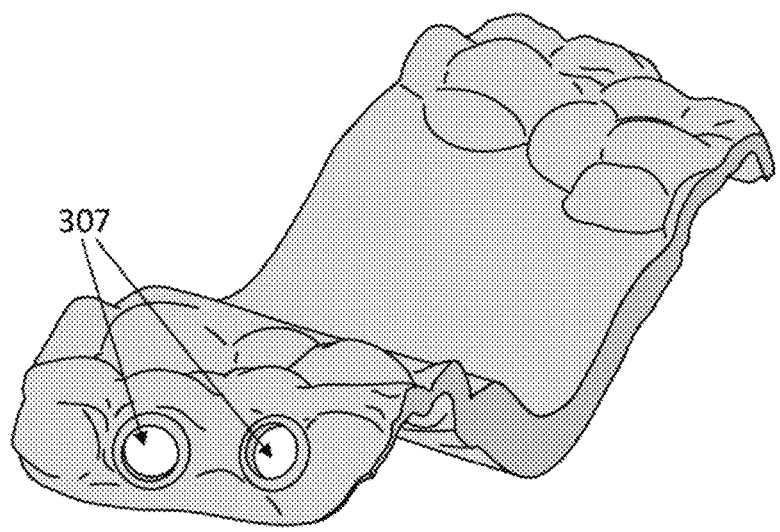
FIG. 27 is an example of an expander having open attachments that are positioned further from the edge of the apparatus (e.g., either by moving the bottom edge, or cut-line, closer to the gingiva or by moving the openings further up the teeth).

Another example of an expander with attachment regions comprising opening through the expander on the buccal side is shown in FIG. 27. The attachment regions may be formed at any location of the expander, including in particular the buccal side of the tooth engaging region. In FIG. 27, the openings are arranged up from the edge region of the buccal side of the tooth engagement region, so that the "cut-line" (when forming as a direct fabrication piece) above or at the gingival edge has been lowered to increase the mechanical strength around the open holes 307 to increase retention.

Figure 6:
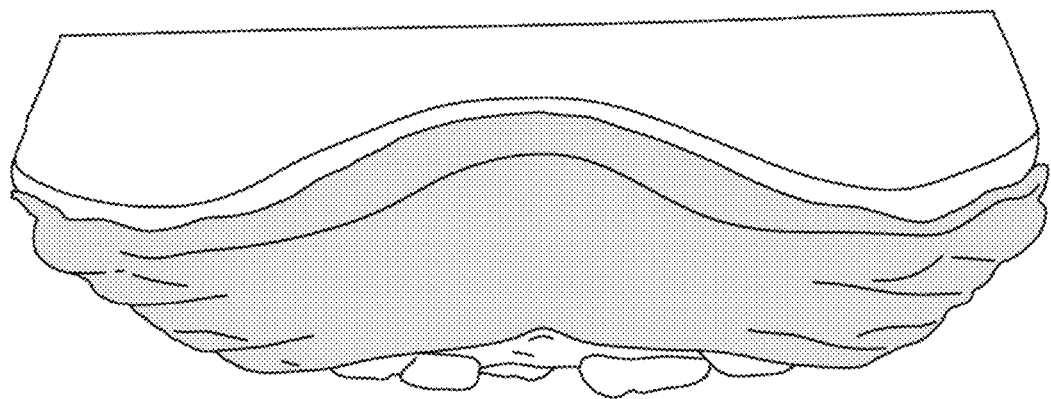
FIG. 6 is an example of a holder (e.g., a passive expander or retainer).
Figure 28:
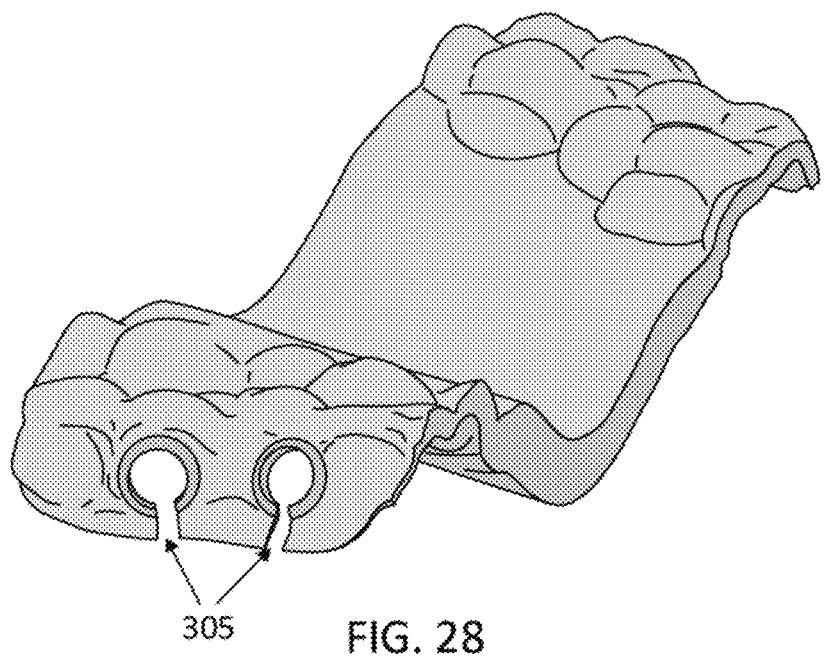
FIG. 28 shows an example of the apparatus of FIG. 5 including cut-out regions that may enhance flexibility and/or ease of application.

FIG. 28 shows the example of FIG. 27 with the addition of slits 305 to increase flexibility of the device at the edges (but not the palatal region) which may make it easier and faster to put on and/or remove. In FIG. 29, a slit between the open holes are added to created another dimension of flexibility that is different from that shown in FIG. 28. In FIG. 29 the slit is located between the two open attachment regions 30; alternatively or additionally slits (which typically run perpendicular to the edge of the device) may be located on one or both sides of the opening and/or into the openings, as shown in FIG. 6.

Figure 30I:
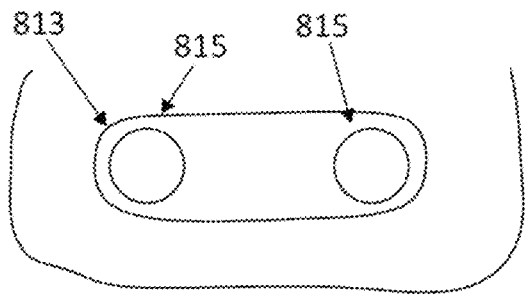
FIGS. 30I-30N illustrates further examples of openings, cut-out regions and attachments on a patient's teeth (e.g., connections between the patient's teeth and an expander appliance).
Figure 30J:
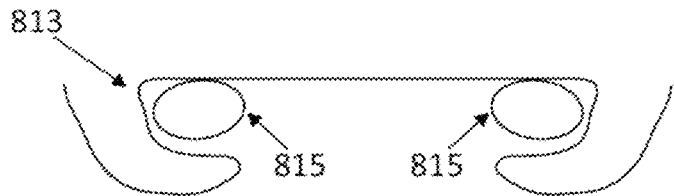
Figure 30K:
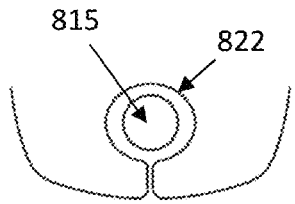
Figure 30L:
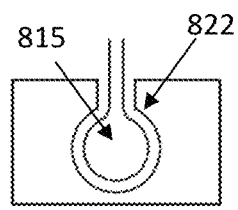
Figure 30M:
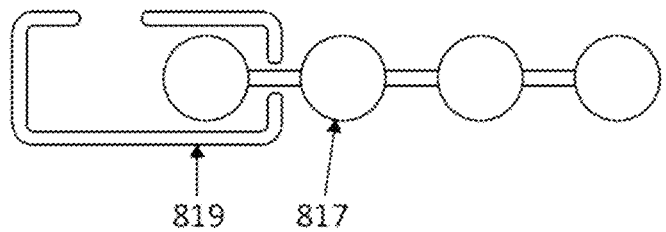
Figure 30N:
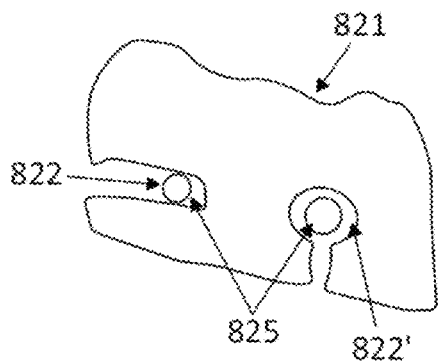

FIGS. 30A to 30N illustrate a variety of examples (unordered) of attachment sites. In some variations the attachment site is configured as a hook 803 (see FIG. 30B) attaching around an attachment connector 805 (e.g. post, protrusion, etc. connected to the tooth 804). Alternatively the attachment site may be a channel 807' (FIG. 30C) or a keyed region 807 (FIG. 30A) in the palatal expander body 802 (e.g., the buccal side of the palatal expander) for engaging the attachment connector 805. Alternatively or additionally, the attachment site 809 on the palatal expander may be configured to snap onto the attachment connector 806 (e.g., FIGS. 30E-30H), which may be tapered as it approaches the tooth surface. Any of the attachment connectors/attachment sites shown maybe configured so that multiple attachment connectors 815 couple with one attachment site 813. In some examples, the attachment site and/or attachment connector may be configured to allow adjustment/readjustment of to tighten/loosen the connection. For example, a plurality of attachment connectors 817 (e.g., FIG. 30M) may connected together in a manner that allows the user or patient to select which of the plurality of attachment connectors engage with the attachment site (or sites) 819. Alternatively or additionally the device 821 may include a plurality of attachment sites 822, 822' (e.g., FIG. 30N) that are oriented with slots/slits in different directions so that the two or more attachment connectors 825 can be inserted and allow a torqueing or other directional forces (rotational, etc.) to be applied by the device against the teeth. As shown in FIGS. 30A to 30N, extended open hole structures 813, 807 may be present between attachment connectors, and/or the coupling sites may be configured as dual and single hook 803 systems. In coupling attachments in which the coupling region includes a hole and slit may be modified so that the slit is tapered to increase retention. Examples of key and lock systems in different geometries are also shown. As mentioned, the attachment region may be alternatively positioned on the tooth and the attachment connector may be on the appliance (device). Any of these designs may be used to control moments and forces for teeth movement.

Figure 31A:
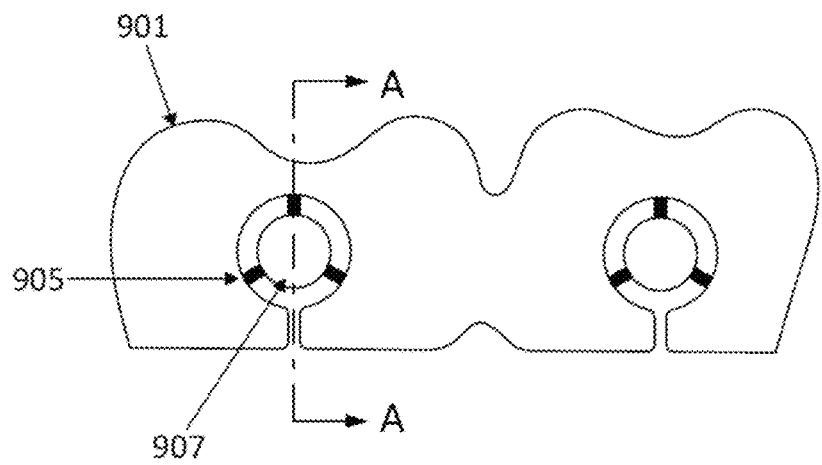
FIGS. 31A and 31B illustrate a portion of a palatal expander including a plurality of openings to connect to attachments on the patient's teeth; in this example the openings of the expander initially include the attachment to be bonded to the patient's teeth, which are connected by one or more tabs that can be disconnected, broken, or removed to leave the tab behind on the patient's tooth. This may be useful for properly attaching the connector attachment to the patient's tooth.
Figure 31B:
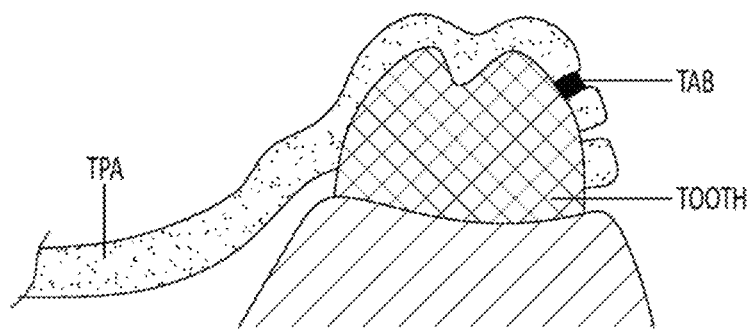
Figure 32:
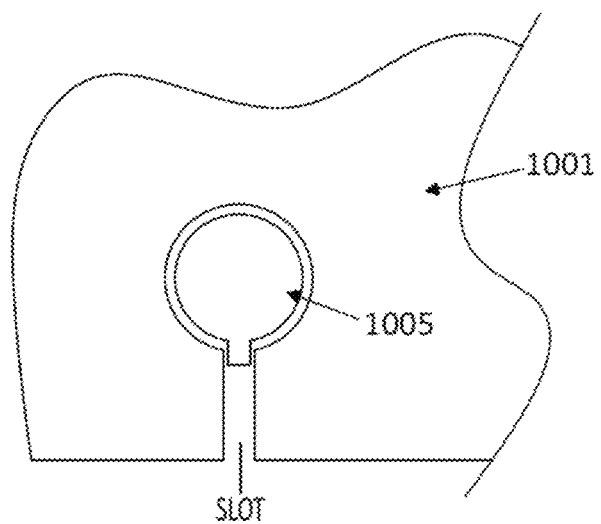
FIG. 32 is another example of an expander including an attachment that can be included as part of the expander (shown here as a separate element held within the opening of the palatal expander) for application to the teeth as a guide or template.

In variations in which the attachment connector (e.g. post) is bonded to the patient's tooth, the connector may be attached using an exemplary expander (the expander maybe provided as a "zero" expander in the sequence, in which the palate is not yet being expanded). This expander may act as a template to position the attachment connectors on the teeth, as illustrated in FIGS. 31 and 32. In FIG. 31, the attachment connector(s) are included together with the palatal expander 901 which may be used as the placement vehicle (template). The attachment connector 907 may be printed with the expander (including the attachment region), such that one or more tabs 905 (e.g., removable, frangible, severable, etc. tabs) extend from the attachment region having an opening (hole) feature in the palatal expander 901 to an attachment connector. The tab in this example is a small tabs or sliver of material. The tabs will be cut/removed after bonding the attachment connector 707 to the teeth. The tabs be made of a dissimilar material than the palatal expander (or of the same material) and/or the attachment connector 907 may be made of the same or a different material as the expander and/or the tabs. The attachment connector may be designed with a custom buccal surface contour to make the buccal fit more precise.

FIG. 32 illustrates another example of an apparatus including an attachment region that is an opening or hole feature in the palatal expander 1001; this example may also act as a bond template for a preformed attachment connector 1005, which in this example is not attached to the expander/template with tabs. In this example, the attachment connector(s) may be fabricated separately (out of another material and/or process, or out of the same material and/or process) but the expander may include a customized connector region (hole feature) that includes a positioning feature to orient the attachment connector 1005 so that the patient's buccal surface contour lines up. The attachment connector may be designed so that the buccal surface contour and positioning feature align for accurate placement.

Once the series of palatal expanders is designed, including digitally (or in some variations, manually), the individual devices forming the series may be fabricated. Described herein are a variety of fabrication methods that may be used. Any of these fabrication methods may be combined or modified in view of the other fabrication methods or parts of these fabrication methods. Different expanders in a patient series may be fabricated by the same method or by different methods.

Figure 4A:
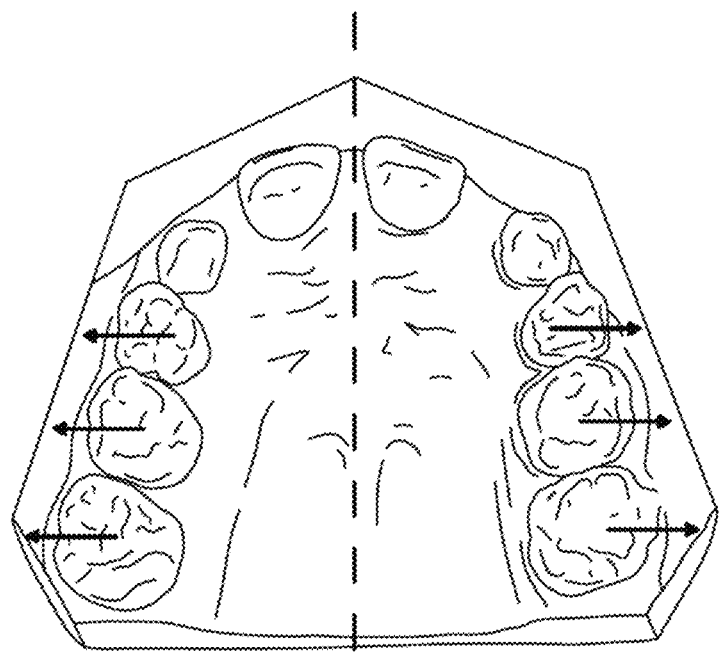
FIG. 4A shows translational forces that may be applied to a patient's palate (arrows) to expand the palate, braking and separating the palatal midline suture (e.g., median palatine suture, etc.).

FIGS. 1A-1G illustrate an example of a palatal expander 150, shown from different perspectives. These or similar palatal expanders may include any of the features described herein, separately or collectively. In this example, the palatal expander is configured as a removable, e.g., patient-removable (with or without the use of a removing tool) that may be formed of any appropriate material, including, e.g., a biocompatible nylon material. The examples shown in FIGS. 1A-1G were 3D printed. A series of palatal expanders may be used and incrementally staged to expand a patient's palate. In particular, the methods and apparatuses described herein may be configured for treatment of children and young adults. The palatal expanders may be configured so that the transpalatal arch region 152 balances the load deflection for patient comfort. For example, transverse forces may be distributed across three posterior teeth on each side, as shown in FIG. 4A, and or on a lateral side of the palate. The occlusal surface 154 thickness may be optimized for structural integrity and patient comfort. The palatal expander apparatus may include a plurality of attachments (not visible in FIGS. 1A-1D). The attachments may be configured to allow easy appliance insertion and retention. As will be described in greater detail herein, the palatal expanders may also include one or more removal features to allow the patient to remove the apparatus once attached.

As mentioned above in the additional detail below, the forces applied by the apparatus to expand a patient's palate may be applied to the teeth (e.g., the lingual side of the D, E or 6 teeth, as in FIG. 16A) and/or the palate, and particularly the lateral side of the palate, above gingival line but below the midline, either uniformly along the anterior-to-posterior direction (typically symmetrically on either side of the midline) or at different regions along the anterior-to-posterior direction.

In any of the palatal expanders described herein, openings or holes formed through the palatal expander may be included. For example, in some variations the region of the palatal expander otherwise covering the occlusive surface of the patient's teeth may be removed. For example, allowing a more natural bite. In some variations, the anterior (front region) of the palatal region extending between the opposite sides of the upper arch (e.g., the opposite tooth-receiving portions of the apparatus) may be removed or curved inward, so as to avoid interfering with speech. Alternatively or additionally, the poster (e.g., back) end of the palatal expander may be removed or curved in, anteriorly, to minimize or reduce invoking a gag reflex. In any of these variations the thicknesses may also be adjusted in addition or alternatively. For example, the thickness in the posterior region (e.g., the back 10%, 20% 30%, etc.) of the palatal expander may be thinner than the more anterior regions.

Figure 2A:
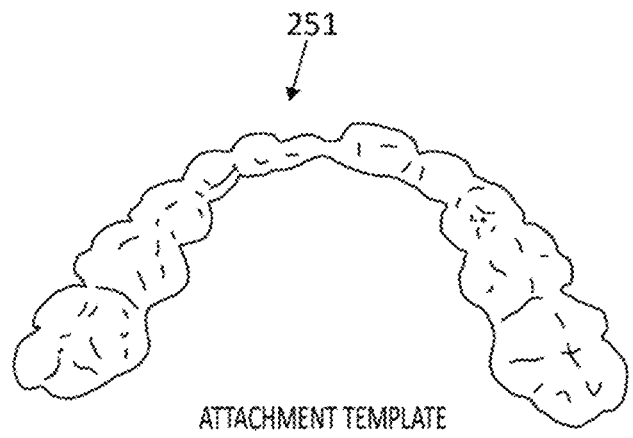
FIGS. 2A-2C illustrate a system for expanding a patient's palate, including an attachment template (shown in a perspective view in FIG. 2A), series of progressive palatal expanders (shown in FIG. 2B) and a passive holder (e.g., retainer shown in FIG. 2C).
Figure 2B:
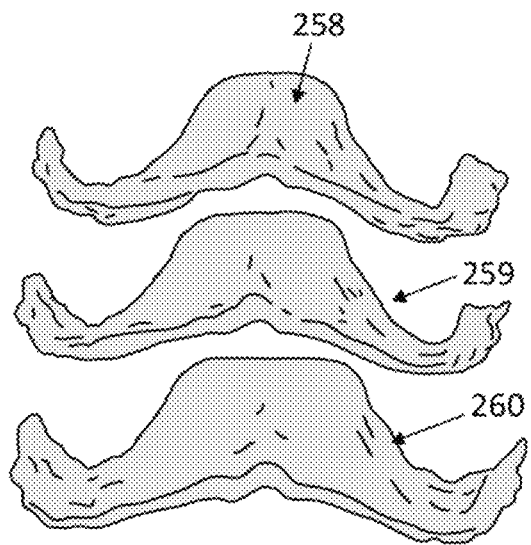
Figure 2C:
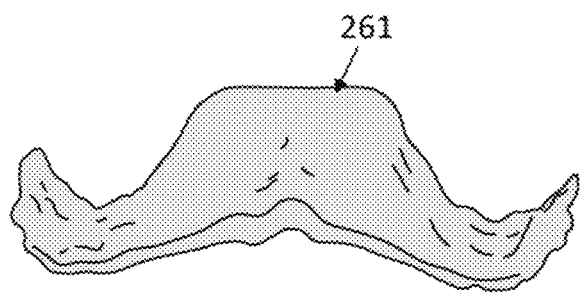

The apparatuses described herein may be configured as a system including attachments and an attachment template for positioning the attachments on the teeth, a series of palatal expanders that progressive expand the patient's palate, and a passive holder (e.g., retainer) to be worn after the series has widened the palate. For example, FIG. 2A-2C illustrate these components of such a system. FIG. 2A shows an example of an attachment template 251; a plurality of attachments (not shown in FIG. 2A) may be attached to the patient's teeth at predetermined locations that may correspond to the locations of receiving sites on each of palatal expanders. FIG. 2B shows an example of a series of palatal expanders that get progressively broader. For example, the upper palatal expander 258 is narrower than the intermediate palatal expander 259 and a final palatal expander 260. FIG. 2C illustrate and example of a passive holder (e.g., retainer) 261 that may be worn after the series has completed expanding the patient's palate. In this example, the palatal expander retainer 261 is similar or identical to the last of the palatal expanders in the sequence, although it may have a different configuration.

Any of the examples described herein may be configured to include, for example: a detachment region (e.g., removal tab, slot, etc.), for example at the gingival edge gap and/or an extension to assist with appliance removal, a palatal expander identification marking (e.g., an expander identification number), etc.

Figure 5A:
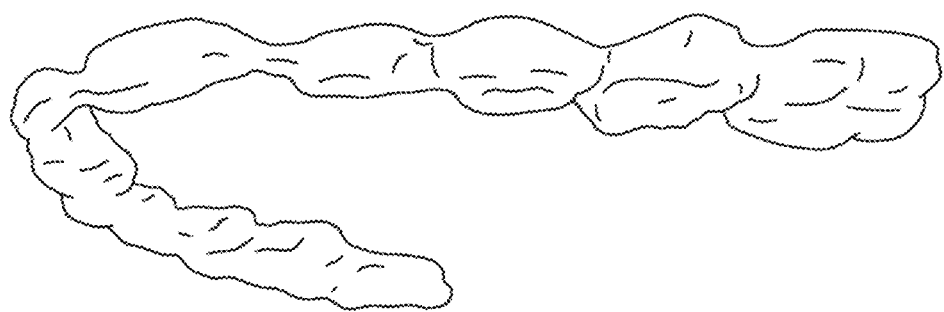
FIG. 5A is an example of a template for applying attachments (shown attached to the teeth in FIG. 5B) to the appropriate region of the teeth to mate with the palatal expanders so that the palatal expander will remain in the correct position on the teeth.
Figure 5B:
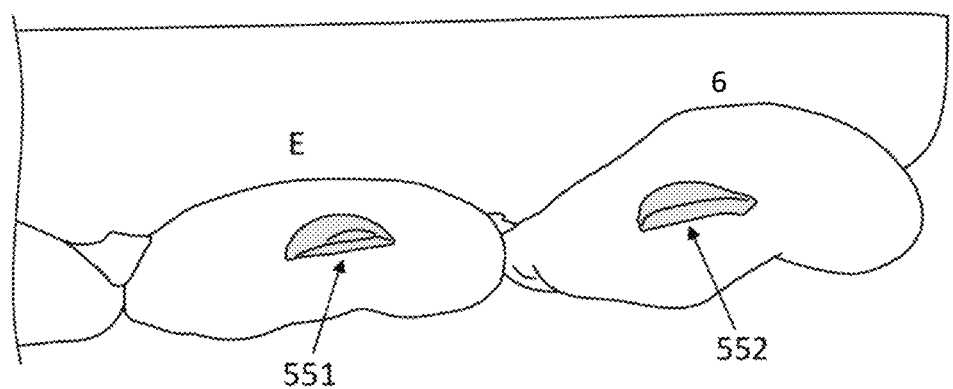
FIG. 5B shows two attachments attached to the patient's teeth in predetermined positons; in this example, four attachments may be used to secure each palatal expander to the teeth during treatment.

FIGS. 5A-5B illustrate an enlarged view of the attachment template and attachments. In this example, the attachments may be placed on the patient's teeth, for example, FIG. 5B shows two attachments 551, 552, one on the E's (center of crown) molar and another on the 6's (Mesial Cusp) molar region. The template may fit over the patient's teeth, and the attachments (which may be preloaded into the template and/or applied through the template, may be bonded to the teeth. In this example, four attachments are used.

Figure 4B:
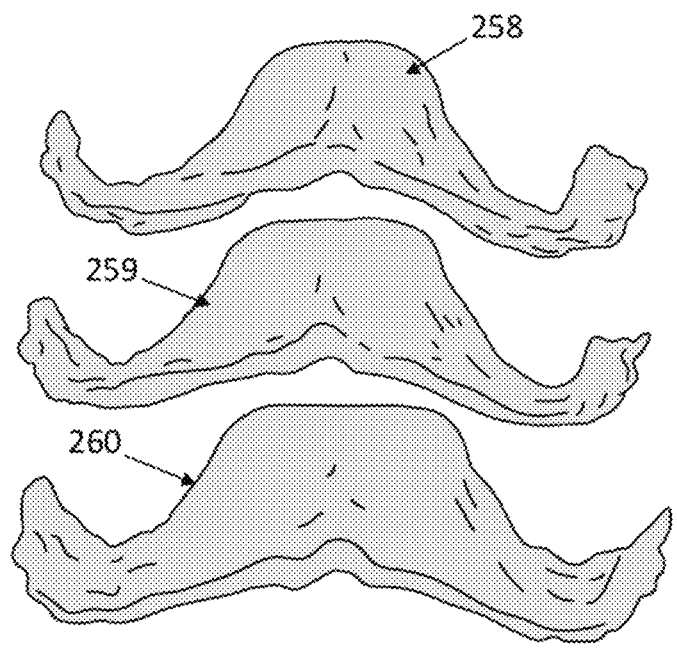
FIG. 4B illustrates a series of palatal expanders that are configured to progressively expand the suture (e.g., the expanders shown in FIG. 4B may be examples taken from an entire sequence, e.g., of 8 or more expanders, and do not necessarily represent three immediately sequential expanders).

In the exemplary active palatal expanders illustrated in FIGS. 2B and 4B, the expanders are configured for daily wear (e.g., 23-24 hours of wear). In these examples, the palatal expanders may be configured to provide a predetermined amount of total arch width activation per stage (e.g., approximately 0.15 mm, 0.20 mm, 0.25 mm, etc.) similar to screw activation expanders.

The holder or retainer (e.g., FIG. 2C and FIG. 6) may be provided to the patient to be worn after completing the sequence. For example, a pair of similar holders may be provided (one to be worn, and another that is a spare). The holder may be marked as descried herein to indicate that it is the retainer. For example either or both the palatal expanders and the holder(s) may be marked with an alphanumeric code, such as a nine-digit number key, that may uniquely identify the device. For example, a nine digit expander number key may be "981WWXYZZ", where WW is a numeric 01 to 99 corresponding to a patient number, X is A to Z (corresponding to a revision), Y is E or H (expanding device or holding device), and ZZ is a number between 01 to 99 corresponding to a stage of treatment.

As described above, FIGS. 2C and 6 illustrate example of holders, e.g., passive palatal expanders. In general, each of the palatal expanders in a series maybe worn for up to two weeks; similarly a holder may be worn for up to two weeks holding device. During treatment, a dental professional (e.g., doctor) may order the default or request any stage in the treatment as the holding device. If the expansion goal is not achieved, the physician may request further expansion with a new scan, as described below.

Figure 3:
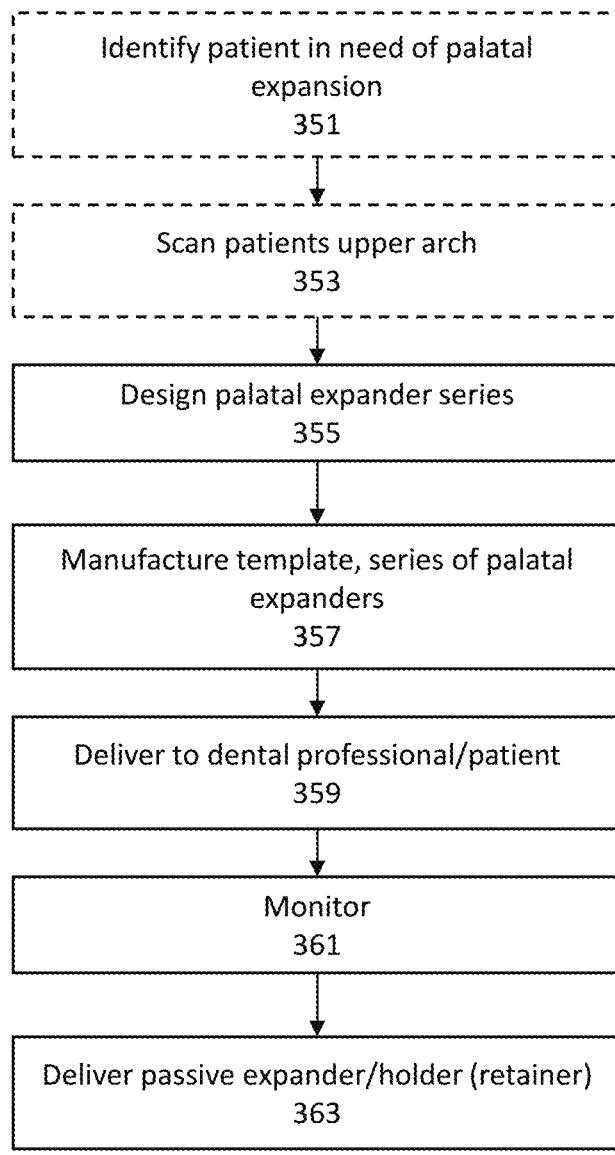
FIG. 3 illustrates a method of treating a patient to expand the patient's palate using the palatal expanders described herein.

FIG. 3 illustrates an exemplary method for treating a patient to expand the patient's palate. The first step illustrated may include identifying a patient in need of palatal expansion 351. The patient may be a child, teenager, young adult or adult. Once the patient is identified, the dental arch, including the palate, teeth, and at least a portion of the gingiva may optionally be digitally scanned 353. Alternatively, the upper dental arch may be modeled manually (e.g., using a dental impression). When scanning is used, any appropriate scanner may be used, including, but not limited to an intraoral scanner that can directly scan the teeth, gingiva and palate. Described below in reference to FIG. 18A-20C are guidelines for scanning the patient's upper arch so that the sequence of palatal expanders maybe formed, including the template for placing attachments.

Once the upper arch has been modeled (e.g., scanned, manually modeled, etc.), the palatal expanders may be designed 355. Typically, these designs may be configured to include any of the features described herein. The design process may include planning the final position of the teeth and/or palate, and designing intermediate palatal expanders to achieve the final configuration. The design process may include providing the location of the attachments on the teeth in order to provide both secure attachment as well as to move the teeth, and/or prevent substantial tipping of the teeth during expansion. The design process may be digitally performed using the digital model of the patient's upper arch. The design process may be automated or semi-automated.

Once designed, the series of palatal expanders may be fabricated 357, and the template may be manufactured at the same time. Any appropriate fabrication technique may be used. For example, the method may include 3D printing, and/or lamination. Examples of these methods are provided below. The manufactured palatal expanders may then be sent 359 to the patient and/or to the dental professional who may instruct the patient in applying and removing the palatal expanders. The treatment may then be optionally monitored 361 to track the palatal expansion, including taking periodic (e.g., daily, weekly, bi-weekly, etc.) scans of all or a portion of the upper arch (palate, teeth, gingiva, etc.). The treatment may be adjusted to increase or decrease the rate of expansion, e.g., by redesigning the series of palatal expander and/or refabricating the palatal expanders. Once the sequence of palatal expanders has been worn, the patient may then wear the holder (e.g., retainer) to prevent relapse of the palate; the holder may be worn until the palatal suture has healed. The holder may be provided to the patient with the series of palatal expanders, or it may be (optionally) sent during the treatment or immediately after treatment 363.

Figure 7A:
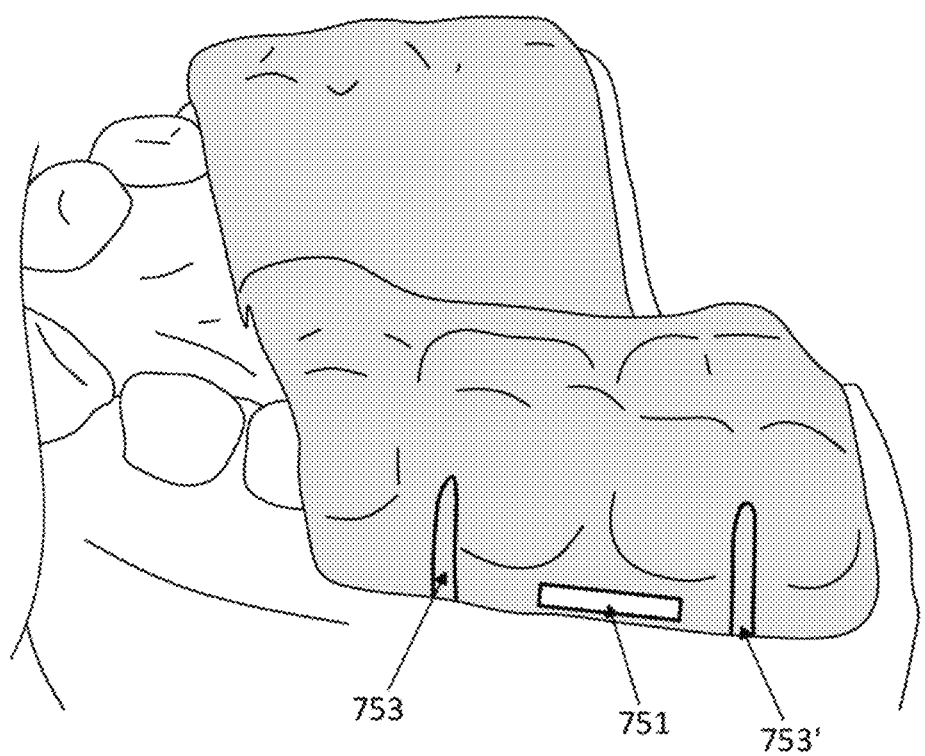
FIG. 7A is an example of a palatal expander including a detachment region (e.g., a removal grip or tab) and two or more lateral hinge region(s) (e.g., slot, cut-out, slit, flex region, etc.) extending from the lateral edge (e.g., the edge of the buccal side) towards the occlusal surface, which may be used to help remove the apparatus from the subject's mouth.

As mentioned above, any of these methods and apparatuses may include palatal expanders with one or more removal/release features. FIGS. 7A-8C illustrate examples of various removal/release features that permit a patient to manually detach and disengage the palatal expander from the teeth once it has been applied. In FIG. 7A, the palatal expander includes both a detachment region (configured as a removal tab 751). The detachment region in this example is a tab or protrusion extending along or near the bottom (e.g., bottom side) of the lateral (buccal) outer side of the palatal expander. The detachment region 751 may include a slot or opening into which the patient's fingernail may be inserted, to allow the buccal side of the palatal expander to be separated and pulled away from the teeth, so that any attachment(s) on the palatal expander may be disengaged. The device may then be pulled down off of the teeth.

In FIG. 7A, the design also includes a pair (though one or more may be used) of slits, slots, cut-out regions, etc. 753, 753' extending from the bottom edge of the buccal side up towards the occlusal surface. These slots, slits, etc. may provide a region for separating the palatal expander, and particularly the attachment(s) from the teeth to remove it. The one or more slit(s) on an outside of the attachment cavities of the device may allow a lifting out step to begin the disengagement process (e.g., a smaller edge length with a gap, as described below, may minimize food trapped and may eliminate the need for gingiva elongation).

As descried above, the design (size, shape, prominence and location) of the attachments on the teeth and/or the apparatus may be configured to assist with insertion and still be highly retentive. Similarly, the detachment (release) features may be configured to allow retention until release is manually triggered by the patient.

In general, any of these apparatuses may include a hinge region, particularly before the occlusal surface that allows bending in order to disengage the apparatus from the teeth. For example, a hinge design with a finger access may be included to allow disengaging the device from the retention attachment for easier removal.

In some variations, the release mechanism may include a lock or other region that may require activation (e.g., by deforming, squeezing, etc.) before it can be released. For example, the palatal expander may be squeezed or deformed (e.g., by biting down on the palatal expander first) before pulling at a release on the palatal expander (e.g., using a fingernail) to release the aligner when also releasing the biting down onto the palatal expander. Thus, another part of the device may be modified or deformed begin disengaging the device from the retention attachment.

Figure 7B:
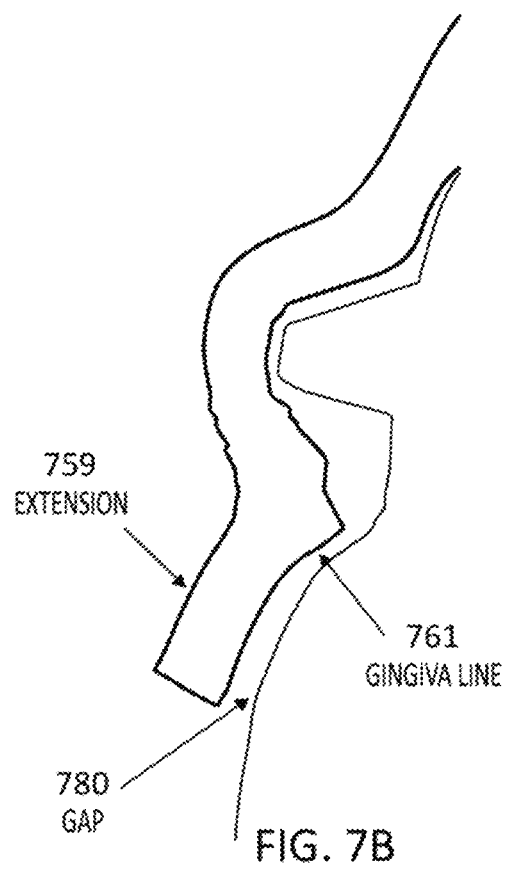
FIG. 7B shows a section through a portion of a palatal expander that is configured to include a detachment region in which the outer (e.g., buccal) edge of the palatal expander is formed with a gap separating it from the teeth and/or gingiva sized and configured so that the patient's fingernail and/or a removal device may be inserted to pull the apparatus off of the teeth, including off of the attachment on the teeth.

Any of the apparatuses described herein may include a release (e.g., detachment region) that is formed at least in part by a lip or ledge forming a finger gap that can be manipulated by a patient's finger (e.g., fingernail). In some variation the gap may be formed as an outwardly extending buccal edge of the apparatus, as shown in the sectional view of FIG. 7B. In FIG. 7B, as well as in FIGS. 13A-13C, a gap or separation between the palatal expander and the gingiva along all or a portion of the bottom of the palatal expander may be sized to permit the patient's finger/fingernail to engage and pull the palatal expander away from the palate. The palatal expander may include an extension 759 at the bottom edge of the buccal side of the palatal expander. The extension may be specifically designed to leave a gap between the palatal expander and the gingiva, e.g., up to the gingival line 761. The extension of the buccal section below the gingival line by the extension, as well as the separation between the gingiva and the palatal expander may provide for better removal. See, e.g., FIGS. 13A-13B.

Figure 8A:
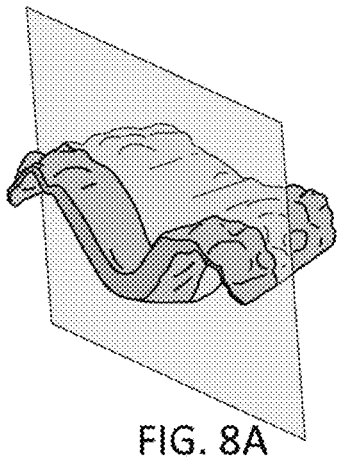
FIG. 8A shows an example of a palatal expander sectioned through an xy (sagittal) plane, showing (in FIG. 8B) regions of different thicknesses.
Figure 8B:
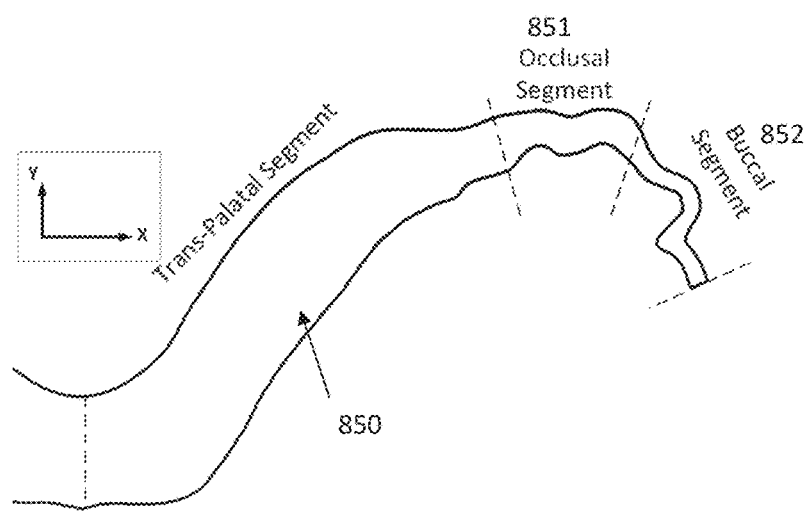
FIGS. 8B and 8C show the thicknesses of the trans-palatal segment, the occlusal segment and the buccal segment.
Figure 8C:
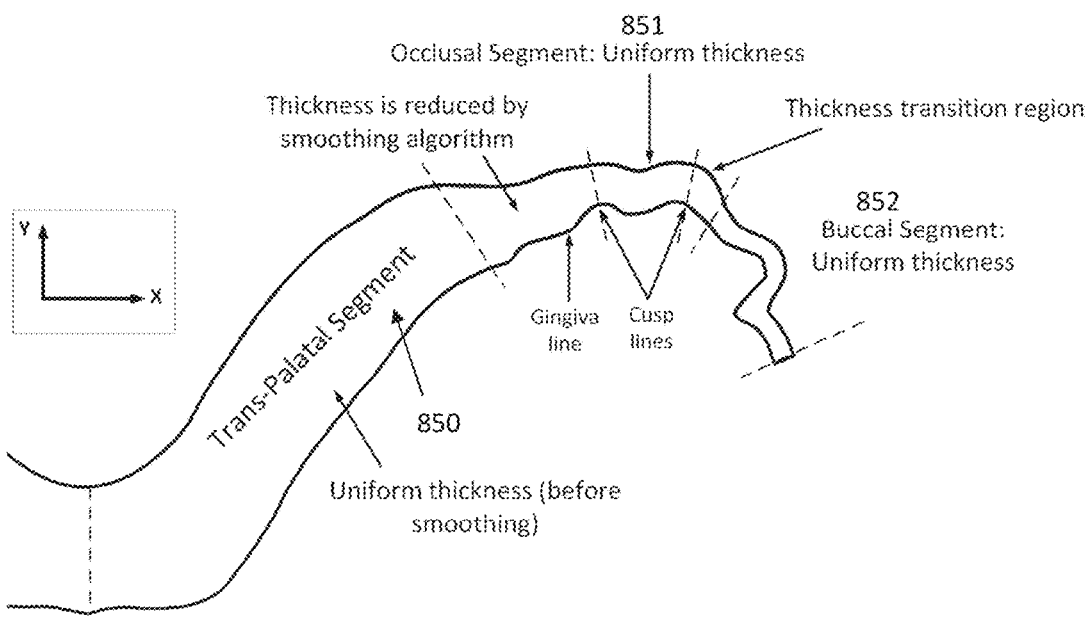
Figure 11A:
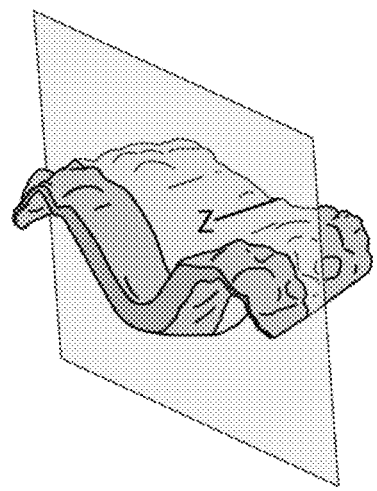
FIG. 11A is an example of a palatal expander with another section through the zy plane, off of the midline of the palatal expander.
Figure 11B:
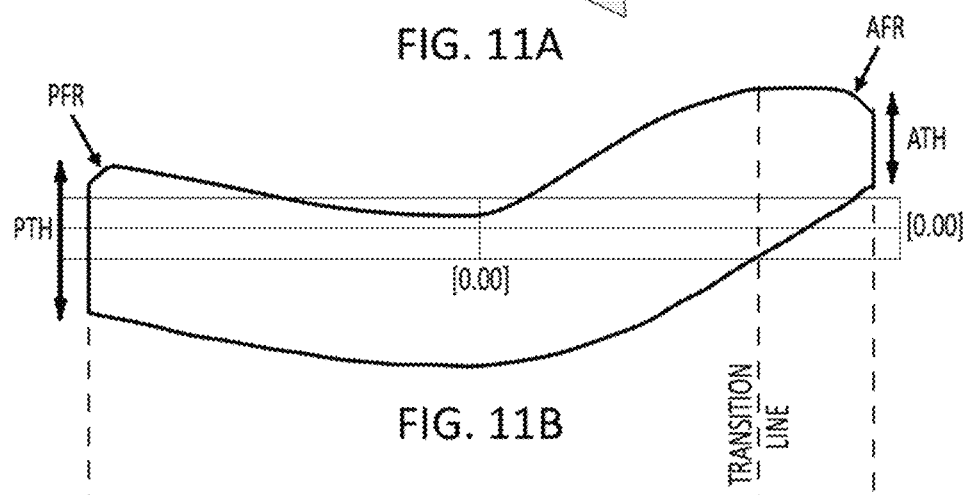
FIG. 11B shows the cross-section of the palatal expander through the zy plane of FIG. 11A.
Figure 11C:
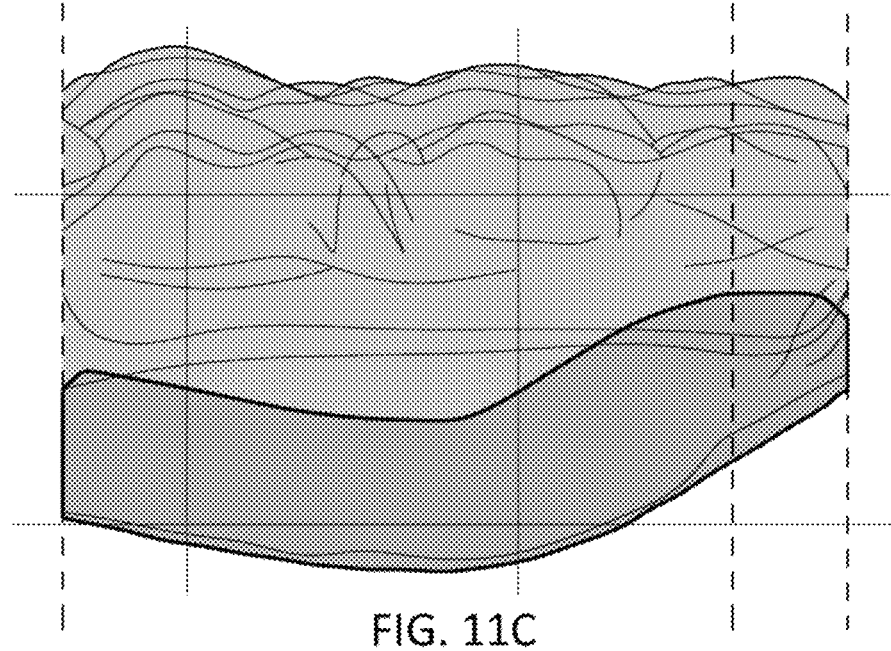
FIG. 11C is a 3D model of the palatal expander, sectioned as shown in FIGS. 11A and 11B.
Figure 13A:
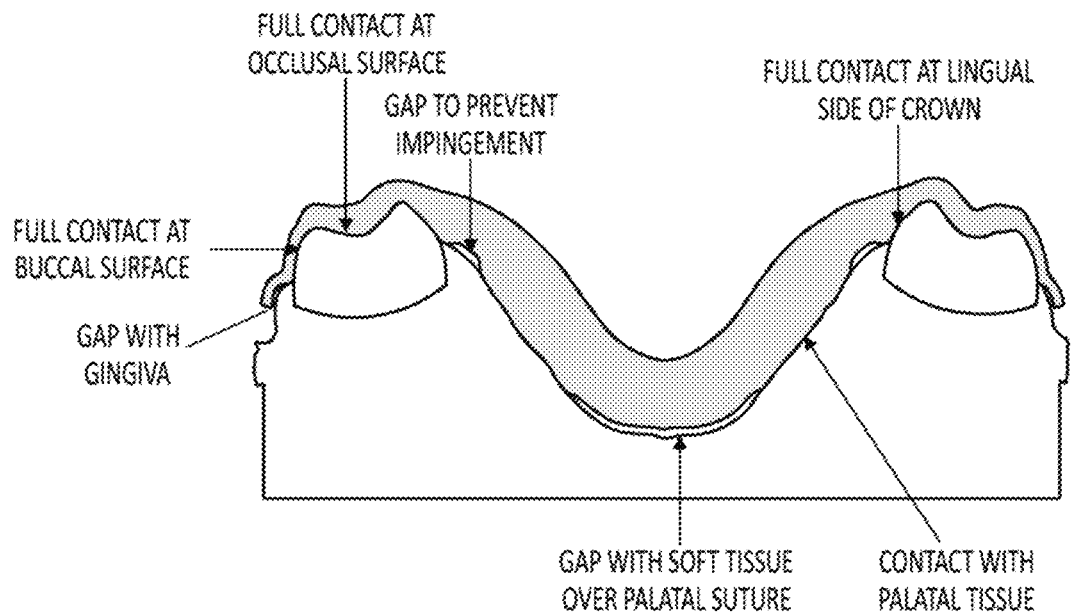
FIG. 13A is a section through a palatal expander, showing gap regions that may be included; specifically, gap regions between the palatal expander and the upper arch, including a concave channel or region before the lingual surface of the palatal expander to prevent impingement of the gingiva, and a gap between the soft tissue and the palatal region.
Figure 13B:
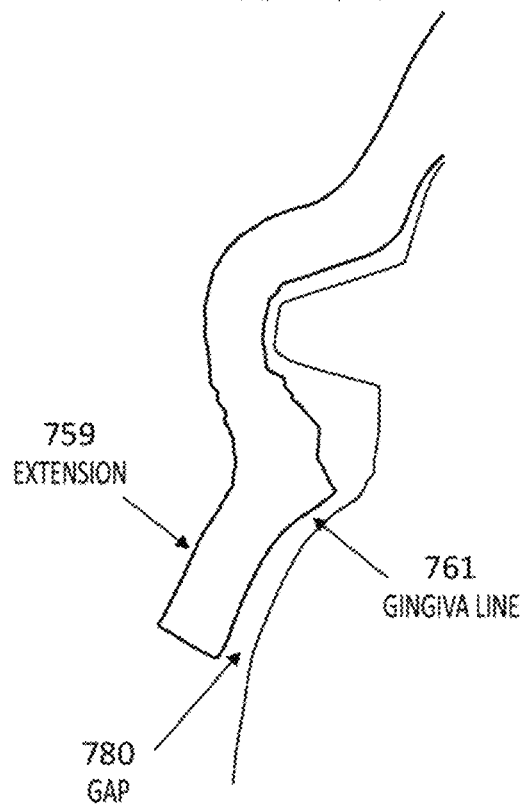
FIG. 13B, like FIG. 7B, shows a section through a portion of a palatal expander including the edge region that may include a gap and/or may act as a removal tab (or portion of a removal tab) for removing the palatal expander.

To provide enough mechanical advantage (or moment) for ease of removal the device, the extension region (e.g., "trim line") may be extended 1-3 mm lower than gingiva line, as shown in FIG. 7B and FIGS. 13A-13B. In this example, a gap 780 of between about 0.25-1 mm between the extension and gingiva is provided to facilitate hooking of patient/parent's finger/nail for removal of the palatal expander. Any of these examples may also include a hinge region that is thinner than the other, adjacent regions, such as the occlusive surface. For example, see FIGS. 8A and 8B. In FIG. 8A, an exemplary palatal expander shows an xy plane through the palatal expander; FIG. 8B shows a portion of the profile of the palatal expander in this xy plane. In FIG. 8B, the palatal expander includes a central trans-palatal segment 851 on either side of the midline of the apparatus. This transpalatal region may be configured as described herein to apply force to open the suture of the palate when worn, as shown in FIG. 4A. The force may be applied to the lingual side of the teeth (e.g., molars) and/or to the lateral side of the palate. The lateral side(s) of the trans-palatal segment may be configured to align with the lingual side of the teeth. An occlusal segment 851 may be positioned over the bite surfaces of the teeth. Finally a buccal segment 852 may extend down the buccal side of the teeth and may include the release (e.g., detachment region) portion. FIG. 8C shows additional detail on the thicknesses of these different regions. For example, in this example, the trans-palatal segment may have a uniform thickness (or nearly uniform thickness; this thickness may vary after smoothing the outer, tongue-facing surface, as described in more detail below). The occlusal segment may have a different (e.g., smaller) uniform thickness, and may transition between the transpalatal segment thickness and the occlusal segment thickness either uniformly, as a step, or as some function.

Thus, in general, the thickness of the palatal expander in different regions may be adjusted to permit different stiffnesses and expansion properties of the palatal expander. For example, in FIG. 9B, the trans-palatal segment (also referred to as the palatal region) in this example may be about 3-4.5 mm thick to provide a high level of stiffness. The occlusal segment may have a thickness of about 1-2 mm, which may be thick for enough mechanical rigidity and wear resistance due bite and chewing. In this example, the buccal segment and buccal extension have a thickness of about 0.75 mm (e.g., between about 0.25 and 1 mm) which may provide flexibility. Flexibility may decrease with thickness by the order of three. In this example, the transition between occlusal and buccal regions may happen from the buccal cusp line to about 0.75 mm lower height, as shown in FIG. 8C. The transition between the trans-palatal and occlusal regions happens from about the buccal gingiva line level up to buccal cusp line.

The thickness and/or shape of the transpalatal segment can be focally modified to provide uniform stiffness across the palate and/or a location for the application of force, including to the lingual side of the teeth (e.g., D, E, 6 teeth) or one or more regions of the palate, including in particular, regions laterally offset from the midline of the palate. For example, the thickness of the transpalatal segment finite element modeling.

The thickness may be determined for any point on the bottom surface of the apparatus (e.g., the bottom of the transpalatal segment or region) by finding the minimum distance to the opposite upper surface of the apparatus (e.g., the same region of the apparatus). The influence of thickness on the force applied by the device may be estimated by modeling the transpalatal segment as a curved beam. In this approximation, the force may be estimated using Castiglano's theorem. This analysis may be simplified and may allow the estimation of force for any width, thickness, and radius of curvature. The compressive extension may also be estimated. A desired range of stiffnesses (e.g., between 50-90 N/mm, between 60-90 N/mm, between 70-90 N/mm, between 80 and 100 N/mm, etc.) may be targeted. The stiffness may therefore be equivalent to a compressive force within a desired range (e.g., 8 N at between 0.15 mm to 0.30 mm, 9 N at between 0.15 mm to 0.30 mm, 10 N at between 0.15 mm to 0.30 mm, 15 N at between 0.15 to 0.30 mm, 20 N at between 0.15 to 0.30 mm, 25 N at between 0.15 to 0.30 mm, 30 N at between 0.15 to 0.30 mm, etc.), providing a targeted expansion for each stage (expander) worn. The material forming the expander may retain approximately half (e.g., between 45-60%, etc.) of its mechanical properties under stress relaxation when worn by a patient (e.g., at 37 degrees C. when worn in compression for the treatment time, e.g., 24 hours. For example, a minimum of 40 N force (e.g., minimum of 35 N, minimum of 40, minimum of 45, etc.) at between about 0.15 to 0.30 mm (e.g., between 0.20 to 0.25 mm, etc.) compression may be used as a design criterion.

Similarly, the buccal side may be considered as a cantilever beam while it is deflected under a removal force. The thickness and height may be customized based on this type of modeling.

Figure 60:
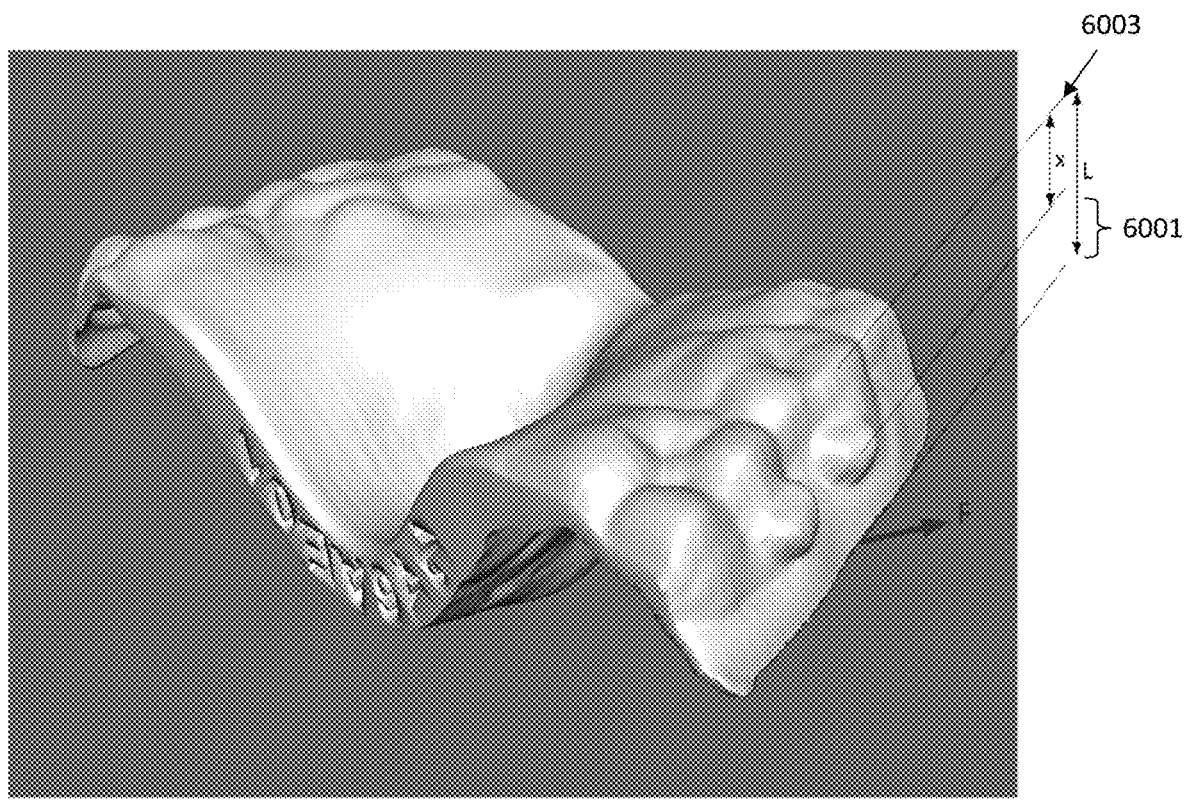
FIG. 60 illustrates an example of a palatal expander including an extension region to aid in removal of the device from the patient.

As mentioned above, in any of these variations, the buccal side of the apparatus may include an extension extending from the buccal side that is configured to extend adjacent and away from the patient's gingiva to form a gap of (e.g., between about 0.2 and 2 mm, e.g., between 0.25 and 1 mm, etc.) when the apparatus is worn by a patient. The patient or a caregiver may use this extension to remove the apparatus by uncoupling it from one or more attachments. In general, removal of a palatal extension, particularly those having attachment regions that couple to attachments bonded to the teeth, may require a lot of force. A patient or caregiver may not be able to readily disengage the device from the attachment. The force, F, required it typically applied perpendicularly to the buccal side of the device, as shown in FIG. 60. Thus, an extension region 6001 may be help disengage any attachment(s) and remove the device. Specifically, the extension region 6001, which may be the portion of the buccal side extending below the bottom of the attachment region (e.g., L-x in FIG. 60), may be designed to help the buccal region hinge around the cusp line 6003, at the top of position x, where the buccal side becomes the occlusal side over the cusp of the crowns. This portion of the device may be 'hinged' around this line, as mentioned above, allowing it to act similarly to a cantilever beam. The deflection when force F is applied at any location at any distance from the fixed line of the cantilever beam may be estimated from the geometry of the apparatus (including the size and position of the attachment site). For example, if the height of the attachment is 1.25 mm (e.g., y=1.25 mm) and x is the distance to the top of the attachment from the cusp line, when the attachment is in the middle of the buccal side (e.g., x=½ L) the force needed to detach may be estimated and can be set (F) to be about the same as the amount of force that a typical user's finger could apply. Given the boundary (upper and lower) of x, and this typical force range, from a user's finger (F), when the attachment height is constant, the length of the buccal side can be estimated, e.g., from the gingival edge (e.g., 2 mm lower than gingival side). Thus, the length of the extension region 6001 may be estimated. For the typical force of removal of the device, this length may be between 1 and 5 mm, e.g., between 2 and 4 mm, etc. The length may be adjusted to avoid contact with the soft tissue. The amount of force (F) needed to generate enough deflection in the buccal segment of the device can be determined from the geometry and the module of elasticity the (E) of the material forming the buccal side, as well the second moment of area (I), which is a function of thickness and width.

Figure 4C:
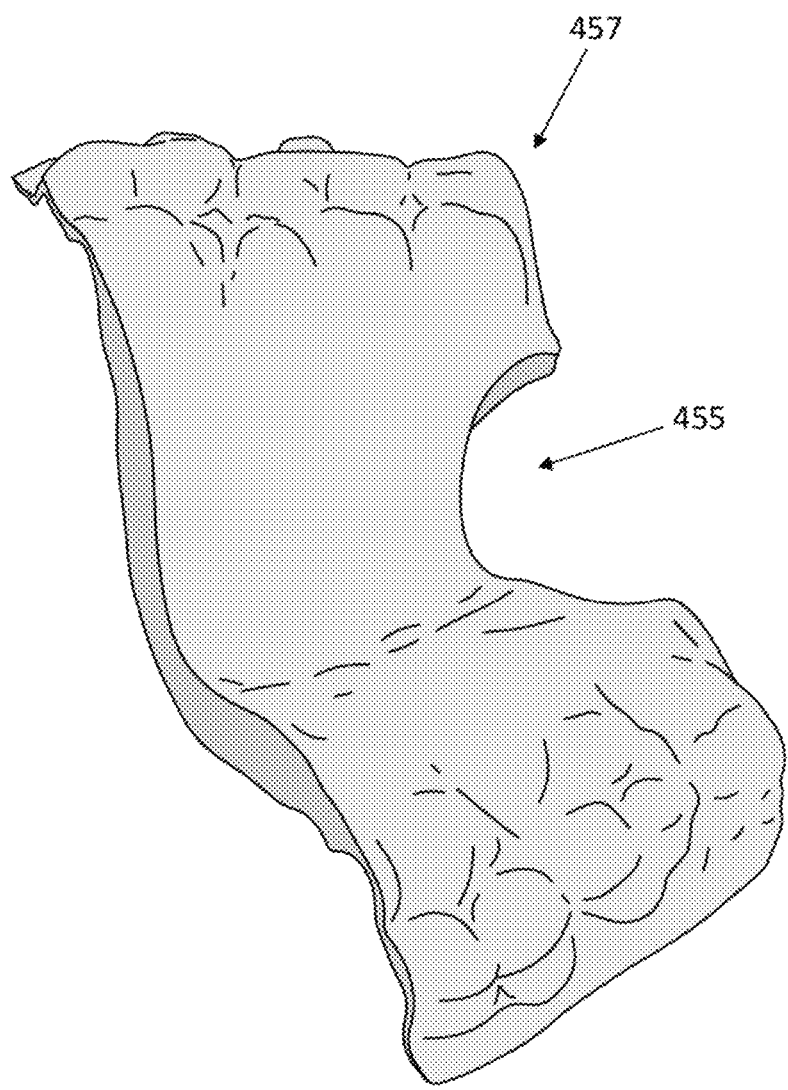
FIG. 4C illustrates an example of a palatal expander in which a portion of the palatal region has been removed from the anterior region; similarly, other regions of the apparatus, e.g., from the posterior region may be removed. Alternatively or additionally, any of these apparatuses may have a hole cut in other regions, including in the center region.

Thus, the thickness of the trans-palatable region (also referred to herein as the "palatal region") may be non-uniform, particularly where the outer surface of the palatal expander has been adjusted, e.g., by smoothing. Smoothing may provide more space for a patient's tongue and may improve speech lisp issue for particular letters. However, thickness of this region may change non-linearly to meet tangent conditions at the both boundaries and maintain the thickness more close to that of trans-palatal segment to prevent deformation and hinging of device prior to the cusp line. In addition, the apparatus 457 may include one or more cut-out regions 455, including regions from the anterior (e.g., see, e.g., FIG. 4C) or posterior, which may enhance comfort, prevent problems with speech, or the like.

FIG. 13A-13B illustrate gaps/offsets between the palatal expander segments and the patient's tissues. For example, in FIG. 13A-13B, the minimum gap at the soft palate (e.g., the mid-line region) may preferably be ~0.5 mm (e.g., between 0.01 mm and 1 mm, between 0.1 mm and 0.75 mm, etc.) to prevent any touch. Larger gaps may cause food entrapment. The gap between the palatal surface of a trans-palatal segment and the palate may be controllable across the palate. Extension of the buccal section below the gingival line; as mentioned above, to provide enough mechanical advantage (or moment) for ease of removal, the device trim line may be extended 1-3 mm lower than gingiva line. A gap of 0.25-1 mm between the extension and gingival may be provided to facilitate hooking of patient/parent's finger/nail for removal, as shown in FIGS. 7B and 13B.

In FIG. 13A, the palatal expander may also include a no touch region at the gingival line on the lingual side of the palatal expander. In this example, a gap linearly reduces from 0.5 mm at mid-line to zero at gingiva line. All the force in this example, may be applied on teeth (e.g., a tooth-borne palatal expander). A partial touch (tissue-borne palatal expander) may include control points that determine at what region gap is zero or larger than zero. In this case, force may be applied on both teeth and palate. Control points can be determined as percentage of the palate width. Other variations may include full contact (e.g., no gap) at the lingual side of the crown, which may fully transfer expansion force/displacement to both teeth and at least a portion of the sides of the palate. For example, a full contact (no gap) may include +/−0.1 mm preferred for occlusal surface; a full contact (not gap) +/−0.1 mm may be preferred for buccal side of crowns except in attachment well. A gap of 0.25-1 mm between the extension and gingival may be provided to facilitate hooking of patient/parent's finger/nail for removal.

Figure 13C:
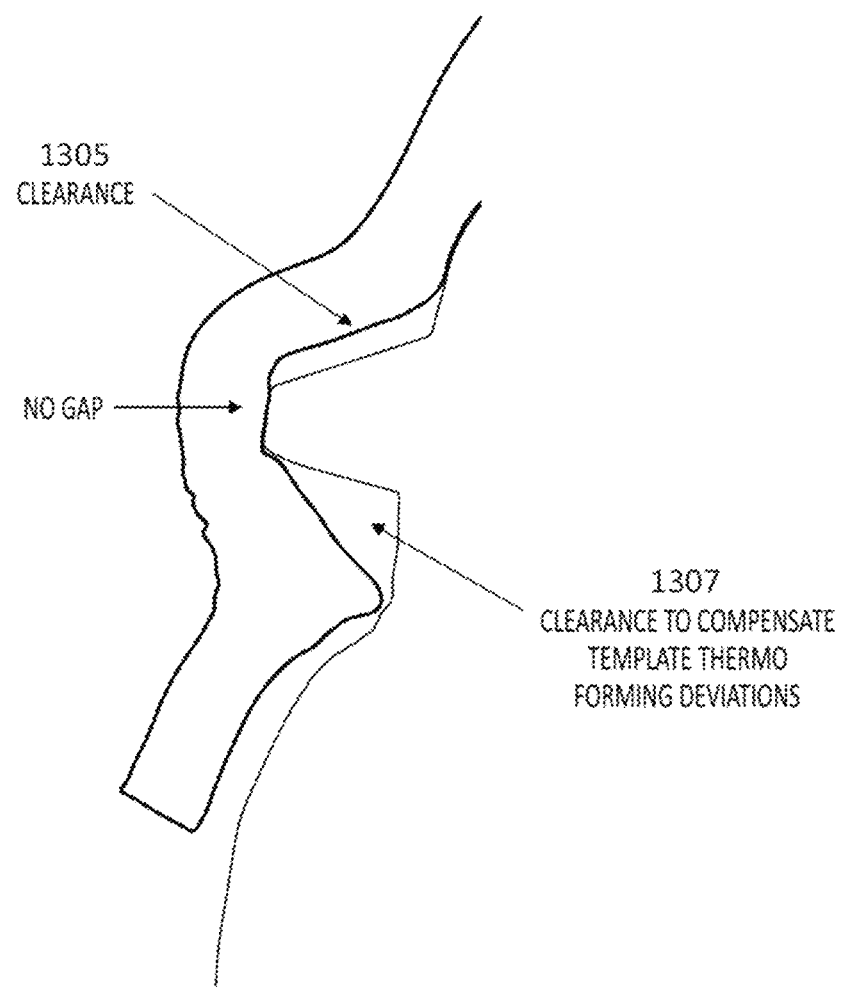
FIG. 13C is another, alternative section, through a portion of a palatal expander including a removal tab region forming a gap between the palatal expander buccal end/edge and the patient's gingiva and/or teeth.

For example, FIG. 13C shows an example in which the palatal expander apparatus includes a region of clearance 1305 above and below 1307 the attachment mating site, e.g. the attachment well may include clearance from attachment top surface of ~0.25 mm. This may provide for clearance to compensate for deviations of attachment template manufacturing and attachment formation.

As mentioned, the thickness of different regions of the palatal expander may be controlled and may be non-uniform. For example, the trans-palatal segment extending from across the palate up to lingual gingiva line may have a first thickness or range of thicknesses. The occlusal segment may extend from across the crown surface from lingual gingival line to buccal cusps connecting line, and may have a different thickness. The buccal segment may extend from across the buccal side of crown and buccal gingiva, and may be thinner, and may also include a hinged region before the occlusive segment.

In general, the palatal expander rigidity may be balanced with space for the patient's tongue. For example, any of these apparatuses may include a thin cross section towards the anterior and a thick or thicker cross-section towards the posterior The trans-palatal segment may be defined in an XY plane cross section, as shown in FIGS. 9A-9B. In the example shown in FIG. 9B, a uniform thickness of about 4.5 mm was used for trans-palatal segment for EFS. This thickness may change or be varying across the palate as described above. The tolerance of the trans-palatal thickness can deviate from default thickness for smoothness purposes (describe below in reference to FIGS. 14A-14C, by, e.g., ~+0.5 mm on the lingual (tongue-facing) surface of the palatal expander. In FIG. 9B, the transition line may be defined in a separate item, and the apparatus may include a uniform thickness from the posterior facet up to the transition line. In some variations, the apparatus may include a non-linear transition from posterior thickness (PTH) to anterior thickness (ATH) from transition line to anterior facet with tangent condition at the transition line the posterior thickness (PTH), for example, may be between 3-4.5 mm (can be dependent of patient-specific palate shape). The anterior thickness (ATH) may be in the range of occlusal thickness (e.g., ~1.5 mm). The posterior fillet radius (PFR) may be ~0.5 mm, and the anterior fillet radius (PFR) may be ~0.5 mm. The transition line may be adjusted to secure desired transition region. For example, it may be preferable for the palatal expander to cover molars #6 and #E area full thickness so that transition happens in #D area (see, e.g., FIG. 16A-16B).

Figure 14A:
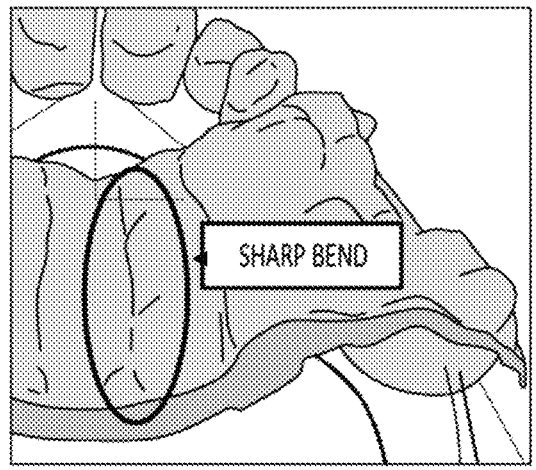
FIG. 14A is an example of a portion of a patient's palate surface, showing a region having a channel with a relatively sharp bend. A palatal expander may be formed so that the thickness of the palatal expander over the central palate-spanning region may be smoothed to eliminate the sharp bends in the surface, smoothing the surface, as shown in FIG. 14B.
Figure 14B:
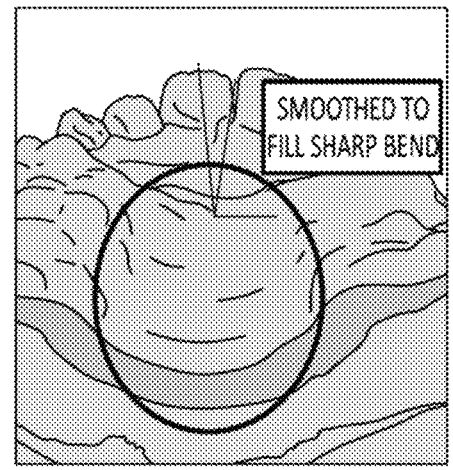
FIG. 14C shows profile views comparing the original palatal surface with smooth surface, and a composite final surface that includes some of the ridges/channels, but smooths them.
Figure 14C:
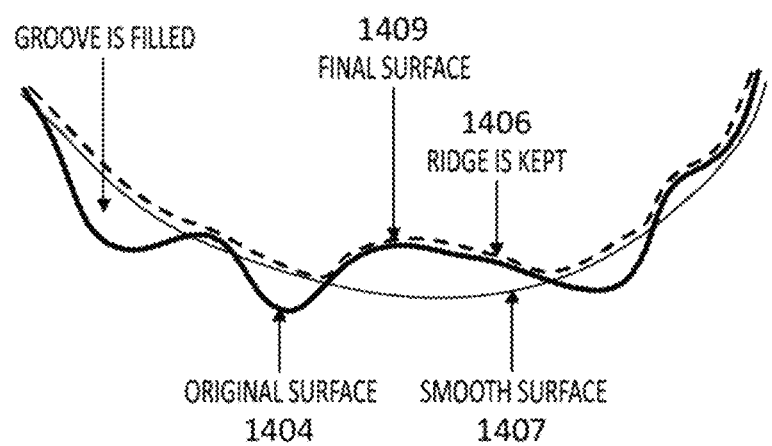

As mentioned, the lingual surface of any of the palatal expanders described herein may be 'smoothed' to reduce the troughs (or in some variations, troughs and/or peaks) that would otherwise appear on the lingual surface if the thickness were uniform across the palatal region of the palatal expander. For example, FIG. 14A shows an example of a palatal region having a sharp bend or transition along the surface reflecting a similar bend/channel in the patient's palate. In FIG. 14B, this bend/channel has been smoothed in the palatal expander to fill in or reduce the rate of change in the surface of the palatal expander. In FIG. 14C, this is shown in cross-section. The original surface 1404 includes a number of sharply changing grooves or troughs and one major ridge 1406, particularly when compared with a completely smooth surface 1407 projected against the actual surface. Although the smooth surface (which fills in the grooves) may be used, in some variations the ridge 1406 may be kept in the final surface 1409. This smoothed surface may be both more comfortable for the patient, and may also provide sufficient strength while increasing the comfort to the patient. The smoothing may result in a non-uniform thickness of the trans-palatal segment. Smoothing may also help improve speech, as these grooves/ridges may cause speech issues. The lingual surface smoothness of the trans-palatal segment may be increased (e.g., smoothened) to provide comfort in contact with tongue. In some variations, the smoothing may provide a variation of thickness in this region between +/−0.5 mm. The palatal surface of a trans-palatal segment typically does not need smoothing, as it may match with the patient's palate (similarly, the surfaces in contact with teeth may not need smoothing). The occlusive surface may be smoothed (e.g., between +/−0.2 mm); the buccal surface may also be smoothed between +/−0.2 mm.

In any of the palatal expander apparatuses described herein, the inter-proximal region may include a virtual filler. The virtual filler may be used for the interproximal regions to design the palatal expander. For example, all three teeth on both sides may move translationally in an X direction. Each side may move half amounts in expansion for each incremental stage. Typically, anterior teeth are not treated and their movements are not controlled by the palatal expanders. The ratio of movement may be estimated/predicted based on the suture opening.

Occlusal cross sectional thickness may be controlled with cusp matching or with additional surface features, such as flat planes, ramps, etc. For example, the occlusive surface may include added thicknesses for structural integrity, which may be useful for opening the anterior bite.

Figure 12:
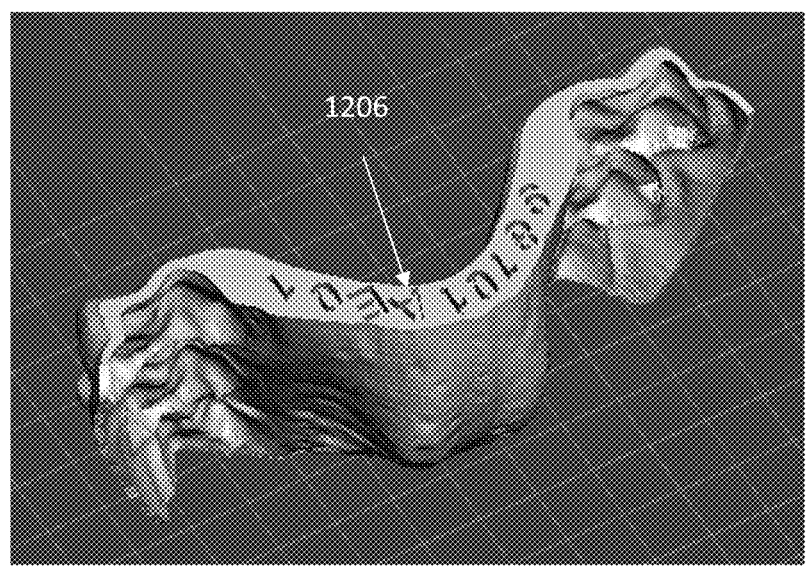
FIG. 12 illustrates one example of an identification or part number marking on a palatal expander, shown on a flat surface formed on the posterior end of the palatal expander. The identifying marking may include a sequence identifier/number (e.g., indicating the number of the palatal expander in a sequence), a patient-associated identifier/number, etc. The identifying mark may be printed sufficiently large and distinctly so that it may be read by the patient.

Any of the palatal expanders and holders described herein may include one or more markings, as described above. For example, FIG. 12 illustrates one example of an identification or part number built into a palatal expander, shown on a posterior surface between the occlusal and lingual sides of the palatal expander. For example, a flat surface may be created (e.g., by 3D printing) and an identification or part number 1206 may be printed thereon. For example, as shown in FIG. 12, the marking may be printed on a back flat side (e.g. posterior surface), and may be sized to fit at least 9 digits (e.g. oriented upward) that may be read by a patient or may be automatically read. For example, the digits may be sized between 8 point and 16 point font.

Alternatively or additionally to the engraved markings described above, the markings may be or include a machine-readable code, such as a QR code, a bar code, or the like. The marking may be embedded within the apparatus and visible through the apparatus. The markings may be florescent or visible when viewed in certain conditions, e.g., under UV light, in the dark, etc. Although the markings in the example of FIG. 12 are shown on the posterior edge, in practice, markings may be placed in any region of (or within) the apparatus.

Figure 15:
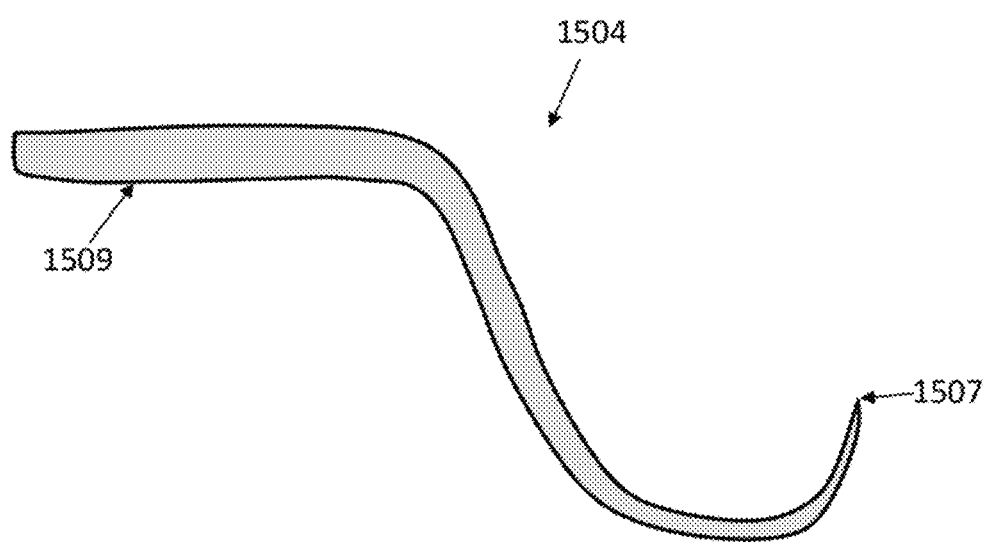
FIG. 15 is an example of a tool that may be used to remove a palatal expander, including a proximal grip region and a distal palatal expander engaging region.

Any of the apparatuses (e.g., systems) described herein may include a removal tool, such as the removal tool 1504 shown in FIG. 15. For example, a removal tool may be a metal (e.g., stainless steel) apparatus that is shaped for easy access into the disengagement gap of the palatal expander. As shown in FIG. 15, one end 1507 may be configured to enter the gap and execute the disengagement hinge. The apparatus may also include a gripping region 1509 to allow easy control of the tool. In general, the detachment region (or removal grip, etc.) may be configured for use with a tool such as the removal tool shown in FIG. 15.

Figure 16A:
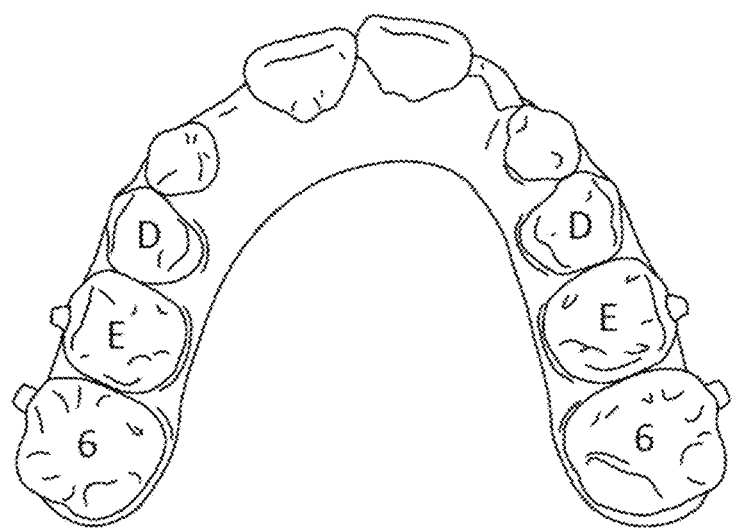
FIG. 16A is an example of a bottom view of the upper palate, showing attachments that may be made to some or all of the teeth at various positions, in order to secure the palatal expander to the subject's teeth.

As mentioned above, FIGS. 16A-16B illustrate coverage of the teeth by the palatal expanders and also show possible attachment sites for attachments on the teeth. In FIG. 16A, the figures shows all D, E and 1st molar (#6) are shown fully erupted. The teeth: #6 s, Es and Ds on both sides (alternative numbered: T2, T3, T4 and T13, T14, T15) may be completely or partially covered by the apparatus, and some or all of them may include one or more attachments.

Figure 16B:
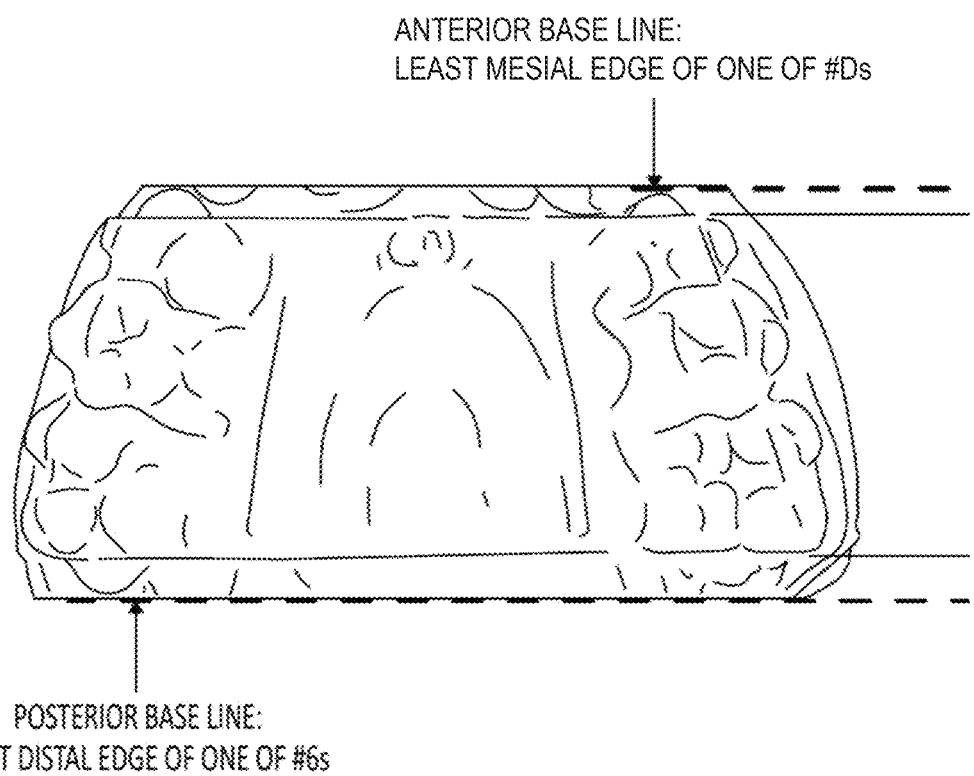
FIG. 16B is an example of a bottom view of a palatal expander.

For example, the extent of coverage of these teeth may include an anterior border that is between 0-2 mm offset from the anterior base line (as shown in FIG. 16B). The posterior border may be between 1-3 mm offset from the posterior base line (as shown) to eliminate posterior curves of teeth.

FIG. 17A-17E illustrate an exemplary attachment, shown as a semi-cylindrical attachment that includes a ramp having a pitch angle of approximately 55 degrees. In FIG. 17A-17E, the length of the attachment (shown as "length" 1703 in FIG.

Figure 17A:
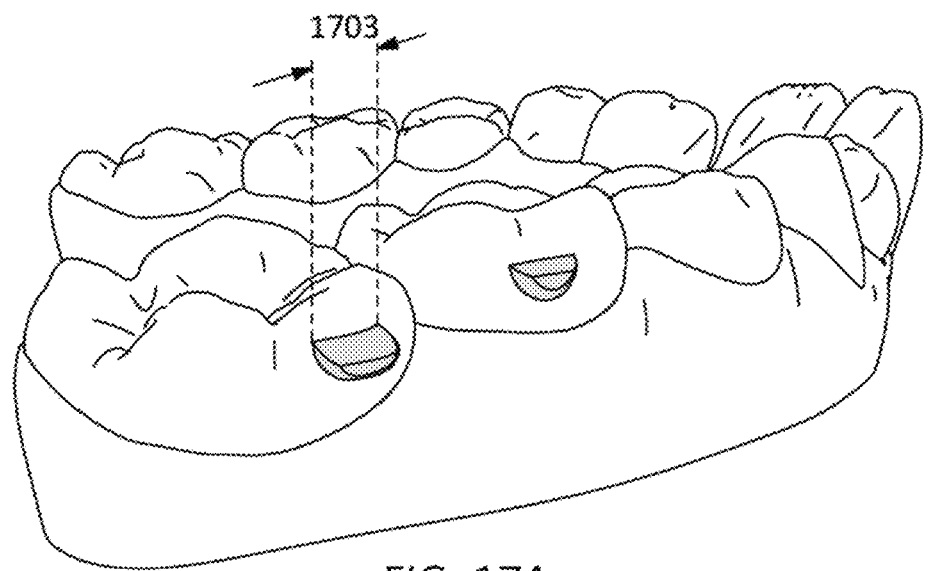
FIGS. 17A-17E illustrate attachments on a model of a patient's teeth.
Figure 17B:
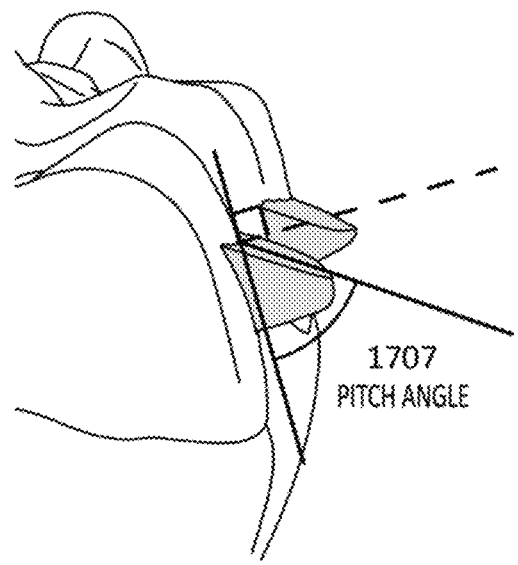
Figure 17C:
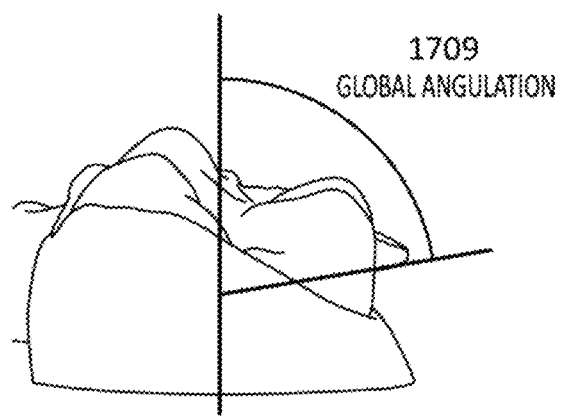
Figure 17D:
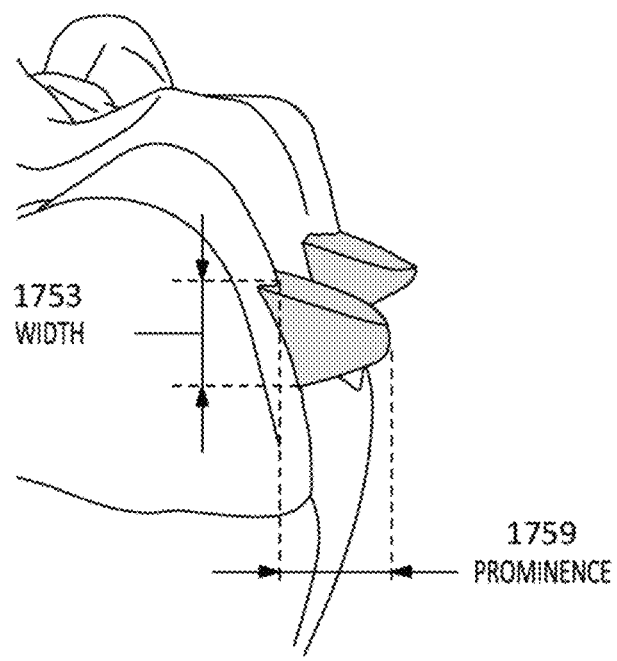
Figure 17E:
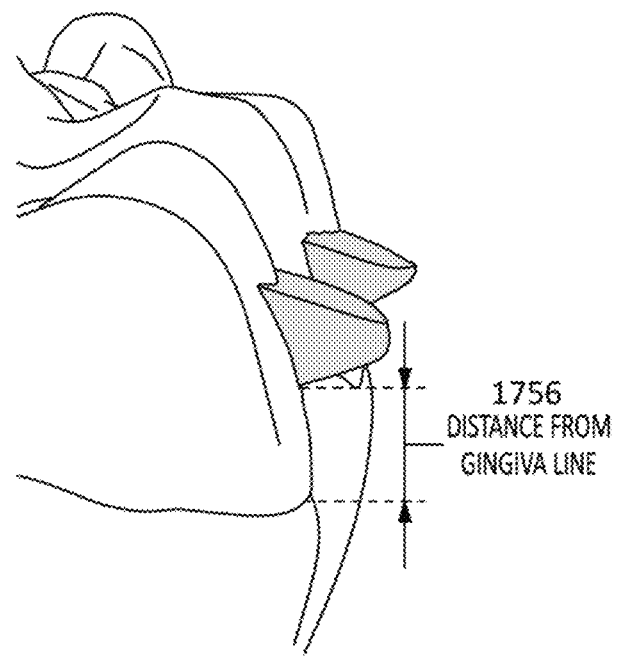

17A) along the side of the teeth is between about 1 mm and 4 mm (e.g., between 1.5 and 3 mm, between 2 and 3 mm, etc.), and the width 1753 (shown in FIG. 17D) tapers as the attachment extends from the tooth, but may have a maximum of between about 0.5 and 4 mm (e.g., between about 1 and 2 mm, etc.) at the tooth surface. The attachment is sloped downward to reduce the width at an angle of between about 45 and 65 degrees (e.g., between about 50 and 60 degrees, etc.), referred to herein as the pitch angle 1707. The attachment may extend, e.g., have a prominence 1759, of between about 0.5 mm and 3 mm (e.g., between about 0.75 mm and 1.75 mm, between about 1 mm and about 1.5 mm, etc.) from the tooth. The attachment may be spaced from the patient's gingiva by between about 1 mm and 0.25 mm (e.g., between about 0.5 and about 0.95 mm) 1759, as shown in FIG. 17E. The overall global articulation angle may be less than 90 degrees (e.g., less than about 85 degrees, less than about 80 degrees, less than about 75 degrees, etc.). The attachments may be shaped like a semi-cylinder with an angled cut as shown in FIGS. 17A-17E. This design may provide a slope for easy insertion and rounded bottom side to reduce stress concentration. It might also help template removal from mold and attachments in patient mouth.

Figure 19A:
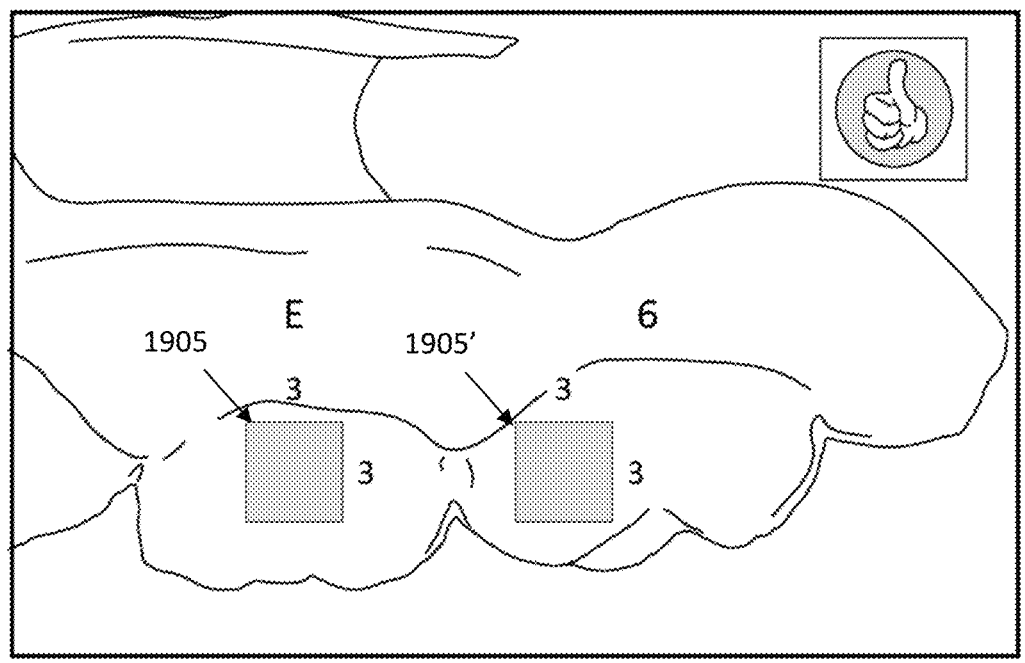
FIGS. 19A and 19B illustrate exemplary guidance for scanning a patient's dental arch, including scanning sufficient space (e.g., 3×3 mm) on the lateral side of the patient's molars.

In particular, the attachments described herein may be shaped and sized to distribute the forces applied by the palatal expander and teeth on the attachment over a large region of the tooth surface without extending beyond a predetermined buccal region on the teeth (e.g., the E and 6 teeth, see, e.g., FIG. 19A). As described in the context of FIGS. 16A, above. For example, the attachment size and shape may be configured to distribute the force within the center of the crown region of the E's, and/or the mesial cusp of the crown on the 6's.

Figure 18A:
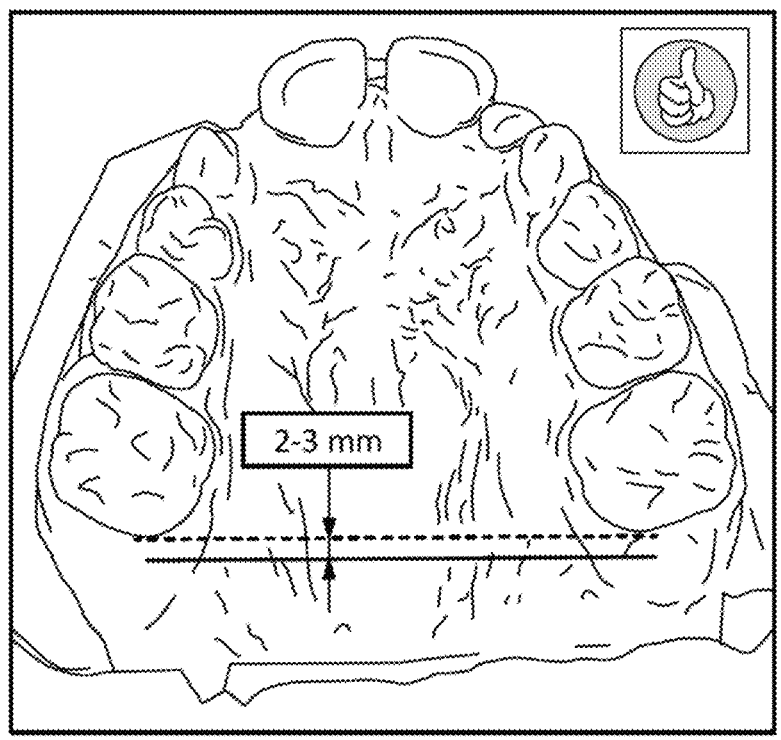
FIGS. 18A and 18B illustrate guidance for scanning a patient's upper arch to form a series of palatal expanders, as described herein.
Figure 18B:
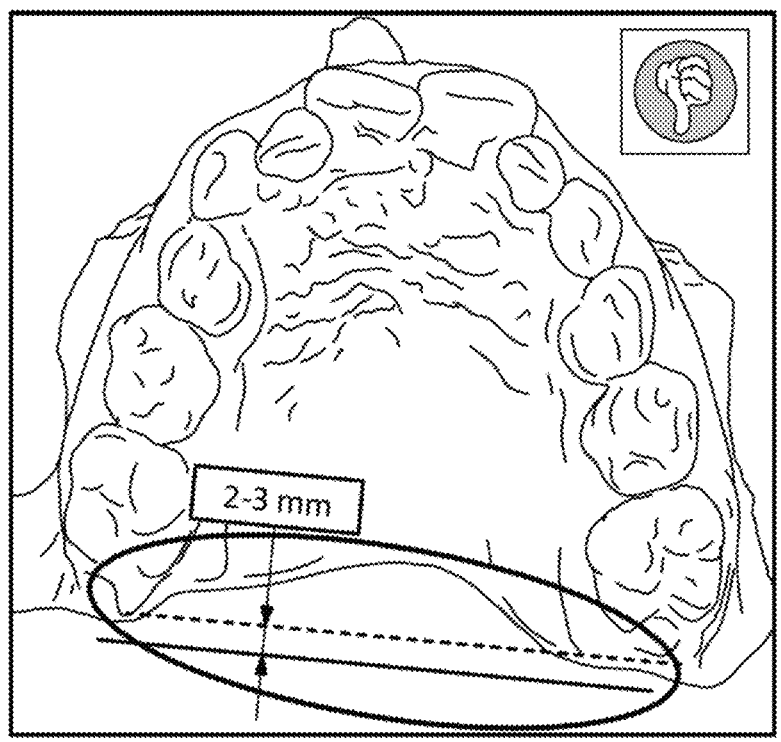

Preparing a palatal expander for a patient optionally may include initially scanning the patient's upper arch. Digital scans may also be used to monitor/track progress of the palatal expansion. When scanning the patient's upper arch for making a palatal expander apparatus for the patient, it may be helpful to scan a larger-than usual area, including the teeth, the gingiva and the palate in a single scan (or combined scan). For example, FIGS. 18A-20B provide examples of scanning requirements that may be used. For example, FIG. 18A-18B illustrate sufficient (FIG. 18A) and insufficient maxillary arch scans.

Figure 19B:
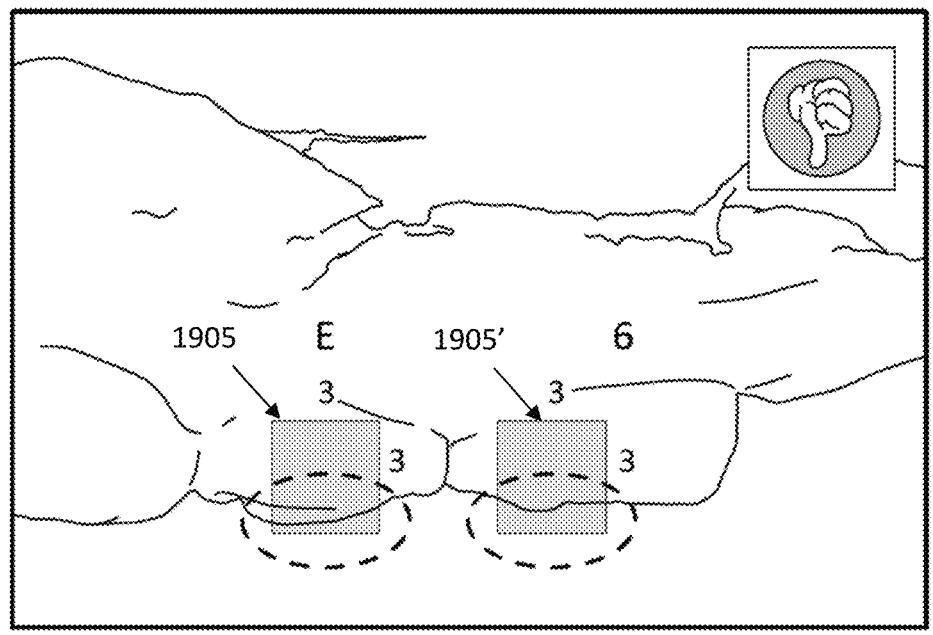
Figure 20A:
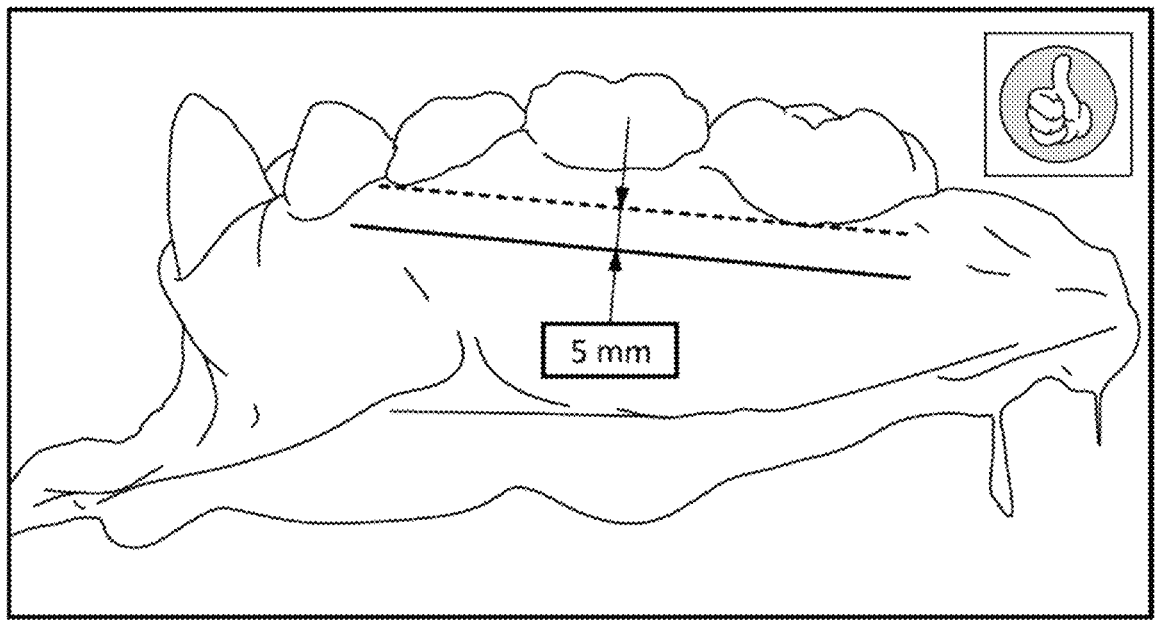
FIGS. 20A and 20B illustrate additional exemplary guidance for scanning a patient's upper dental arch.
Figure 20B:
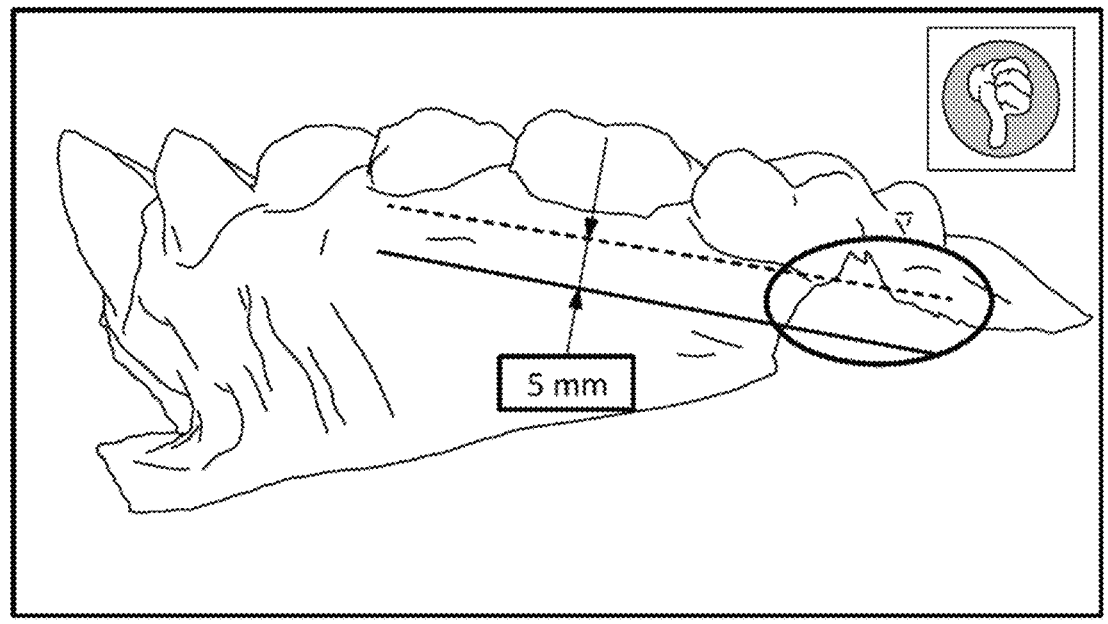

When scanning the upper (maxillary) arch, the scan should include palatal coverage, including coverage of the D's, E's and 6's (see FIG. 16A, above). The scan must provide sufficient crown height and extended gingiva coverage. For example, for palatal coverage, the palatal scan may capture between about 2-3 mm beyond distal surface of the D, E and 6 (e.g., permanent molar) teeth, as shown in FIG. 16A. The crown height must for these teeth must be scanned to about a 3 mm×3 mm square footprint on the side of these teeth for placement of retention attachments on the E's and 6's. For example, on the E's, attachments will be located in center of crown. On the 6's, attachments may be located on the mesial cusp of crown. This is illustrated in FIG. 19A-19B, showing sufficient (FIG. 19A) and insufficient (FIG. 19B) scanning (e.g., in a lateral 3×3 or other dimensioned region 1905, 1905'). The scanned gingival coverage should capture the gingival around the D's, E's and 6's, to within 5 mm below the CEJ line, as shown in FIG. 20A. FIG. 20B shows insufficient coverage.

Figure 21A:
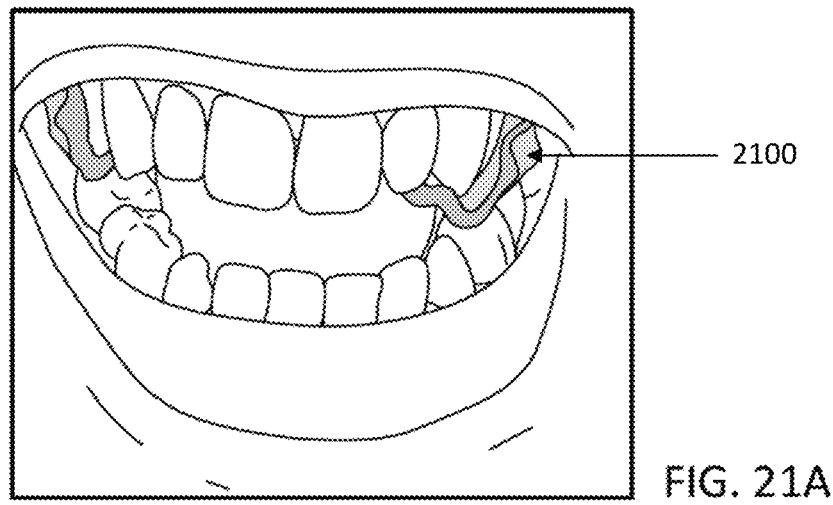
FIGS. 21A-21C illustrate a method of inserting a palatal expander 2100 in a patients teeth including, placing the device in the patient's mouth on the upper dental arch (FIG. 21A), and biting down on the palatal expander apparatus (FIGS. 21B and 21C) to seat the device and secure it over the teeth, including in some examples, onto the attachments.
Figure 21B:
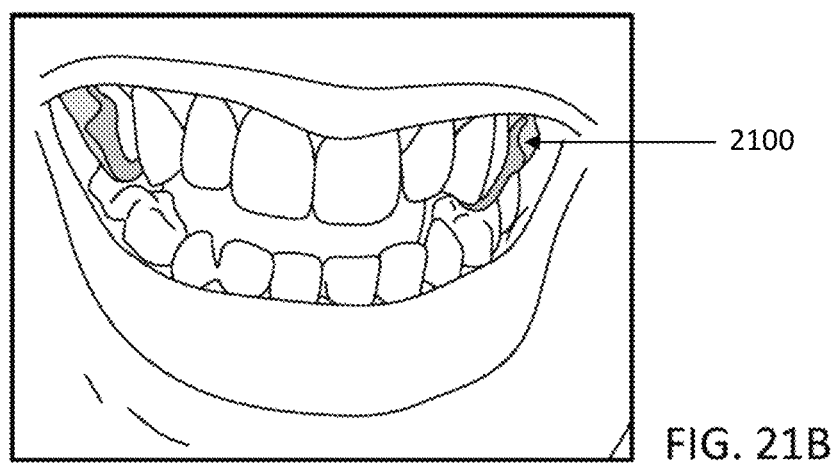
Figure 21C:
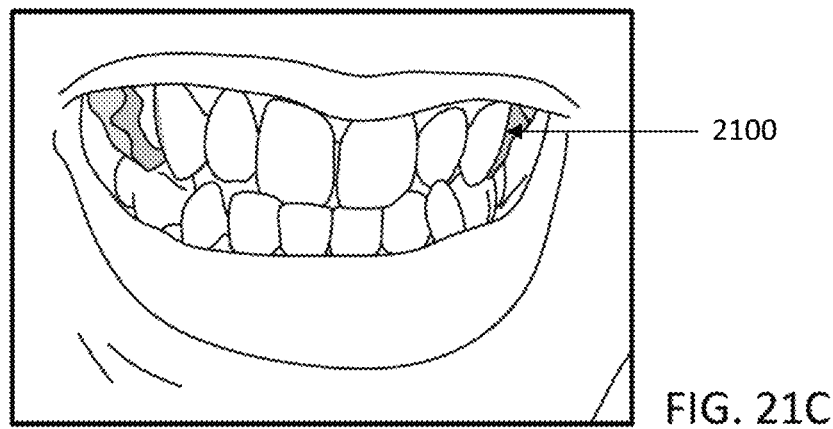

In use, any of the apparatuses described herein may be inserted by the patient, and/or by a dental professional. For example, a patient may be provided with instructions for inserting a palatal expander including first brushing and flossing the teeth. The patient may also confirm (e.g., by reading the markings on the palatal expander) that it is the correct device. The palatal expander may then be cleaned, e.g., with a soft bristle toothbrush, water and a small amount of toothpaste) and rinsed (e.g., with cold tap water). As shown in FIG. 21A, the device 2100 may then be inserted into the mouth, and, as shown in FIGS. 21B and 21C, the palatal expander may be fully engaged on one side of expander first, then applied over the teeth of the other side. The patient may then bite down to fully seat the device.

Figure 22C:
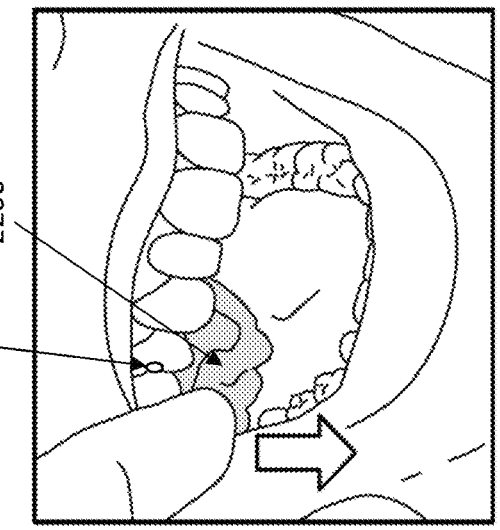
FIGS. 22A-22C illustrate removal of a palatal expander apparatus including a detachment region by inserting a fingernail into the detachment region (FIG. 22A), pulling buccally away from the teeth (FIG. 22B) to disengage from any attachments, and then pulling down (FIG. 22C) to remove the apparatus from the teeth.
Figure 22B:
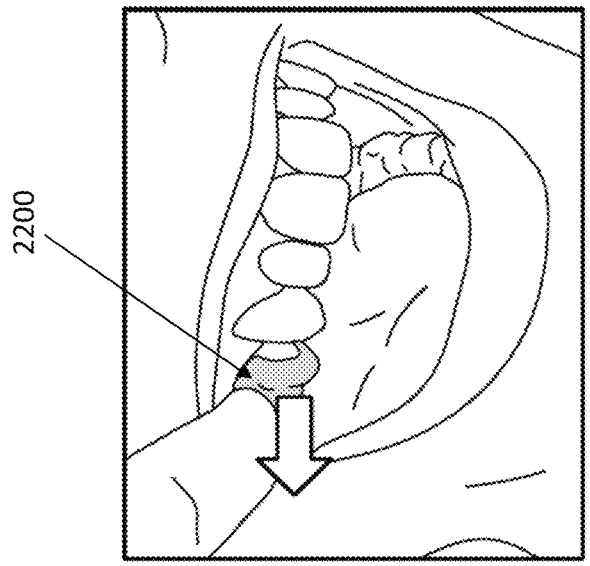
Figure 22A:
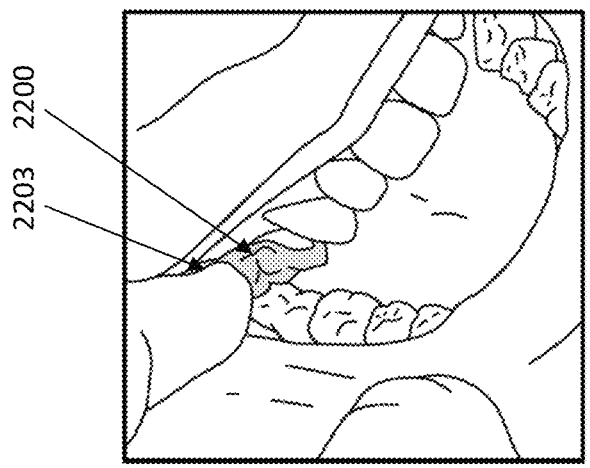

Similarly, the patient may be instructed to remove the device, as shown in FIGS. 22A-22C. To remove the device, the patient may insert a fingernail 2203 or other device (see, e.g., FIG. 15, above) inside of the gap (FIG. 22A) at the gingival edge above the attachments, and may then pull out buccally to disengage the palatal expander 2200 from the attachments 2205 on at least one side (FIG. 22B) then pull down (FIG. 22C). Once removed, the palatal expander may be cleaned with a soft bristle toothbrush, water and a small amount of toothpaste. When moving to the next stage (palatal expander), the used palatal expander may be stored or discarded.

EXAMPLE 1: TREATMENT TO EXPAND A PATIENT'S PALATE

The methods an apparatuses described herein may be used to treat young pre-pubertal subjects when a child's mouth has grown sufficiently to address the structure of the jaw and teeth while the primary teeth are still in the mouth. Palatal expansion may be used prior to aligner treatment; during this treatment, arch development occurs by increasing arch width or depth via dental or palatal expansion to create space for more permanent teeth to erupt. Typically aligners may not produce the required minimum transverse force needed for skeletal palatal expansion.

The palatal expander systems described herein may assist in skeletal and dental arch development. An example system may consist of a series of transpalatal arch feature that is intended to produce palatal expansion. The feature is designed to move/expand the palate by expanding the maxillary arch outwards buccolingually for transverse palatal size increases by exerting force on the maxillary posterior teeth. There will be no planned treatment for lower arch for the early feasibility clinical study. The expander wear time will be full-time. There are a series of expanders that are exchanged daily, with an expansion rate of 0.25 mm/day. The number of expanders is determined by the amount of expansion desired. This also determines the amount of time the expansion will be performed. The device is manufactured after obtaining digital impression scans of the child's teeth and palate.

The patient may be provided the same rate of treatment, where the length will depend on the amount of expansion, which will be determined by the dentist or dental practitioner. The palatal expander may be changed once a day with an expansion rate of 0.25 mm per day. The amount of expanders provided to patient may be based on the desired expansion amount. Following the expansion period, there will be a "holding period" that the patient may be held in. The holding period may have a duration of between 1-3 months. After the holding period, the patient may use a series of aligners to align the teeth.

The patient may have stable 6 s, Ds and Es, and typically has a need of maxillary expansion. The patient may have clinical crown surface for attachment placement (3 mm H, 3 mm V) and may have at least ½ roots present confirmed by x-rays. The patient may be screened before beginning treatment, including a standard dental history exam, and an intraoral scan. An intraoral scan may include a 3-dimensional optical digital scan of subjects dentition and palate which is captured, e.g., using an iTero™ scanner. In addition, radiographs and/or a CBCT Scan (which captures data using a cone-shaped X-ray beam) may be taken. This data may be used to reconstruct a three-dimensional (3D) image of the patient's dentition and maxillofacial region, offering an undistorted view of the dentition that can be used to accurately visualize both erupted and non-erupted teeth, tooth root orientation and anomalous structures.

Patients are recommended to wear the device for a 24-hour period each day. Each device is recommended to wear for 1 day. The patient is requested to eat with the device as normally would. It is suggested that the patient remove the device before bedtime, brush their teeth before placing the next device.

The potential benefits of this treatment may include expansion of palate and arches, potentially correcting harmful and detrimental malocclusals. Expanding the palate may allow more space for permanent teeth to erupt, due to the space provided. Because the expanders are removable, patient hygiene may be improved. Because the expanders are made to the patient's anatomy, comfort may be improved without requiring the use of metal screws or brackets to irritate the tongue or palate. Expansion of the palate may improve the ability for the patient to breathe, increasing airway in nasal and areas.

The methods of treatment described herein may include a series of doctor-prescribed, custom manufactured, plastic removable orthodontic appliances that are designed for the expansion of the skeletally narrow maxilla (upper jaw, dental arch and/or palate) during early interceptive treatment of malocclusal. These apparatuses may be intended for use to expand the skeletally narrow maxilla (upper jaw, dental arch and/or palate).

Any of the apparatuses described herein may be used with (e.g., in conjunction with) a fixed skeletal expander and/or oral surgery, to correct severe crowding or jaw imbalances. If oral surgery is required, risks associated with anesthesia and proper healing must be taken into account prior to treatment.

Any of the features and methods described herein for palatal expanders may be applied to other removable orthodontic appliances, including in particular dental aligners. For example, the detachment regions, hinge regions, slots/slits, removal tools, etc., described herein may be similarly incorporated into a dental aligner or series of dental aligners.

In addition, although the examples described herein are illustrated in the context of palatal expanders for use with one or more attachments on the teeth, these apparatuses and methods may be used for apparatuses that do not include attachments. For example, detachment regions, smoothed lower surfaces, and the like may be used with palatal expanders that do not include attachment regions (for mating with an attachment on a tooth).

Fabrication Methods

Any of the palatal expanders described herein may be fabricated directly, for example by digitally designing the expander and fabricating the digital model using a 3D printer or other direct fabrication technique. Alternatively or additionally, the palatal expanders described herein may be fabricated indirectly, for example, using a physical model of the patient's dentition (e.g., a ceramic, plastic, plaster, etc. model), onto which materials are applied to form the palatal expander. Indirect fabrication methods may include lamination, in which the palatal expander is formed from laminated layers or portions. Indirect fabrication methods may also include direct fabrication of the model using a direct fabrication technique (e.g., 3D printing, etc.). Hybrid fabrication methods, in which a portion of the expander is directly fabricated, and then combined with additional elements (including layers or supports), with or without the use of a model of the patient's dentition, may also be used.

Before or at the start of nay of the fabrication methods described herein, the user (technician, engineer, dentist, dental assistant, etc.) may plan the palatal expansion series. When planning the series, the user may indicate targets for the series of palatal expanders. Targets may include the final and any intermediate palatal expansion positions, maximum and/or minimum forces to be applied, locations of forces to be applied within the mouth, separation between the palate and the palatal expander, maximum and/or minimum expansion per expander (e.g., separation between molars on opposite sides of the patient's mouth), number of palatal expanders in the series, maximum and/or minimum amount of time that each palatal expander is to be worn, etc. In some variations, the user may indicate the materials and/or thicknesses and/or curvature of the palatal expander. Any of these targets may be automatically selected or chosen, or defaults may be provided and adjusted by the user. Any of these target may be constraints or may be allowed to vary, including vary within predetermined and/or user-selected ranges.

Once the series of palatal expanders has been planned, they may be fabricated; fabrication may be performed all at once or in batches (e.g., provided as a complete or partial set, such as days 1-4) or separately, and provided to the patient. Each expander may be marked to separately identify it, including marking to indicate a preferred order (e.g., first, second, etc.).

In any of the indirect fabrication techniques described herein, the expander may be formed on a physical model that has been adjusted (e.g., by moving palate) to a desired position on the way to the final expanded position. The physical model may include attachments (buttons, etc.) for coupling to attachments (e.g., trough-holes, etc.) on the expander, as discussed above.

When a physical model is used (either manually generated from impressions of a patient's teeth or from one or more digital models), the expander may be fabricated by molding a sheet of material over the model. In general any appropriate material may be used for the expander, as long as it is sufficiently biocompatible and possesses the rigidity and physical characteristics necessary (either on its own or in combination with other materials). For example, an expander may be formed of an acrylic material that is applied in a sheet over a physical model, formed (e.g., thermoformed, set) and then cut and/or trimmed. In various examples provided herein, the material may form (including set) by temperature and/or light or other appropriate means. For example, an expander may be formed of a thermoplastic curable polymer.

Figure 33A:
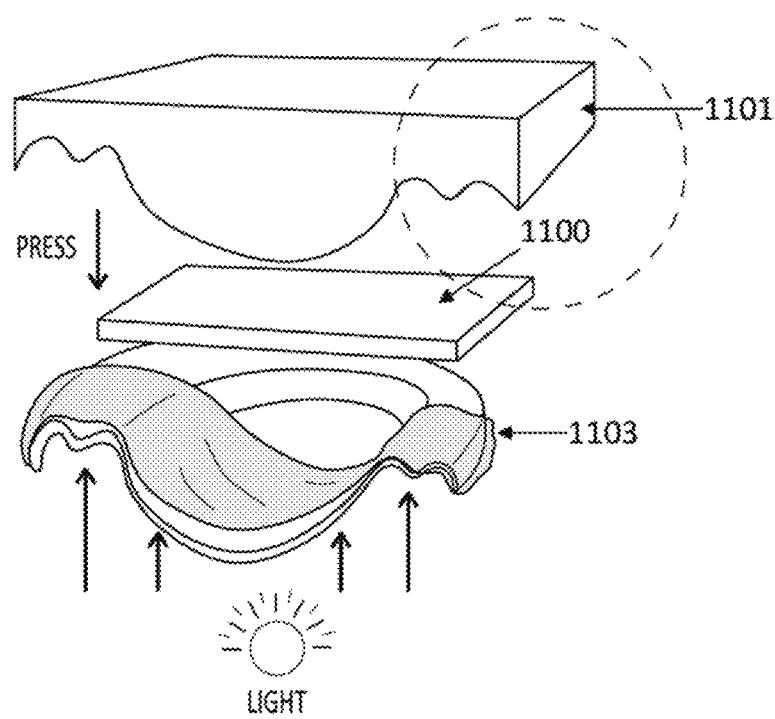
FIG. 33A illustrates one method of forming a palatal expander as described herein using a stamping process.
Figure 33B:
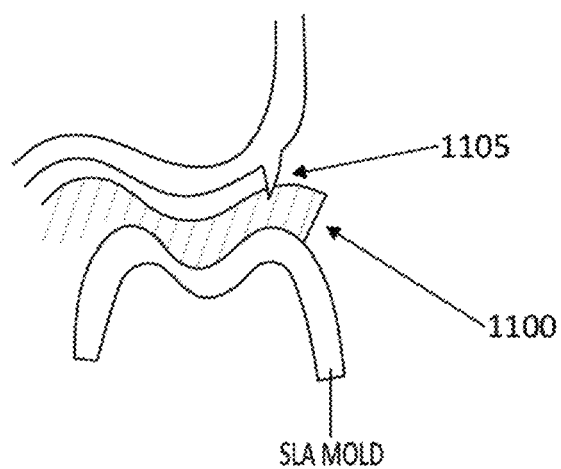
FIG. 33B shows an enlarged detail of a palatal expander formed using this method.

An expander may be formed using a stamping process. For example, FIG. 33A illustrates an example of a stamping process in which a top "male" mold 1101 is used to press a sheet of material ("triad sheet" 1100, comprising a thermoplastic material) into a bottom "female" mold 1103 of the expander. The top and bottom molds may be formed of a 3D printed material (e.g., acrylic material such as SLA) that may be generated from a digital model of the expander. This method includes a thermoforming step, as the film is first stamped, then thermoformed after or during the stamping process, as shown. The "triad sheet" 1100 in this example is an acrylic sheet having an appropriate thickness. As shown in FIG. 33B, he mold may itself include a cutting edge 1105 to help with trimming the border of the stamped sheet, or it may be trimmed separately. Further, curing of the sheet may be done after stamping (or during stamping in some variations). Post-processing may include trimming a polishing/cleaning of the appliance so that the edges are smooth. In this example the thickness of the material may be defined by the mold, and each mold is customized to the patient. The method shown in FIGS. 33A and 33B provide a sandwich technique in which a curable, pliable, acrylic sheet is pressed between male and female molds. The expander is thus thermoformed on the positive mold following a thermoforming method; the acrylic sheet may be placed on top. Excess from the pressed acrylic sheet may be trimmed off by a cutting edge 1105 which also acts as a spacer between two molds. The acrylic sheet can be cured by light which passes through the transparent mold from either positive mold side or negative mold side.

Figure 34A:
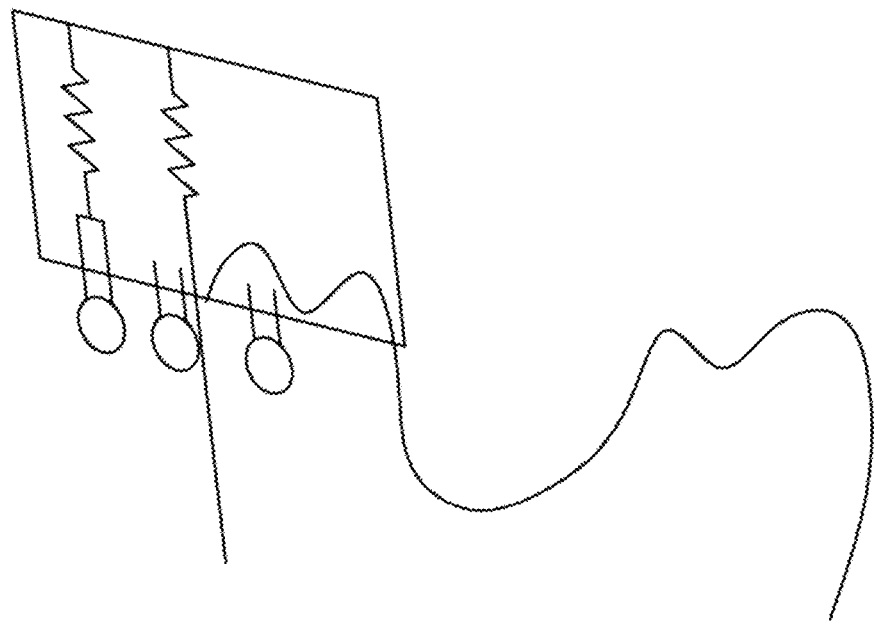
FIG. 34A illustrates a method of forming a palatal expander as described herein using a rolling (spring roller) process.
Figure 34B:
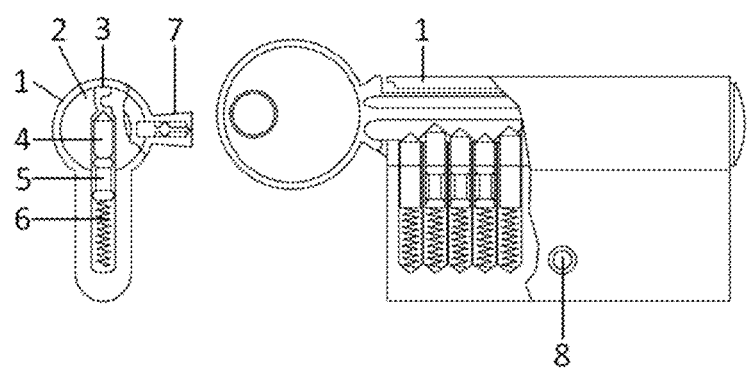
FIG. 34B is an example of a general spring rolling process that may be used.

FIG. 34A is an example of a spring rolling technique for forming an expander. In this example, a mold of the patient's jaw may be made. Next, an expander may be thermoformed on top of the mold, and an acrylic monomer resin or other adhesive may be sprayed on top of plastic sheet. Thereafter the triad sheet may be applied atop the plastic film, and a roller may be used to press the triad sheet on top of the plastic sheet. As illustrated in FIG. 34B, this roller technique may use a similar principle to that of mechanical lock, with multiple pins slotted inside holes, with spring that can push pin out. When the roller is moved on top of Triad sheet, the pins may be pushed in, and may thus conformed to the shape of the tooth crown; sufficient force may press the triad sheet on the crown surface tightly. The force can be controlled by the spring strength for best result. Thereafter, a UV light may be used to cure the Triad sheet.

Figure 35:
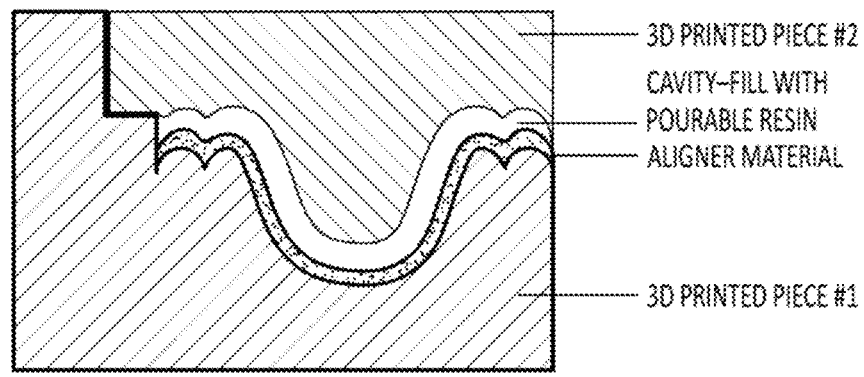
FIG. 35 shows a method of forming a palatal expander as described herein using a casting process.

FIG. 35 illustrates an example of a casting technique. In this example, the material is formed first forming the mold (e.g., by 3D printing). The material may then be thermoformed and the acrylic to form the expander may be placed on it within the cavity (by filing with resin) for casting. Once cured, the two molds (top and bottom) may be removed and the appliance cut off of the mold.

In this example there are two molds (piece #1 and piece #2). When the expander to be formed of two materials (e.g., a first material and a pourable resin), the first material may be thermoformed to the positive mold (e.g., as described above), and the positive mold may be fixed to the negative mold. The molds may be designed such that there is a cavity in which the thickness is optimized for device stiffness. The pourable resin may then be poured into the cavity and cured. The molds can then be separated again.

Figure 36:
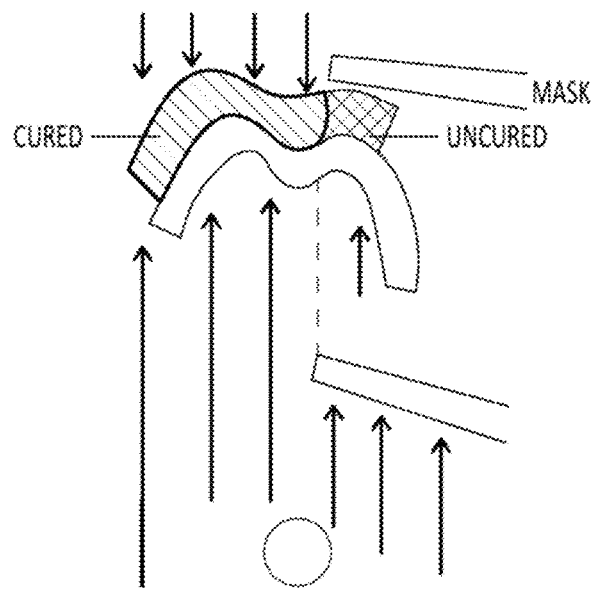
FIG. 36 is another example of a method of forming a palatal expander as described herein using a curing mask.

FIG. 36 shows another variation of a fabrication technique in which a mask may be used to limit or prevent curing as the device is formed. In this example, areas that should remain uncured (e.g., for removal) may be masked; this may allow a precise cut line of the acrylic sheet of the device. This technique may be applied to any of the methods described herein. A thermal mask for thermal curing process may be used; for light/UV curing techniques, an optical mask may be used.

Figure 37:
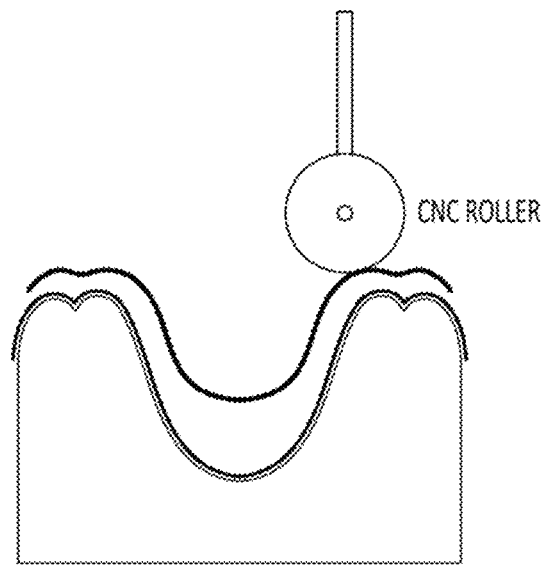
FIG. 37 shows a method of forming a palatal expander as described herein using a CNC (computer numerical control) roller.

FIG. 37 illustrates an example of a method of fabrication of an expander in which a roller (e.g., "CNC roller") is used. In this example, an expander material may be thermoformed to the mold. For example, an uncured, pliable, acrylic sheet may be placed on the expander material (e.g., mold). A roller controlled by CNC (computer numerical control) may then be used to flatten the acrylic sheet to the desired thickness, which may be non-uniform (e.g., variable).

Figure 38:
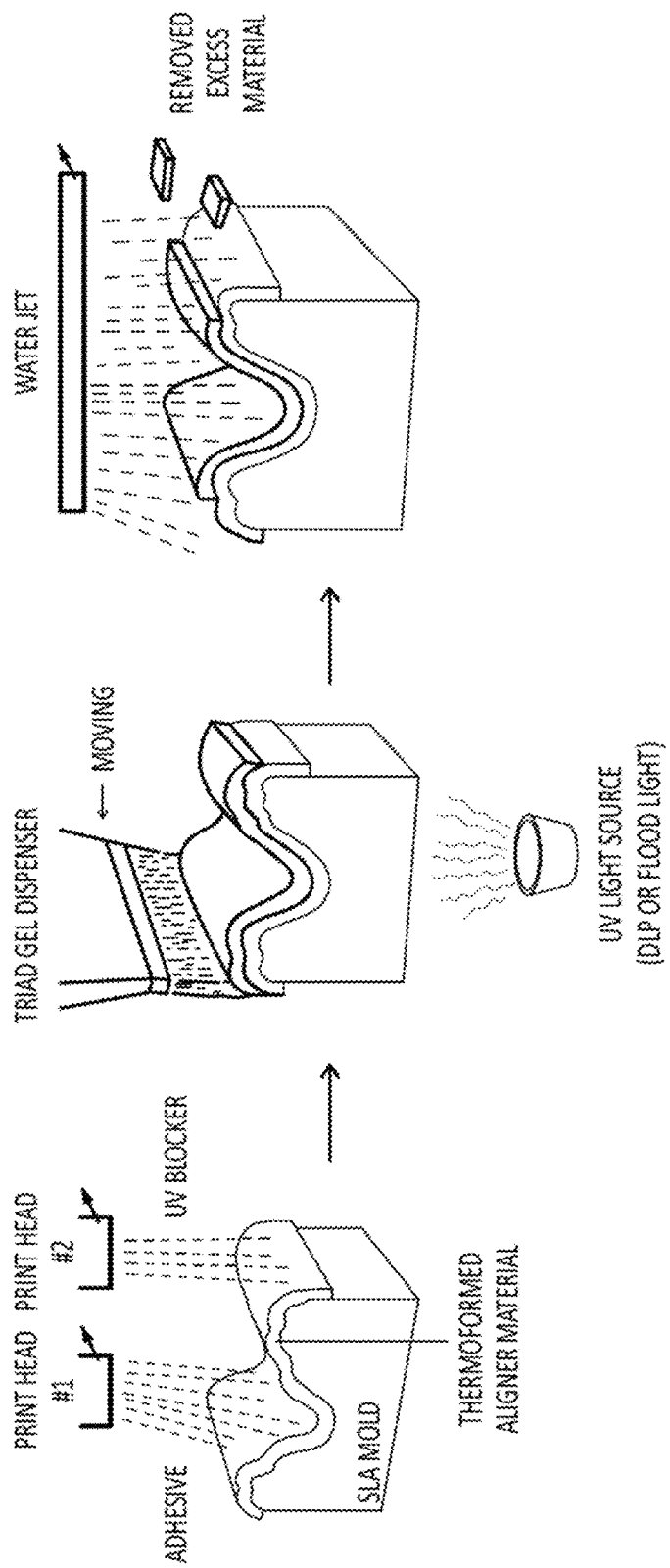
FIG. 38 illustrates a method of forming a palatal expander as described herein using a deposited adhesive and mask.

FIG. 38 is another example of a fabrication technique in which multiple layers may be deposited, using masks to control the final shape/dimensions. For example, as a first step, the expander material may be thermoformed onto a mold, such as an SLA mold, as shown on the far left. Thereafter an adhesive binder solution may be printed on one or more specific areas, e.g., by inkjet printing. Thereafter, a UV blocker solution may be printed on a specific area, e.g., using a second injection print head (or the same print head using the second solution). Thereafter an acrylic resin (e.g., triad gel) may be disposed on top of this, or a triad sheet may be pressure formed on top. Thereafter a UV light may be used to cure the triad material and to activate the UV adhesive binder material (see FIG. 38, middle). The form may then be cleaned and cut, for example, by applying a high-pressure water jet to wash away uncured material (gel), cleaning the entire device (FIG. 38 right side). Finally the device may be laser cuts, to trim the expander on a trim line.

Figure 39:
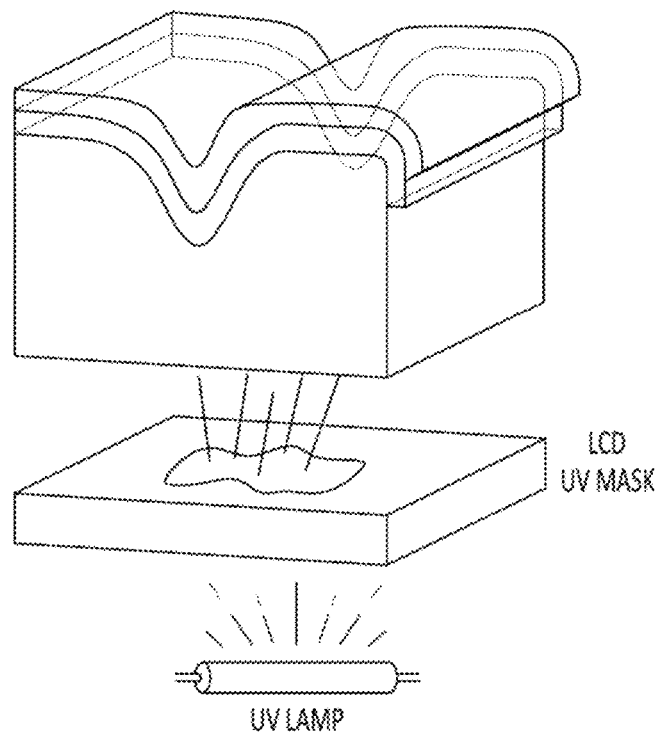
FIG. 39 illustrates a method of forming a palatal expander as described herein using an LCD mask.

FIG. 39 illustrates and alternative method to use a UV blocker, in which a dynamic UV mask (like a LCD mask) can be used. As an alternative for a UV blocker, a UV DLP or LCD projector can be used instead of general UV lamp. This may allow more precise positioning. Similarly, optical masks (such as those used during photolithography) may be used, along with any other lithographic process.

Figure 40:
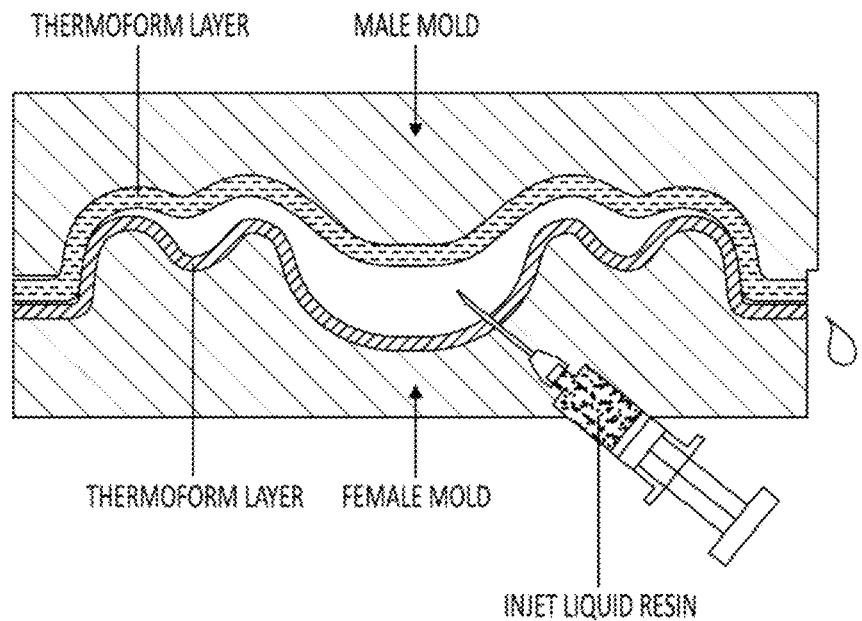
FIG. 40 illustrates a method of forming a palatal expander as described herein using injection molding (e.g., showing an expander top and bottom injection mold).

In FIG. 40, an injection molding method that may be used is described. In this example, the mold may first be created including a top (e.g., male) and bottom (e.g., female) mold, including the tooth crowns, with a gap included there between. The gap may form the shape of the expander device. A thin plastic sheet may be placed on both top and bottom mold halves for thermoforming, and the mold pieces may be clamped together. Thereafter, fluid may be injected/filled into the mold; the fluid may be a liquid resin that is injected into the gap/cavity between the two molds. Excess resin may be made to flow out of the gap through holes/exit ports. Light may then be used to cure the resin. The final device may be removed, trimmed, cleaned and polished, as mentioned.

Figure 41:
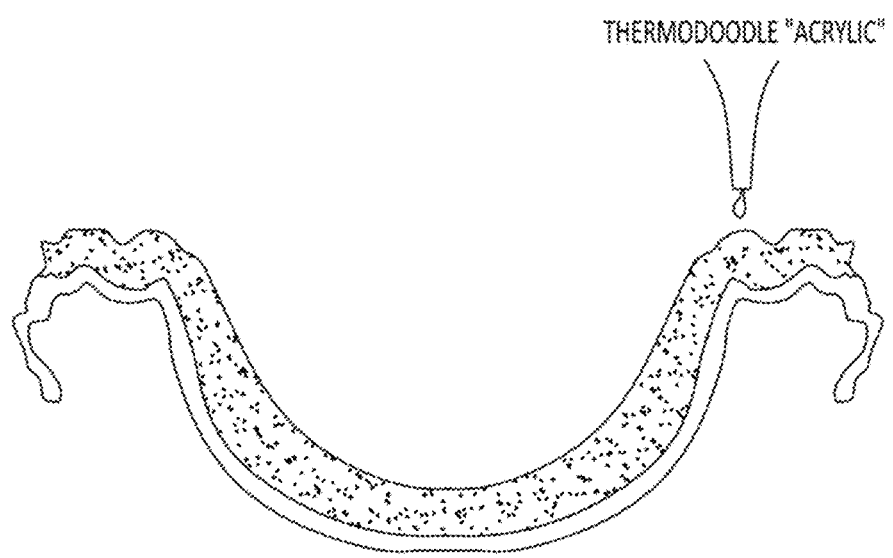
FIG. 41 is an example of a method of forming a palatal expander by a thermal dispensing ("thermo-doodle") method.

FIG. 41 illustrates another method for printing all or a portion of an expander. For example, in FIG. 41, the expander is formed by printing a thermosetting material onto a base. In FIG. 41, core material (e.g., acrylic) is deposited by heating and dispensing onto a thermoformed base layer. A variable thickness can be applied, as needed, and controlled by the digital design of the expander. Automated equipment may be used to dispense and apply the material. After cooling, the core material may be laminated to the base layer. Additional layers may be selectively applied.

Figures 42, 43:
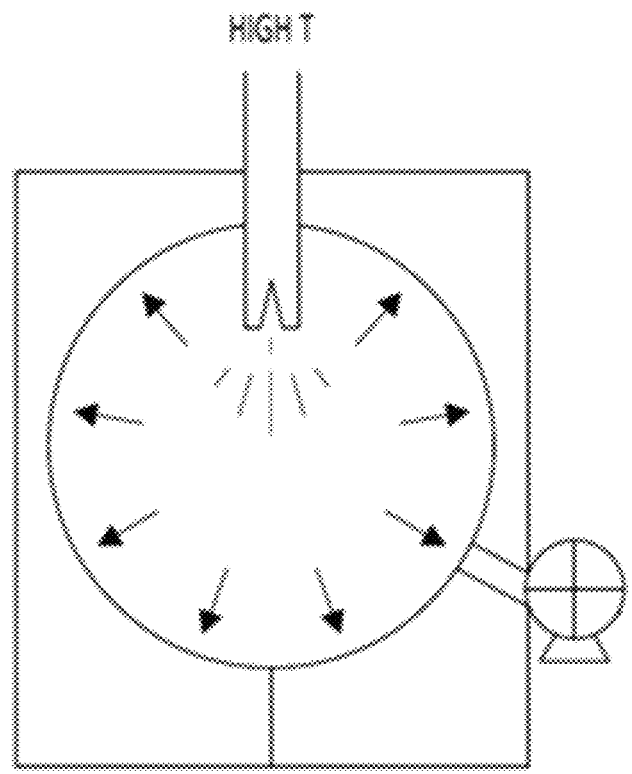
FIG. 42 illustrates a method of forming a palatal expander as described herein using blow-molding.
FIG. 43 shows a general method of forming a palatal expander as described herein by deposition.

All or part of an expander may be formed by blow-molding, as shown in FIG. 42. In this example, blow molding may be used to make a hollow transpalatal arch (TPA), similar to the manner in which PET beverage bottles are made. The hollow TPA can be filled with solid materials at subsequent steps. The molding block may be formed and used in standardized sizes like small, medium, and large; customization may occur in downstream steps.

As already described, deposition may be used to form any of the expanders described herein. FIG. 43 shows an example of a generic method for using deposition. Any combination of dispensing or deposition methods and systems can be utilized for particular steps of the fabrication processes described herein, based on the material properties and raw format of the expander. For instance, for low viscous solutions, a dispensing mechanism can be used, while for high viscous solutions, extrusion and deposition mechanism used. For example, pneumatic pressurized nozzles, Auger valves, solenoid valves, ultrasonic print heads, thermal print heads, piezo print heads and etc. can be used.

Figure 44:
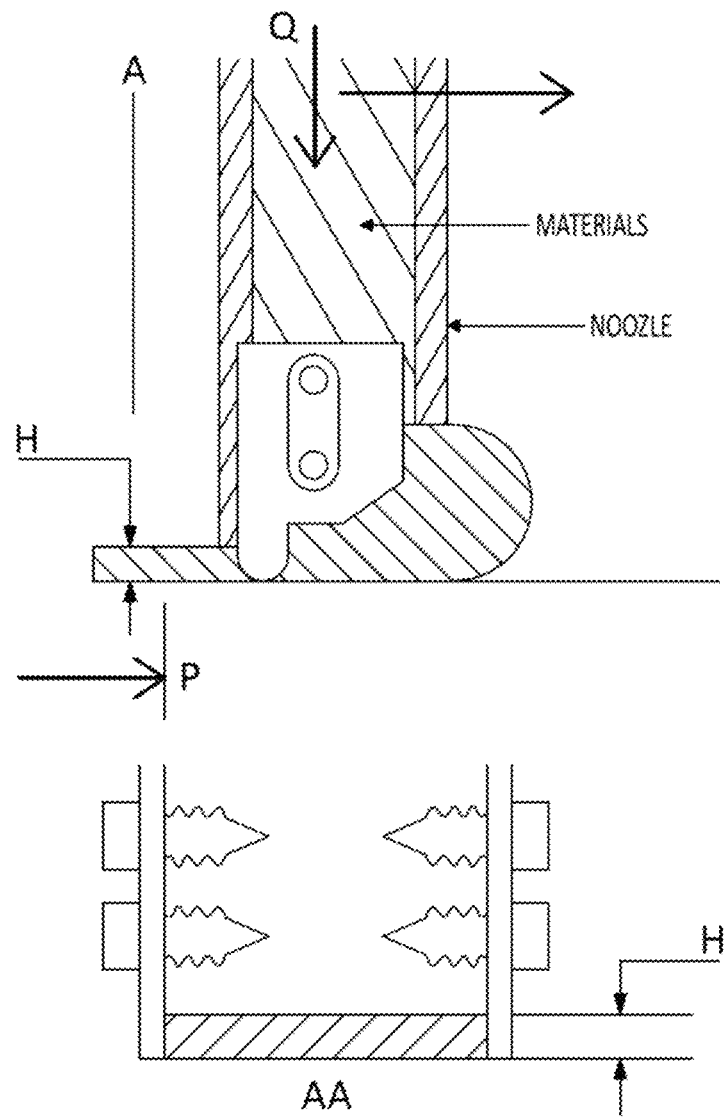
FIG. 44 is an example of forming a palatal expander by applying stiffening material (referred to herein as a "doctor blade" method).

FIG. 44 illustrates another method of forming an expander in which a nozzle is used to apply a heated acrylic material (e.g., triad gel), and one or more mechanical shapers/cutters ('blades') may be used to cut the material. In this method, stiffening materials may be applied on a curved expander surface to a well-defined thickness. The thickness of the material can be tuned by adjusting the legs of the applicator as the material is laid down. The apparatus forming the thickness can be heated for thermal responsive materials.

Figure 45:
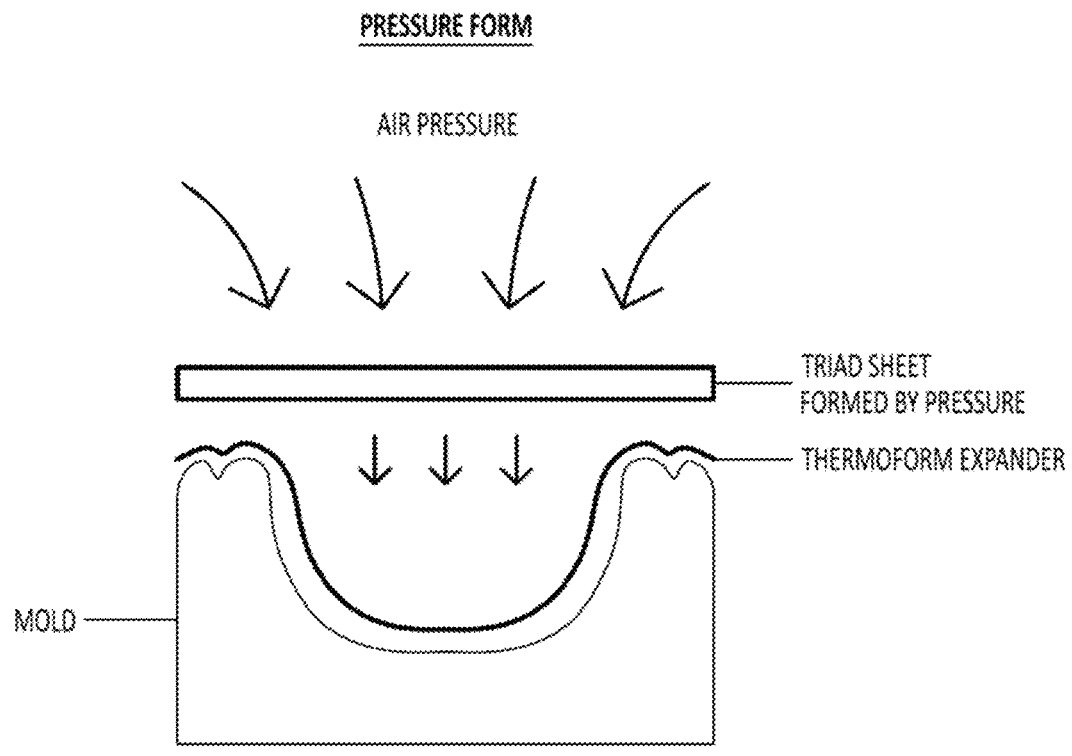
FIG. 45 show a method of forming a palatal expander as described herein using pressure-forming.

FIG. 45 shows another example of a pressure forming method for forming an expander. In this example, air pressure may be used to mold/conform the material (e.g., a triad sheet) to the expander. Initially a sheet of material may be thermoformed onto the mold (forming the "thermoform expander" on the mold, as shown in FIG. 45). An adhesive may then be added onto the mold using air pressure, but not heat, to "press" the triad sheet onto the expander. This may be used to select and modify the thickness of the device. Next, CNC may be used to cut off the excess expander, and the material may be cured.

This pressure forming technique may be performed using a pliable acyrlin sheet that is placed onto a thermoplastic material, for example. The positive mold is used to form the thermoplastic on, and pressure is applied at different pressures from different locations. An intermediate material (such as a rubber sheet) may be used to help capture the sheet onto the mold (e.g. by placing the rubber sheet that between the mold and the mold and sheet (or between the air pressure source and the triad sheet.

Direct Fabrication

As discussed above, direct fabrication may be used to make any of the expanders described directly, using as input a digitally designed expander (e.g., a digital file specifying the geometry. Thus, these apparatuses may be formed without the need for a physical model of the patient's teeth/gingiva/palate. Direct fabrication may include 3D printing or additive manufacturing (e.g., extrusion type, light polymerization type, powder bed type, lamination type, powder fed type, etc.).

Figure 46:
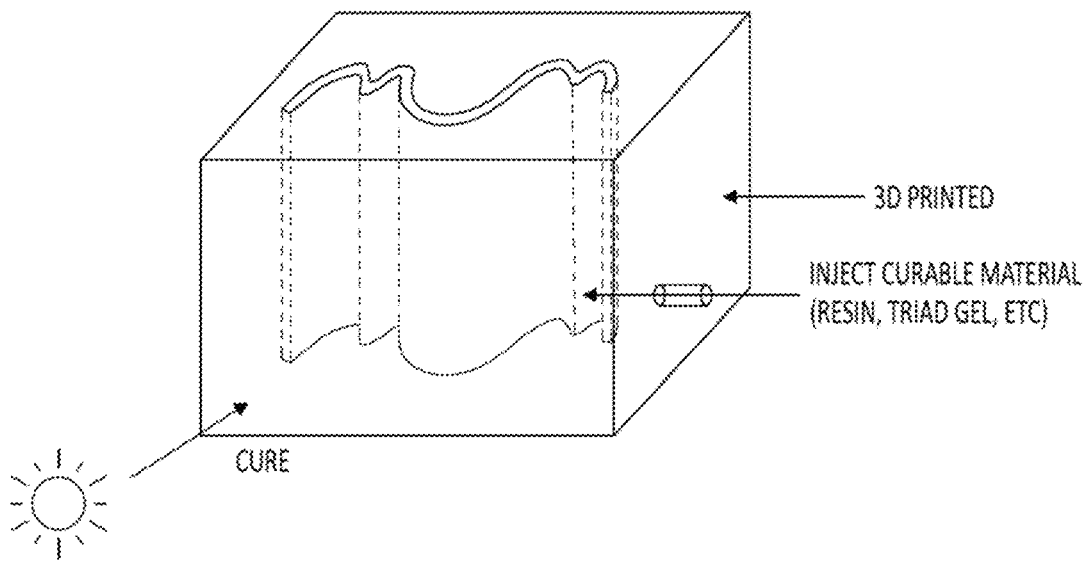
FIG. 46 is an example of a direct fabrication method of forming a palatal expander as described herein by injection molding.

For example, FIG. 46 illustrates one example of a direct fabrication process involving injection molding. In this example, the mold can be 3D printed (the entire casting mold) and injection molded. For example, the entire casting block may be made by 3D printing, and the block may have a negative shape of the final design. The block may have an injection port, which allows injection of the thermal or light curable materials to fill the cavity. After the injected material is cured, the mold may be cracked and opened.

Figure 47:
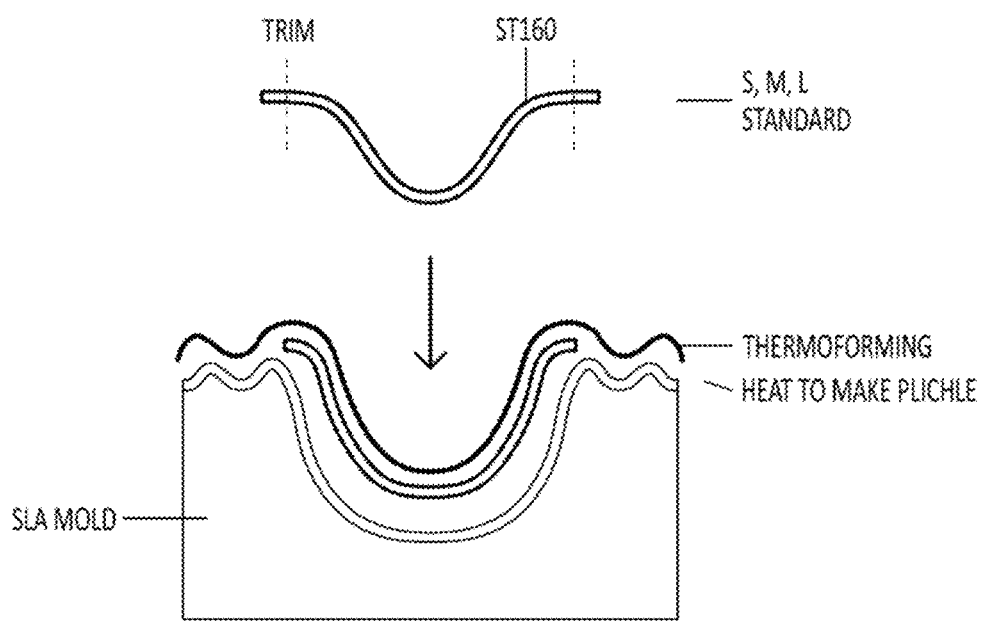
FIG. 47 is another example of a direct fabrication method of forming a palatal expander as described herein.

Another example is shown in FIG. 47, illustrating a standard method comprising a dual layer system of direct thermoforming. This design entails fabricating only a few standard TPA geometries with the aim of forming standardized components with minimum customization requirements. The standard TPA (base) may be milled to the custom shape of the patient's occlusal line. The TPA stiffener may then be attached to an expander by a thermoforming sandwich (e.g. a top and bottom layer are expander material), with the top and bottom being attached by an adhesive and/or mechanical interlock.

Figure 48A:
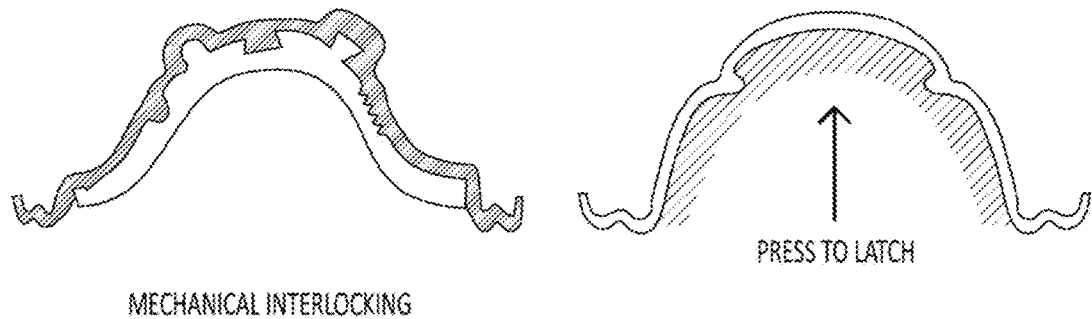
FIGS. 48A and 48B illustrate another example of a method of forming a palatal expander as described in which the expander includes a mechanical interlock/latch.
Figure 48B:
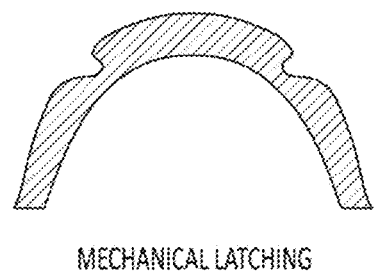

FIG. 48A illustrates an example of a mechanical interlock or latch. In this example, the device is formed by including a mechanical interlock between the two components (e.g., an upper and lower layer). For example, the device may include some positive and/or negative features on stiffener and thermoform expander on top. To two layers (including the stiffer layer and the more pliable layer) may then interlock together. Similarly, in FIG. 48B, the two layers may mechanically latch together. Features of the layer may grab or interlock, for example a more pliable layer may interlock with a stiffener component after a press fit.

Figure 49A:
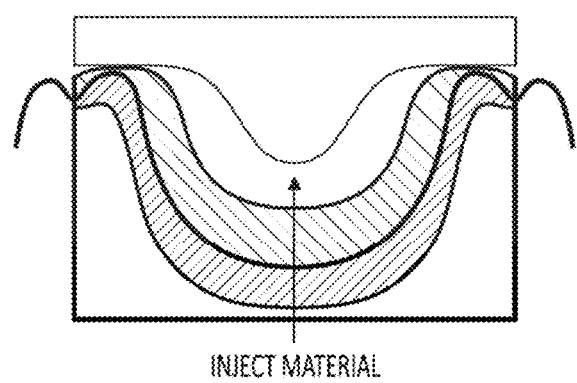
FIGS. 49A and 49B show another example of a method of forming a palatal expander as described herein by injection molding (insert injection molding).
Figure 49B:
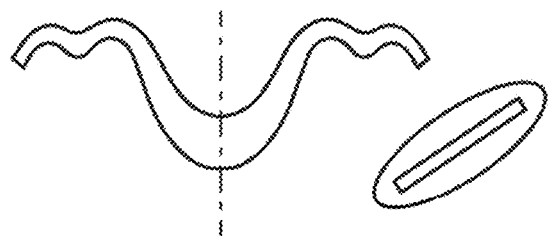

FIGS. 49A and 49B illustrate a method of insert injection molding to form an expander. In this example, the device may be formed by applying a thermoplastic material onto a mold (e.g., a 3D printed mold that is customized to the patient's mouth), then removing that piece and placing it into a custom-designed 3D printed mold so that there is space on the bottom and top into (e.g., between the 3D formed surface and the more generic surface), and then injecting resin into this space to form the expander. In general, some flexibility needed for the device to snap over the crowns and engage retention attachments while rigidity is needed from the transpalatal arch to generate transverse force and stiffness; the combination of flexible and rigid areas can be achieved by this method, for example, by inserting a thermoformed expander with a TPA into a mold where the rigid material can be injected on top of or around the TPA section of the expander.

Lamination

Any of the expanders described herein may be formed by one or more lamination processes in which multiple layers are sequentially or simultaneously attached together to form the expander. A lamination method may generally include using thermoplastic layers of various thicknesses and combining them to form various layers.

Figure 50:
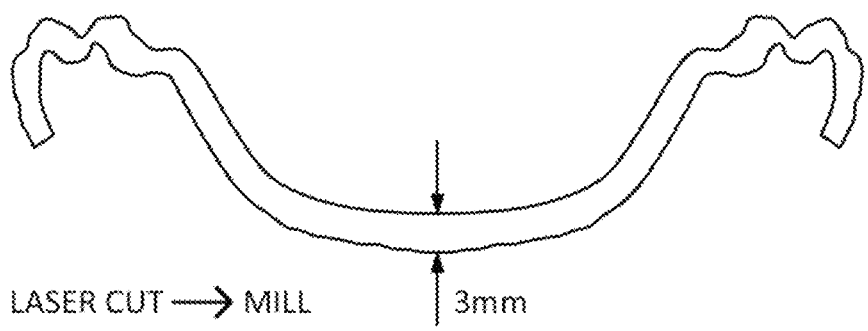
FIG. 50 illustrates a lamination fabrication process for forming a palatal expander.

For example, FIG. 50 illustrates a method of forming an expander having a single layer (a "one piece" expander). In this example, a one-layer thick sheet of thermoplastic may be used to thermoform the entire device, over a mold. An automated laser or mill process may then be used to cut the gingiva line and TPA sections out of the molded device.

Figure 51:
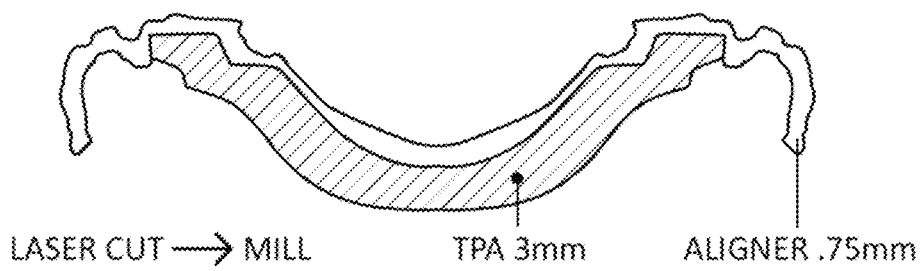
FIG. 51 shows an example of a lamination method using two lamination layers.

FIG. 51 illustrates a two-piece (two layer) apparatus. In this example, more flexibility may be achieved (e.g., on the crowns, to engage retention attachments, etc.) when the device is made by lamination. For example, the device may be formed by using a one layer thick sheet of thermoplastic to thermoform the TPA (transpalatal arch). As in FIG. 50, an automated laser or mill process may be used to cut TPA out. Once formed, the TPA may be placed into a mold and another layer may be thermoformed/laminated on top of the TPA; this layer may be the flexible layer that may extend over the crown and engage the retention attachments (e.g., attachment regions discussed above).

Figure 52:
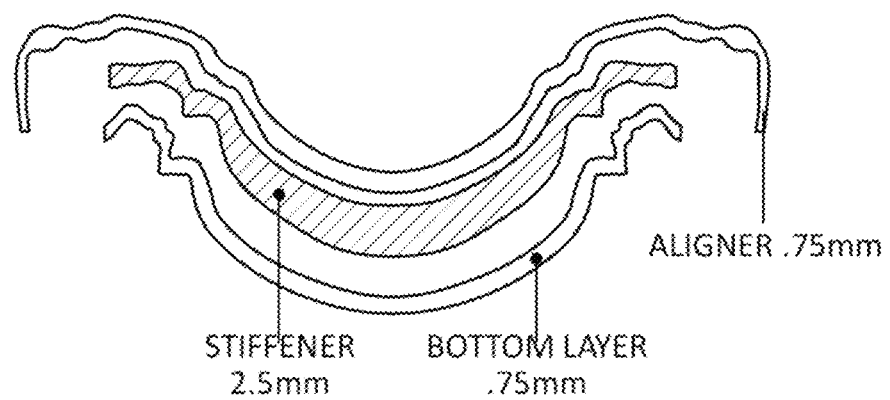
FIG. 52 shows an example of a lamination method using a lamination encapsulation method.

As many additional layers as necessary and helpful may be applied. See, e.g., FIG. 52. The layers may be laminated by an adhesive or by thermoforming. Note laser weld could be used to seal around the (middle) stiffening layer, which could be made by various fabrication methods with biocompatible material, to encapsulate it.

In general, lamination may use thermoplastic layers of various thicknesses that may be combined.

Figure 53:
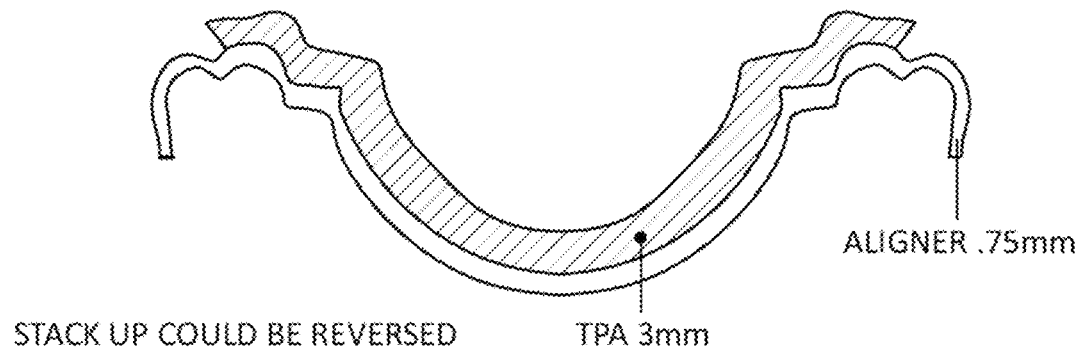
FIG. 53 is an example of a lamination method of forming a palatal expander using laser welding.
Figure 54:
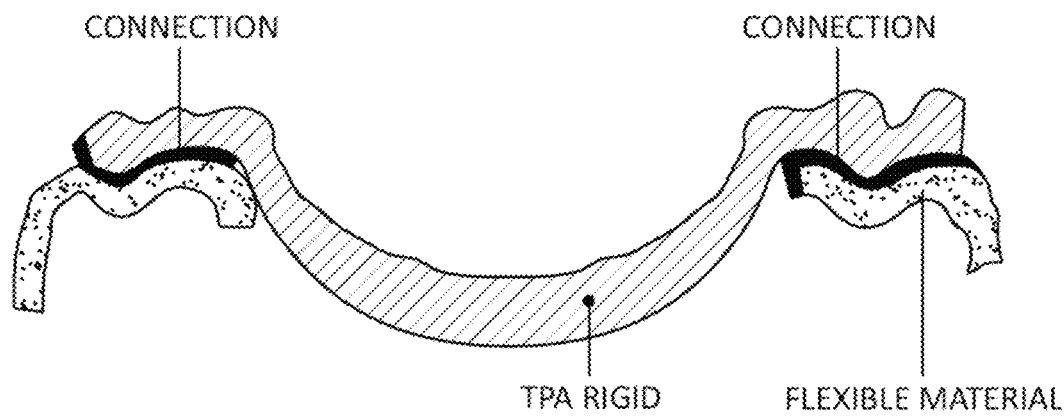
FIG. 54 is an example of a method of forming a palatal expander by lamination using separate regions (e.g., separate crowns).

For example, FIG. 53 illustrates another example of a method of lamination two (or more) layers by laser welding. In this example, a thick TPA region may be made by various fabrication methods with a biocompatible material, as described here, and laser welded onto the thermoformed base expander. Alternatively or additionally other adhesive methods could be used, including chemical adhesives. In FIG. 54, a separate tooth engaging region ("crown region") may be attached or laminated separately. For example, the TPA region may be laser welded onto a flexible section covering the crowns and engaging the retention attachments (the tooth engagement region).

Figure 55:
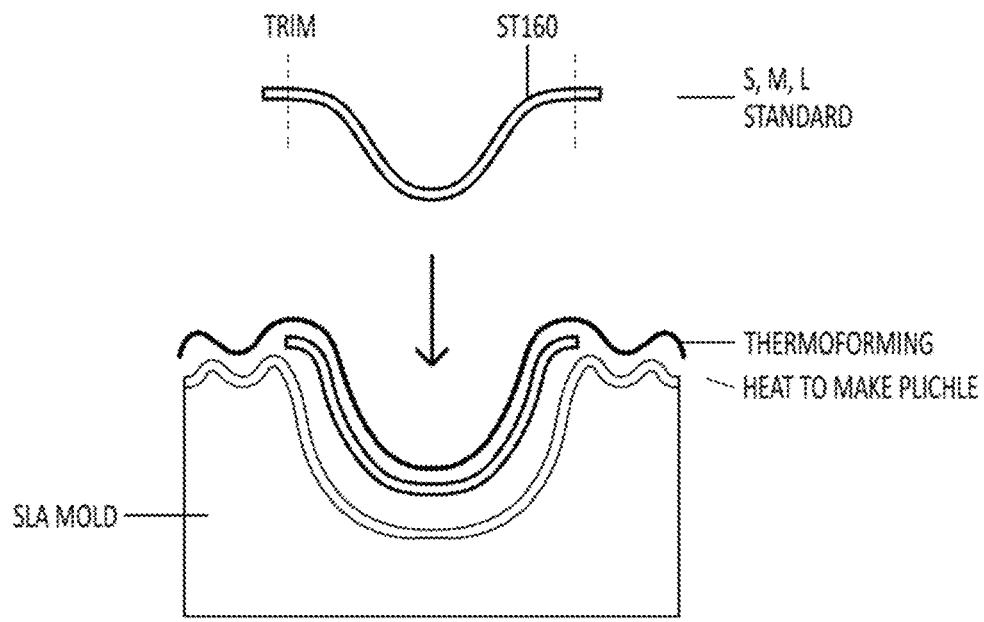
FIG. 55 illustrates a method of forming a laminated palatal expander using standard thermoformed material for the TPA (transpalatal arch).

FIG. 55 illustrates a method of thermoforming a specific "standard" TPA region to a custom portion to form an expander. This design may involve fabricating only a few standard TPA geometries (such as small, medium, and large) and using a thermoformed material to customize the other portions. The use of the thermoforming layer enables in-situ contouring of the standard TPA shape to the palatal shape of the patient by apply heat and pressure. Concurrently, a thin expander layer can be thermoformed onto the occlusal surface and laminated to the thicker TPA.

Figure 56:
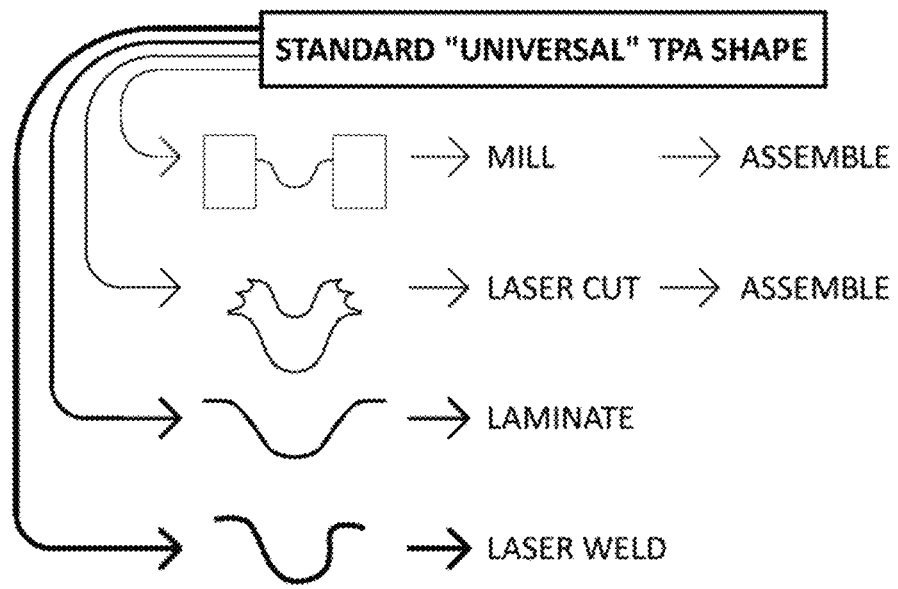
FIG. 56 is an example of a general fabrication process using a standard shape (e.g., "standard universal shape").

Similarly, FIG. 56 schematically illustrates various standard/universal shapes that may be used as part of an expander. For example, in an of these methods as appropriate the method may include the design of an injection molded "blank" (i.e. two large blocks joined by a "universal" TPA) in which the blocks (the tooth engaging regions) may be customized by milling the patient crown shape from the blocks or (2) Milling the entire device out of a single block.

In any of these variations, an injection molded "blank" (i.e. two blocks joined by a "universal" TPA) may be customized by milling a connecting geometry and use an adhesive to join it to an expander, and/or by welding (e.g., laser welding), as described above. Alternatively or additionally, an injection molded "blank" (i.e. two blocks joined by a "universal" TPA) may be customized by milling a mechanical feature that will be used to join to an expander. In any of these examples, an injection molded "blank" (i.e. two blocks joined by a "universal" TPA)—may be customized by milling a connecting geometry and laminate an expander shape over it for customization.

Any of the processes for injection mold customized may be used for making these devices. In general, using any method of direct fabrication or another technique, these devices may incorporate two or more materials as part of a rapid palatal expander. The transpalatal arch (TPA) region, also referred to as the palatal region, may be made from a stiffening material. Through covalent bonding or adhesives, the device may seamlessly transition from the stiffer palatal region into a more elastic material of the tooth retaining region to enable the device to be retained over crowns. The full device may look smooth.

Figure 57:
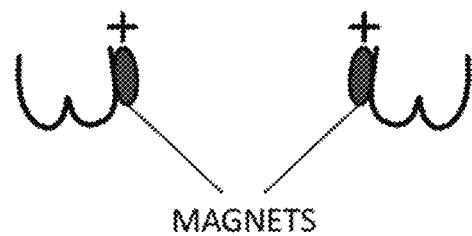
FIG. 57 is an example of a palatal expander that includes magnets.

Other variations of expanders described herein may include devices with additional force-applying elements, including magnetic elements, as shown in FIG. 57. In this example, magnets are placed on the left and right sides of the upper, posterior, lingual arch. The magnets have similar charges, such that they repel each other. This magnetic force provides the force to expand the palate. The magnets can then be inserted or adhered to an aligner, connected to metal bands, or can be adhered directly to the teeth or palate.

Figure 58:
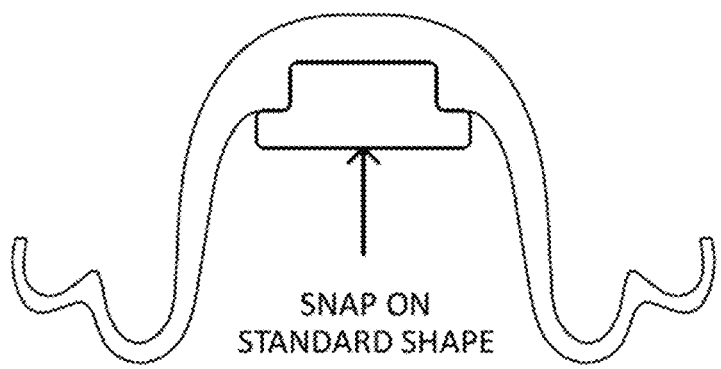
FIG. 58 is an example of a palatal expander using multiple snap-on elements.

In FIG. 58 the expander includes an occlusal surface and certain portion of palatal expander that may be are bonded on the patient crowns. A separate piece that applies an expansion force may be snapped on and placed between both the left and right bonded components and secured a certain distance between those two halves. The snap on component may provide the force expanding the palate and may be incrementally larger for each of the next stages of treatment. In this example, the occlusal surface and certain portion of palatal expander may be formed via any of above mentioned fabrication techniques including 3D printing, CNC milling, injection molding, or the like. The snap-on component can also be 3D printed, milled or molded.

Figure 59:
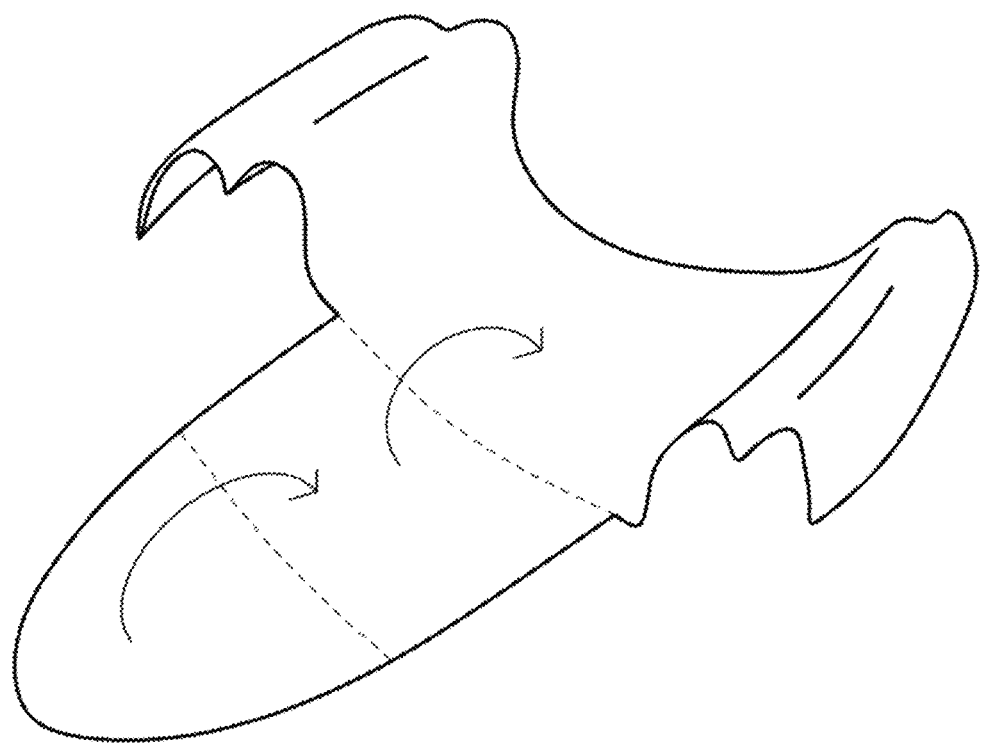
FIG. 59 is an example of a palatal expander that includes folds ("origami" design).

In general, the stiffness of the arch may be adjusted as described herein by using one or more different materials, and/or by increasing or decreasing the thickness. As shown in FIG. 59, the stiffness may also be adjusted by folding or creasing the palatal region.

When a feature or element is herein referred to as being "on" another feature or element, it can be directly on the other feature or element or intervening features and/or elements may also be present. In contrast, when a feature or element is referred to as being "directly on" another feature or element, there are no intervening features or elements present. It will also be understood that, when a feature or element is referred to as being "connected", "attached" or "coupled" to another feature or element, it can be directly connected, attached or coupled to the other feature or element or intervening features or elements may be present. In contrast, when a feature or element is referred to as being "directly connected", "directly attached" or "directly coupled" to another feature or element, there are no intervening features or elements present. Although described or shown with respect to one embodiment, the features and elements so described or shown can apply to other embodiments. It will also be appreciated by those of skill in the art that references to a structure or feature that is disposed "adjacent" another feature may have portions that overlap or underlie the adjacent feature.

Terminology used herein is for the purpose of describing particular embodiments only and is not intended to be limiting of the invention. For example, as used herein, the singular forms "a", "an" and "the" are intended to include the plural forms as well, unless the context clearly indicates otherwise. It will be further understood that the terms "comprises" and/or "comprising," when used in this specification, specify the presence of stated features, steps, operations, elements, and/or components, but do not preclude the presence or addition of one or more other features, steps, operations, elements, components, and/or groups thereof. As used herein, the term "and/or" includes any and all combinations of one or more of the associated listed items and may be abbreviated as "/".

Spatially relative terms, such as "under", "below", "lower", "over", "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if a device in the figures is inverted, elements described as "under" or "beneath" other elements or features would then be oriented "over" the other elements or features. Thus, the exemplary term "under" can encompass both an orientation of over and under. The device may be otherwise oriented (rotated 90 degrees or at other orientations) and the spatially relative descriptors used herein interpreted accordingly. Similarly, the terms "upwardly", "downwardly", "vertical", "horizontal" and the like are used herein for the purpose of explanation only unless specifically indicated otherwise.

Although the terms "first" and "second" may be used herein to describe various features/elements (including steps), these features/elements should not be limited by these terms, unless the context indicates otherwise. These terms may be used to distinguish one feature/element from another feature/element. Thus, a first feature/element discussed below could be termed a second feature/element, and similarly, a second feature/element discussed below could be termed a first feature/element without departing from the teachings of the present invention.

Throughout this specification and the claims which follow, unless the context requires otherwise, the word "comprise", and variations such as "comprises" and "comprising" means various components can be co-jointly employed in the methods and articles (e.g., compositions and apparatuses including device and methods). For example, the term "comprising" will be understood to imply the inclusion of any stated elements or steps but not the exclusion of any other elements or steps.

In general, any of the apparatuses and methods described herein should be understood to be inclusive, but all or a sub-set of the components and/or steps may alternatively be exclusive, and may be expressed as "consisting of" or alternatively "consisting essentially of" the various components, steps, sub-components or sub-steps.

As used herein in the specification and claims, including as used in the examples and unless otherwise expressly specified, all numbers may be read as if prefaced by the word "about" or "approximately," even if the term does not expressly appear. The phrase "about" or "approximately" may be used when describing magnitude and/or position to indicate that the value and/or position described is within a reasonable expected range of values and/or positions. For example, a numeric value may have a value that is +/−0.1% of the stated value (or range of values), +/−1% of the stated value (or range of values), +/−2% of the stated value (or range of values), +/−5% of the stated value (or range of values), +/−10% of the stated value (or range of values), etc. Any numerical values given herein should also be understood to include about or approximately that value, unless the context indicates otherwise. For example, if the value "10" is disclosed, then "about 10" is also disclosed. Any numerical range recited herein is intended to include all sub-ranges subsumed therein. It is also understood that when a value is disclosed that "less than or equal to" the value, "greater than or equal to the value" and possible ranges between values are also disclosed, as appropriately understood by the skilled artisan. For example, if the value "X" is disclosed the "less than or equal to X" as well as "greater than or equal to X" (e.g., where X is a numerical value) is also disclosed. It is also understood that the throughout the application, data is provided in a number of different formats, and that this data, represents endpoints and starting points, and ranges for any combination of the data points. For example, if a particular data point "10" and a particular data point "15" are disclosed, it is understood that greater than, greater than or equal to, less than, less than or equal to, and equal to 10 and 15 are considered disclosed as well as between 10 and 15. It is also understood that each unit between two particular units are also disclosed. For example, if 10 and 15 are disclosed, then 11, 12, 13, and 14 are also disclosed.

Although various illustrative embodiments are described above, any of a number of changes may be made to various embodiments without departing from the scope of the invention as described by the claims. For example, the order in which various described method steps are performed may often be changed in alternative embodiments, and in other alternative embodiments one or more method steps may be skipped altogether. Optional features of various device and system embodiments may be included in some embodiments and not in others. Therefore, the foregoing description is provided primarily for exemplary purposes and should not be interpreted to limit the scope of the invention as it is set forth in the claims.

The examples and illustrations included herein show, by way of illustration and not of limitation, specific embodiments in which the subject matter may be practiced. As mentioned, other embodiments may be utilized and derived there from, such that structural and logical substitutions and changes may be made without departing from the scope of this disclosure. Such embodiments of the inventive subject matter may be referred to herein individually or collectively by the term "invention" merely for convenience and without intending to voluntarily limit the scope of this application to any single invention or inventive concept, if more than one is, in fact, disclosed. Thus, although specific embodiments have been illustrated and described herein, any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

What is claimed is:

1. A palatal expander apparatus for expanding a patient's palate, the apparatus comprising:
a pair of tooth engagement regions connected by a palatal region, wherein the palatal region is configured to apply force between the pair of tooth engagement regions when the apparatus is worn by the patient; and
wherein the tooth engagement regions each comprise an occlusal side and a buccal side, further wherein at least a portion of the palatal region is configured to have a clearance of greater than 0.1 millimeters (mm) from the patient's mid-palatal region when the apparatus is worn by the patient, wherein the clearance between the palatal region and the patient's palate decreases from the patient's mid-palatal region laterally toward the pair of tooth engagement regions.

2. The apparatus of claim 1, further comprising an extension extending from the buccal side, wherein the extension is configured to extend adjacent and away from the patient's gingiva when the apparatus is worn by the patient to form a gap between the extension and the patient's gingiva.

3. The apparatus of claim 2, wherein the gap is between 0.25 mm and 1 mm.

4. The apparatus of claim 1, wherein the palatal region is configured to apply between 8 and 10 N of force between the pair of tooth engagement regions when the apparatus is worn by the patient.

5. The apparatus of claim 1, wherein the palatal region comprises an anterior region and a posterior region, wherein the palatal region is thinner in the anterior region as compared to the posterior region.

6. The apparatus of claim 1, wherein the palatal region comprises an anterior region and a posterior region, wherein the palatal region is thinner in the posterior region as compared to the anterior regions.

7. The apparatus of claim 1, wherein the buccal side of the tooth engagement regions is thinner than the occlusal side of the tooth engagement regions.

8. The apparatus of claim 1, wherein the apparatus is formed as a single, monolithic piece.

9. The apparatus of claim 1, wherein at least a portion of the palatal region is configured to match the patient's palate, including any grooves, ridges and troughs.

10. The apparatus of claim 1, wherein the palatal region is configured to apply the force against lateral side regions of the patient's palate when the apparatus is worn by the patient.

11. The apparatus of claim 1, wherein the palatal region is configured to apply the force against lingual sides of the patient's teeth.

12. The apparatus of claim 1, wherein the clearance extends over at least 50% of the palatal region when worn by the patient.

13. The apparatus of claim 1, wherein the occlusal side is thinner than the palatal region.

14. The apparatus of claim 1, wherein the palatal region comprises an upper convex surface having a first surface topography and a lower, concave surface having a second surface topography that is smoother than the first surface topography.

15. The apparatus of claim 1, wherein a portion of the palatal region is configured to contact a portion of the patient's palate lateral to the patient's mid-palatal region.

16. The apparatus of claim 15, wherein the portion of the palatal region that is configured to contact the portion of the patient's palate lateral to the patient's mid-palatal region is configured to be negatively offset with respect to the patient's palate when the apparatus is worn by the patient.

17. A palatal expander apparatus for expanding a patient's palate, the apparatus comprising:
a pair of tooth engagement regions connected by a palatal region, wherein the palatal region is configured to apply force between the pair of tooth engagement regions against lateral side regions of the patient's palate when the apparatus is worn by the patient; and
wherein the tooth engagement regions each comprise an occlusal side and a buccal side, wherein the occlusal side is thinner than the palatal region, further wherein at least a portion of the palatal region is configured to have a clearance of greater than 0.1 millimeters (mm) from the patient's mid-palatal region when the apparatus is worn by the patient, wherein the clearance between the at least a portion of the palatal region and the patient's palate decreases from the patient's mid-palatal region laterally toward the pair of tooth engagement regions.

18. The apparatus of claim 17, further comprising an extension extending from the buccal side, wherein the extension is configured to extend adjacent and away from the patient's gingiva when the apparatus is worn by the patient to form a gap.

19. The apparatus of claim 18, wherein the gap is between 0.25 mm and 1 mm.

20. The apparatus of claim 17, wherein the palatal region is thinner in more anterior regions as compared to more posterior regions.

21. The apparatus of claim 17, wherein the palatal region is thinner in more posterior regions as compared to more anterior regions.

22. The apparatus of claim 17, wherein the palatal region is configured to apply the force against lingual sides of the patient's teeth.

23. The apparatus of claim 17, wherein the clearance extends over at least 50% of the palatal region when worn by the patient.

24. The apparatus of claim 17, wherein the buccal side of the tooth engagement regions is thinner than the occlusal side of the tooth engagement regions.

25. A series of palatal expander apparatuses having an ordered sequence for expanding a patient's palate, the series of palatal expanders comprising:
a first palatal expander comprising:
a first pair of tooth engagement regions connected by a first palatal region, wherein the first palatal region is configured to apply force between the first pair of tooth engagement regions when the first palatal expander is worn by the patient; and
wherein the first tooth engagement regions each comprise an occlusal side and a buccal side, further wherein at least a portion of the first palatal region is configured to have a clearance of greater than 0.1 millimeters (mm) from the patient's mid-palatal region when the apparatus is worn by the patient, wherein the clearance between the first palatal region and the patient's palate decreases from the patient's mid-palatal region laterally toward the first pair of tooth engagement regions; and
a second palatal expander configured to be worn later in the ordered sequence than the first palatal expander, the second palatal expander comprising:
a second pair of tooth engagement regions connected by a second palatal region, wherein the second palatal region is wider than the first palatal region and is configured to apply force between the second pair of tooth engagement regions when the second palatal expander is worn by the patient; and
wherein at least a portion of the second palatal region is configured to have a clearance of greater than 0.1 mm from the patient's mid-palatal region when the apparatus is worn by the patient, wherein the clearance between the second palatal region and the patient's palate decreases from the patient's mid-palatal region laterally toward the second pair of tooth engagement regions.

26. A method for providing an ordered series of palatal expanders configured to be sequentially worn by a patient to expand the patient's palate, the method comprising:
providing a first palatal expander apparatus having a first pair of tooth engagement regions connected by a first palatal region, wherein the first palatal region is configured to apply force between the first pair of tooth engagement regions when the first palatal expander apparatus is worn by the patient, wherein the first pair of tooth engagement regions each comprise an occlusal side and a buccal side, further wherein at least a portion of the first palatal region is configured to have a clearance of greater than 0.1 millimeters (mm) from the patient's mid-palatal region when the first palatal expander apparatus is worn by the patient, wherein the clearance between the first palatal region and the patient's palate decreases from the patient's mid-palatal region laterally toward the first pair of tooth engagement regions;
providing a second palatal expander apparatus to be worn after the first palatal expander apparatus in the ordered series, the second palatal expander apparatus having a second pair of tooth engagement regions connected by a second palatal region, wherein the second palatal region is wider than the first palatal region and is configured to apply force between the second pair of tooth engagement regions when the second palatal expander apparatus is worn by the patient, wherein at least a portion of the second palatal region is configured to have a clearance of greater than 0.1 mm from the patient's mid-palatal region when the second palatal expander apparatus is worn by the patient, wherein the clearance between the second palatal region and the patient's palate decreases from the patient's mid-palatal region laterally toward the second pair of tooth engagement regions.

27. The method of claim 26, wherein providing the first palatal expander apparatus comprises providing the first palatal expander apparatus having an extension extending from the buccal side, wherein the extension is configured to extend adjacent and away from the patient's gingiva when the first palatal expander apparatus is worn by the patient to form a gap between the extension and the patient's gingiva.

28. The method of claim 26, wherein providing the first palatal expander apparatus comprises providing the first palatal expander apparatus in which the first pair of tooth engagement regions each comprise buccal sides that are thinner than occlusal sides.

29. The method of claim 26, wherein providing the first palatal expander apparatus comprises providing the first palatal expander apparatus in which at least a portion of the first palatal region is configured to match the patient's palate, including any grooves, ridges and troughs.

30. The method of claim 26, wherein providing the first palatal expander apparatus comprises providing the first palatal expander apparatus in which the first palatal region is configured to apply the force against lateral side regions of the patient's palate when the first palatal expander apparatus is worn by the patient.

31. The method of claim 26, wherein providing the first palatal expander apparatus comprises providing the first palatal expander apparatus in which the first palatal region is configured to apply the force against lingual sides of the patient's teeth when the first palatal expander apparatus is worn by the patient.

32. The method of claim 26, wherein providing the first palatal expander apparatus comprises providing the first palatal expander apparatus in which the clearance extends over at least 50% of palatal region when the first palatal expander apparatus worn by the patient.

\* \* \* \* \*